(12) United States Patent
Lee et al.

(10) Patent No.: US 12,289,683 B2
(45) Date of Patent: *Apr. 29, 2025

(54) DEVICE AND CONTROLLING METHOD THEREOF

(71) Applicant: Samsung Electronics Co., Ltd., Suwon-si (KR)

(72) Inventors: Jong Moo Lee, Seoul (KR); Seung Min Choi, Seongnam-si (KR); Gyu Chual Kim, Bucheon-si (KR); Ji Woo Lee, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/495,384

(22) Filed: Oct. 26, 2023

(65) Prior Publication Data

US 2024/0073823 A1    Feb. 29, 2024

Related U.S. Application Data

(63) Continuation of application No. 17/689,259, filed on Mar. 8, 2022, now Pat. No. 11,968,627, which is a
(Continued)

(30) Foreign Application Priority Data

Feb. 23, 2017    (KR) ........................ 10-2017-0024318

(51) Int. Cl.
*H04M 1/725*    (2021.01)
*G06F 1/16*    (2006.01)
(Continued)

(52) U.S. Cl.
CPC ........ *H04W 52/027* (2013.01); *G06F 1/1626* (2013.01); *G06F 1/1643* (2013.01);
(Continued)

(58) Field of Classification Search
CPC .......... H04W 52/027; H04W 52/0229; H04W 68/00; H04M 1/0268; H04M 1/724;
(Continued)

(56) References Cited

U.S. PATENT DOCUMENTS 9,153,106 B1    10/2015    Kuscher et al.
9,300,347 B1    3/2016    Coverstone
(Continued)

FOREIGN PATENT DOCUMENTS

CN    103701988 A    4/2014
CN    105677870 A    6/2016
(Continued)

OTHER PUBLICATIONS

Design of Spectrum Processing Display System based on Android, 2018.
(Continued)

*Primary Examiner* — Andrew Wendell
(74) *Attorney, Agent, or Firm* — Jefferson IP Law, LLP

(57) ABSTRACT

An electronic device is provided. The electronic device includes a housing including a front surface and a rear surface, a display, a communication circuit, at least one processor, and a memory. The memory stores instructions which, when executed, cause the at least one processor to receive a signal from outside of the electronic device using the communication circuit, in response to receiving the signal, display a user interface on an elongated region that extends along at least one edge region of the display, and display at least one content corresponding to the signal, while displaying the user interface or after displaying the user interface.

20 Claims, 45 Drawing Sheets

Related U.S. Application Data continuation of application No. 16/944,606, filed on Jul. 31, 2020, now Pat. No. 11,304,142, which is a continuation of application No. 15/900,022, filed on Feb. 20, 2018, now Pat. No. 10,736,042.

(51) Int. Cl.
| | |
|---|---|
| *G06F 1/3234* | (2019.01) |
| *G06F 3/041* | (2006.01) |
| *G06F 3/0488* | (2022.01) |
| *G06F 3/04883* | (2022.01) |
| *G06F 3/04886* | (2022.01) |
| *H04B 17/23* | (2015.01) |
| *H04M 1/02* | (2006.01) |
| *H04M 1/57* | (2006.01) |
| *H04M 1/724* | (2021.01) |
| *H04M 19/04* | (2006.01) |
| *H04W 52/02* | (2009.01) |
| *H04W 68/00* | (2009.01) |
| *G06F 3/0482* | (2013.01) |
| *G06F 3/04847* | (2022.01) |
| *H04M 1/72436* | (2021.01) |
| *H04M 1/72442* | (2021.01) |
| *H04M 1/72469* | (2021.01) |

(52) U.S. Cl.
CPC .......... *G06F 1/1652* (2013.01); *G06F 1/3262* (2013.01); *G06F 3/0416* (2013.01); *G06F 3/0488* (2013.01); *G06F 3/04883* (2013.01); *G06F 3/04886* (2013.01); *H04M 1/0269* (2022.02); *H04M 1/724* (2021.01); *H04M 19/048* (2013.01); *H04W 52/0229* (2013.01); *H04W 68/00* (2013.01); *G06F 3/0482* (2013.01); *G06F 3/04847* (2013.01); *G06F 2203/04803* (2013.01); *H04M 1/72436* (2021.01); *H04M 1/72442* (2021.01); *H04M 1/72469* (2021.01); *H04M 2250/12* (2013.01); *H04M 2250/22* (2013.01); *Y02D 30/70* (2020.08)

(58) Field of Classification Search
CPC .......... H04M 19/048; H04M 1/72436; H04M 1/72442; H04M 1/72469; H04M 2250/12; H04M 2250/22; H04M 1/0269; H04M 1/72403; H04M 2201/34; H04M 2201/36; H04M 2201/38; H04M 2250/06; H04M 1/725; H04M 1/57; H04B 17/23; G06F 1/1626; G06F 1/1643; G06F 1/1652; G06F 1/3262; G06F 3/0416; G06F 3/0488; G06F 3/04883; G06F 3/04886; G06F 3/0482; G06F 3/04847; G06F 2203/04803; Y02D 30/70

See application file for complete search history.

(56) References Cited

U.S. PATENT DOCUMENTS

| | | | |
|---|---|---|---|
| 9,584,174 B1 | 2/2017 | Coverstone | |
| 9,769,295 B2 | 9/2017 | Park | |
| 9,881,465 B2 | 1/2018 | Kuscher et al. | |
| 9,898,111 B2 | 2/2018 | Myung et al. | |
| 9,927,902 B2 | 3/2018 | Burr et al. | |
| 10,186,014 B2 | 1/2019 | Cho et al. | |
| 10,235,846 B2 | 3/2019 | Kuscher et al. | |
| 10,736,042 B2 | 8/2020 | Lee et al. | |
| 11,304,142 B2 | 4/2022 | Lee et al. | |
| 11,551,591 B2 | 1/2023 | Peterson et al. | |
| 11,968,627 B2 * | 4/2024 | Lee ........................ | G06F 3/0488 |
| 2007/0132751 A1 | 6/2007 | Claessen | |
| 2009/0124295 A1 | 5/2009 | Watanabe | |
| 2011/0181732 A1 | 7/2011 | Yoshino et al. | |
| 2013/0346408 A1 | 12/2013 | Duarte et al. | |
| 2014/0189597 A1 | 7/2014 | Kang | |
| 2014/0282233 A1 | 9/2014 | Sandler et al. | |
| 2014/0327630 A1 | 11/2014 | Burr et al. | |
| 2015/0015741 A1 | 1/2015 | Kim et al. | |
| 2015/0022469 A1 | 1/2015 | Mhun et al. | |
| 2015/0062052 A1 | 3/2015 | Bernstein et al. | |
| 2015/0242006 A1 | 8/2015 | Kim et al. | |
| 2015/0365509 A1 | 12/2015 | Park | |
| 2016/0080680 A1 | 3/2016 | Choi et al. | |
| 2016/0133223 A1 | 5/2016 | Kim et al. | |
| 2016/0147435 A1 | 5/2016 | Brody et al. | |
| 2016/0196635 A1 | 7/2016 | Cho et al. | |
| 2016/0224299 A1 | 8/2016 | Lim et al. | |
| 2016/0283845 A1 | 9/2016 | Amarilio | |
| 2016/0306524 A1 | 10/2016 | Park et al. | |
| 2016/0313877 A1 | 10/2016 | Ha et al. | |
| 2017/0013231 A1 | 1/2017 | Kwon | |
| 2017/0046024 A1 | 2/2017 | Dascola et al. | |
| 2017/0046039 A1 | 2/2017 | Karunamuni et al. | |
| 2017/0223159 A1 | 8/2017 | Park | |
| 2017/0337897 A1 | 11/2017 | Jung et al. | |
| 2018/0088795 A1 | 3/2018 | Van Os et al. | |
| 2018/0204303 A1 | 7/2018 | Bae et al. | |
| 2019/0075199 A1 | 3/2019 | Tseng et al. | |
| 2023/0011187 A1 | 1/2023 | Qiao et al. | |

FOREIGN PATENT DOCUMENTS

| | | |
|---|---|---|
| CN | 105748057 A | 7/2016 |
| CN | 106126399 A | 11/2016 |
| EP | 2 827 569 A1 | 1/2015 |
| EP | 2 999 211 A1 | 3/2016 |
| EP | 3 048 518 A1 | 7/2016 |
| KR | 10-2016-0032883 A | 3/2016 |
| KR | 10-2017-0008698 A | 1/2017 |

OTHER PUBLICATIONS

Korean Office Action dated Nov. 9, 2023, issued in Korean Application No. 10-2017-0024318.

Chinese Office Action dated Jan. 4, 2024, issued in Chinese Application No. 201810155588.6.

European Office Action dated Dec. 6, 2023, issued in European Application No. 23193940.6.

European Office Action dated Feb. 2, 2021, issued in European Application No. 18158018.4.

Chinese Office Action with English translation dated Mar. 22, 2023; Chinese Appln. No. 201810155588.6.

European Office Communication dated Sep. 8, 2022; European Appln. No. 18 158 018.4.

\* cited by examiner

DEVICE AND CONTROLLING METHOD THEREOF

CROSS-REFERENCE TO RELATED APPLICATION(S)

This application is a continuation application of prior application Ser. No. 17/689,259, filed on Mar. 8, 2022, which is a continuation application of prior application Ser. No. 16/944,606, filed on Jul. 31, 2020, which has issued as U.S. Pat. No. 11,304,142, on Apr. 12, 2022, which is a continuation of prior application Ser. No. 15/900,022, filed on Feb. 20, 2018, which has issued as U.S. Pat. No. 10,736,042 on Aug. 4, 2020, and was based on and claimed priority under 35 U.S.C. § 119(a) of a Korean patent application No. 10-2017-0024318, filed on Feb. 23, 2017, in the Korean Intellectual Property Office, the disclosure of which is incorporated by reference herein its entirety.

BACKGROUND

1. Field

The present disclosure relates to a method of providing notification in an electronic device.

2. Description of Related Art

Recently, an electronic device has visually provided notification, which corresponds to an occurring event or a signal received from outside, for a user using a display. In particular, the latest mobile terminal may provide visual notification for a user by creating a user interface (e.g., lighting) through a curved-surface region of a display even in the state that most regions of the display are not able to be recognized. In addition, the mobile terminal may minimize a current consumed when the notification is provided by utilizing lower power display mode technologies such as AMOLED lower power mode (ALPM) or hybrid low power mode (HLPM).

The above information is presented as background information only to assist with an understanding of the present disclosure. No determination has been made, and no assertion is made, as to whether any of the above might be applicable as prior art with regard to the present disclosure.

SUMMARY

When lighting occurs through the curved-surface region of the display in the state that the electronic device is placed face down, the user may not visually recognize the notification.

Aspects of the present disclosure are to address at least the above-mentioned problems and/or disadvantages and to provide at least the advantages described below. Accordingly, an aspect of the present disclosure is to provide user interfaces corresponding to various events occurring in the inside of an electronic device or various signals received from the outside of the electronic device.

In accordance with an aspect of the present disclosure, an electronic device is provided. The electronic device includes a housing including a front surface and a rear surface facing a direction opposite to a direction that the front surface faces, a display positioned on the front surface of the housing, a communication circuit positioned inside the housing, at least one processor positioned inside the housing and electrically connected with the display and the communication circuit, and a memory positioned inside the housing and electrically connected with the at least one processor, wherein the memory stores instructions which, when executed, cause the at least one processor to receive a signal from outside of the electronic device using the communication circuit, in response to receiving the signal, display a user interface on an elongated region that extends along at least one edge region of the display, wherein the user interface starts with a first size from a first portion on the elongated region of the display, and thereafter expands in length to a second portion on the edge region of the display to have a second size greater than the first size, and display at least one content corresponding to the signal, while displaying the user interface or after displaying the user interface.

In accordance with another aspect of the present disclosure, an electronic device is provided. The electronic device includes a housing, a display positioned a given portion of the housing, a communication circuit positioned inside the housing, at least one processor positioned inside the housing and electrically connected with the display and the communication circuit, and a memory positioned inside the housing and electrically connected with the at least one processor, wherein the memory stores instructions which, when executed, cause the at least one processor to receive a signal from outside of the electronic device using the communication circuit, or an event generated from inside the electronic device, in response to receiving the signal or the event, display a user interface on an elongated region that extends along at least one edge region of the display, wherein the user interface starts with a first size from a first portion on the elongated region of the display, and thereafter expands in length to a second portion on the edge region of the display to have a second size greater than the first size, and display at least one content corresponding to the signal or the event, while displaying the user interface or after displaying the user interface.

In accordance with another aspect of the present disclosure, a controlling method of an electronic device including a display is provided. The controlling method includes receiving a signal from outside of the electronic device, in response to receiving the signal, displaying a user interface on an elongated region that extends along at least one edge region of the display, wherein the user interface starts with a first size from a first portion on the elongated region of the display, and thereafter expands in length to a second portion on the edge region of the display to have a second size greater than the first size, and displaying, on the display, at least one content corresponding to the signal, while displaying the user interface or after displaying the user interface.

According to an embodiment of the present disclosure, the electronic device may provide the user interface having a color, a pattern, or the like varied depending on a signal received in the electronic device and an event occurring inside the electronic device.

According to an embodiment of the present disclosure, the electronic device may provide the user interface depending on the external characteristic of the display included in the electronic device, and the user may recognize signal reception and event occurrence even under various environments.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
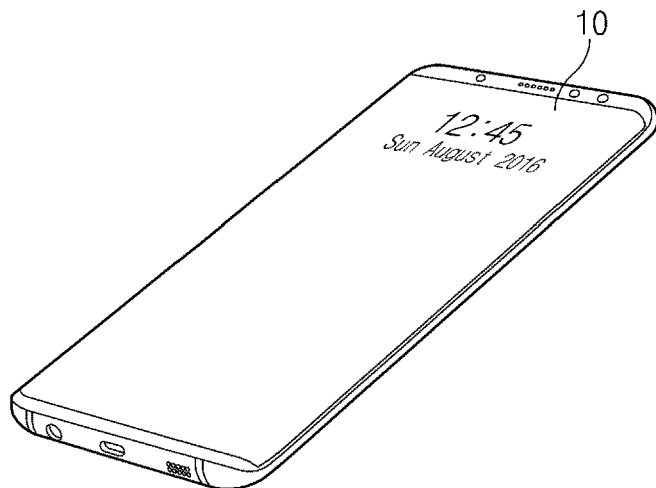
FIGS. 1A, 1B, and 1C illustrate situations that an electronic device displays a user interface on a display, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to the situation, the expression "configured to" used in this disclosure may be used as, for example, the expression "suitable for", "having the capacity to", "adapted to", "made to", "capable of", or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor (AP)) which performs corresponding operations by executing one or more software programs which are stored in a memory device.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) audio layer 3 (MP3) players, medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, drones, automatic teller's machines (ATMs), points of sales (POSs) of stores, or internet of things (e.g., light bulbs, various sensors, sprinkler devices, fire alarms, thermostats, street lamps, toasters, exercise equipment, hot water tanks, heaters, boilers, and the like). According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be a flexible electronic device or a combination of two or more above-described devices. Furthermore, an electronic device according to an embodiment of this disclosure may not be limited to the above-described electronic devices. In this disclosure, the term "user" may refer to a person who uses an electronic device or may refer to a device (e.g., an artificial intelligence electronic device) that uses the electronic device.

Figure 1B:
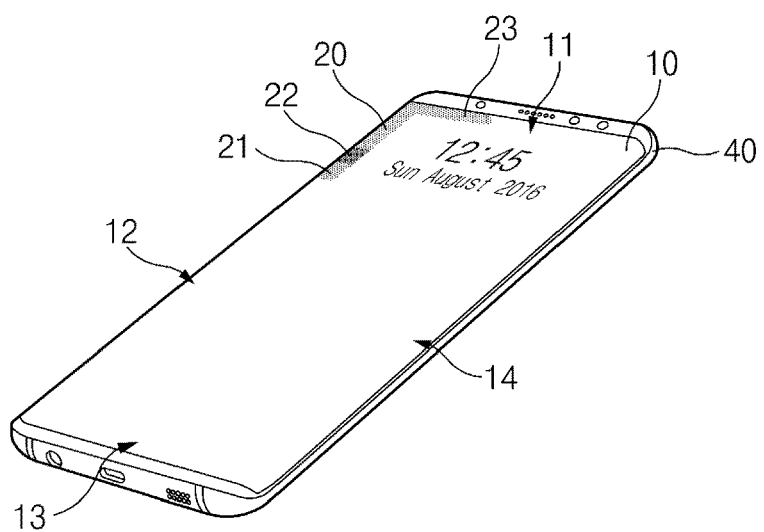
Figure 1C:
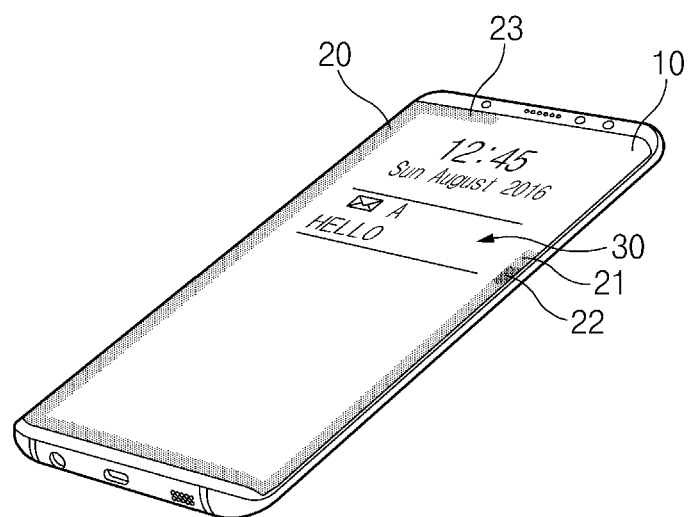

FIGS. 1A to 1C illustrate situations that an electronic device displays a user interface on a display, according to an embodiment of the present disclosure.

Referring to FIG. 1A, an electronic device 100 may support a wake-up mode of allowing a user to intensively use functions of the electronic device 100 and a sleep mode of waiting for the use of the electronic device 100 by the user.

The electronic device 100 may operate under sufficient power (e.g., power necessary for all pixels included in the display to express color having preset gradation) received from a battery such that various hardware modules and/or software modules included in the electronic device 100 sufficiently perform the functions thereof in the wake-up mode. For example, the display may receive sufficient power in the wake-up mode to provide various pieces of content required from a user, and a processor included in the electronic device 100 may provide various functions based on sufficiently supplied power.

The electronic device 100 may operate under the minimum power to deactivate the various hardware modules and/or software modules included in the electronic device 100 or perform only specified limited functions in the sleep mode. For example, a camera module may be deactivated in a function of capturing a photo and a moving picture in the case of switching to the sleep mode. In addition, the processor may be configured to execute only a limited function of an application program in the case of switching to the sleep mode. Accordingly, since information processing or computations are restricted depending on hardware modules and/or software modules, battery lifetime of the electronic device 100 may be enhanced.

According to an embodiment, the electronic device 100 may display preset information (e.g., time information, a date, weather, or the like) on a display 10 in the sleep mode. The electronic device 100 may display multiple pieces of preset information in specified color using preset pixels and may set remaining pixels to be in specified another color (e.g., black color). For example, in the case that the display 10 includes an organic light emitting diode (OLED) panel, the remaining pixels may be turned off.

Such a display output manner may be referred to as "always on display (AOD)" in that useful information is always provided. In addition, the display output manner may be referred to as "self-display" in terms of displaying on a display through the intrinsic operation of a display driver integrated circuit (DDI) without intervention of the processor.

To implement AOD functions, the DDI may at least include a graphic random-access memory (GRAM) and a control module. The GRAM may be referred to as, for example, "frame buffer" or "line buffer". The GRAM may store image data corresponding to the above-described preset information displayed in the sleep mode. The control module may select a part of the image data stored in the GRAM and may control the selected part to be output to a specified position of the display 10. The control module may be referred to as "control circuit".

As described above, the electronic device 100 of FIGS. 1A to 1C may be in the wake-up mode or the sleep mode and may display various pieces of information (e.g., content, a user interface, or the like) on the display 10 according to states of the electronic device 100. For example, the electronic device 100 may display a user interface or content using an image, which is stored in a memory by the processor, in the wake-up mode. In addition, the electronic device 100 may display a user interface or content using an image, which is stored in the GRAM included in the DDI, in the sleep mode.

Referring to FIGS. 1B and 1C, the electronic device 100 may display a user interface 20 and/or content 30 on one region of the display 10. When the electronic device 100 receives a signal generated from the outside of the electronic device 100 or when an event occurs inside the electronic device 100, the electronic device 100 may display, on the display 10, the user interface 20, which is used for notifying the reception of the signal or the occurrence of the event to a user, or content created based on the content of the signal or the content of the event.

According to an embodiment, the event occurring inside the electronic device 100 may include, for example, a preset alarm, schedule notification, an internal system state change, or the like. The signal received from the outside of the electronic device 100 may include, for example, a text message, a call, application update information, or social media updates.

The user interface 20 and the content 30 may be simultaneously or sequentially displayed. The sequence and the position to display the content 30 and the user interface 20 may be varied depending on the type of the content 30 and the state (e.g., the wake-up mode, the sleep mode, or the like) of the electronic device 100. For example, the electronic device 100 may simultaneously display the content 30 and the user interface 20. The electronic device 100 may display the user interface 20 after first displaying the content 30. Inversely, the electronic device 100 may display the content 30 after first displaying the user interface 20.

According to an embodiment, the user interface 20 may be displayed along an edge region of the display 10. The edge region may correspond to one part of the display 10 adjacent to a housing 40 of the electronic device 100. For example, the electronic device 100 may include a first edge region 11, a second edge region 12, a third edge region 13, and a fourth edge region 14. The first to third edge regions 11, 12, 13, and 14 may refer to regions formed by a specific width toward an inner part of the display 10 from edges of the display 10.

According to an embodiment, the user interface 20 may show an effect such as that the user interface 20 moves along the edge region of the display 10. The user interface 20 may include a starting point 21 and an ending point 23. Additionally, the user interface 20 may further include a progress direction guide 22.

The user interface 20 may have the shape of a line or a face. The user interface 20 may be expressed with brightness higher than surrounding brightness. The user interface 20 may have a variable length. The starting point 21 may have various shapes such as a circle, a rectangle, a triangle, an arrow shape, or the like. The ending point 23 may have, for example, a gradation effect. The user interface 20 may be understood as a kind of a graphic effect present in an edge region of the display 10.

Referring to FIGS. 1B and 1C, the electronic device 100 may change the position that the user interface 20 is displayed on the display 10. For example, the electronic device 100 may display the ending point 23 of the user interface 20 on the first edge region 11 and may display the starting point 21 of the user interface 20 on the second edge region 12. In addition, the electronic device 100 may extend the length of the user interface 20 to display the starting point 21 of the user interface 20 on the fourth edge region 14 and to display the ending point 23 of the user interface 20 on the first edge region 11. Accordingly, the electronic device 100 may implement an animation effect such as that of the user interface 20 moving along the edge region of the display 10.

The user interface 20 may include information on various attributes. The information on the attributes may include, for example, the form (e.g., a face, a line, or the like) of the user interface 20, color (e.g., a hue, brightness, saturation, or a color effect (a gradation effect, a blinking effect, or the like) of the user interface 20, the movement (e.g., movement using the control of a pixel value, movement by continuous display of a plurality of images) of the user interface 20, a moving direction of the user interface 20, the moving speed of the user interface 20, time that the user interface 20 is displayed, time taken until the user interface 20 is displayed again after the user interface 20 is displayed on the full part of the display, or the starting and ending points 21 and 23 of the user interface 20.

According to an embodiment, the electronic device 100 may display the user interface 20 in preset color. However, the color of the user interface 20 may be determined according to various criteria. For example, the electronic device 100 may determine the color of the user interface 20 based on information on an application which created the content displayed on the display 10. In this case, the application may specify the color. For example, in the case that a dialing application displays dials in green color, the electronic device 100 may display the user interface 20 in green color when generating a message about a missed call. If a message about another missed call is generated, the electronic device 100 may display the user interface 20 in color complementary to green color.

The color determination of the user interface 20 depending on applications is limited thereto. For example, a user may select desired color between color of the application, which is basically provided by the electronic device 100, and color provided by the application.

The electronic device 100 may set the color of the user interface 20 to the same color as that of a light emitting diode (LED) (not illustrated), which is included in the electronic device 100, or to the color selected by the user.

According to another embodiment, the electronic device 100 may display the user interface 20 by adjusting a hue, brightness, and saturation belonging to the color expressed for the user interface 20 or by adding an image effect (e.g., a gradation effect, a blinking effect, or the like) to the user interface 20.

As described above, the electronic device 100 may provide various notification effects for a user using the user interface 20 displayed on the edge region of the display 10.

Figure 2:
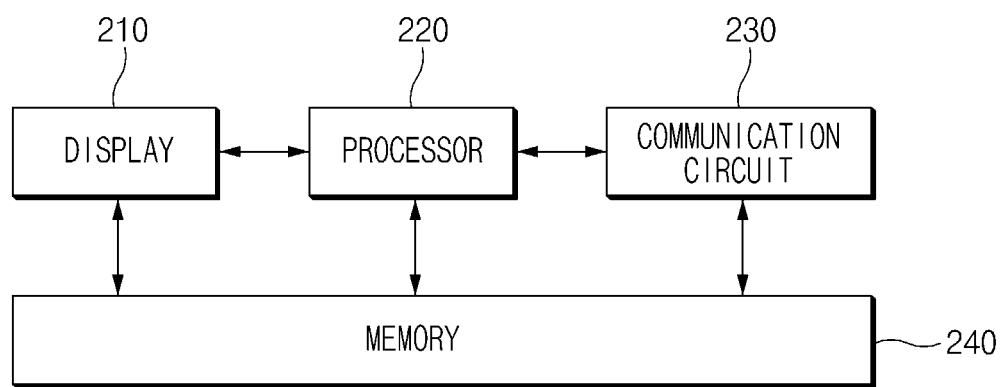
FIG. 2 is a schematic block diagram of the electronic device, according to an embodiment of the present disclosure.

FIG. 2 is a schematic block diagram of the electronic device, according to an embodiment of the present disclosure.

Referring to FIG. 2, the electronic device 100 may include a display 210, a processor 220 (e.g., at least one processor), a communication circuit 230, and a memory 240. Some of elements of the electronic device 100, which are illustrated in FIG. 2, may be omitted or other elements, which are not illustrated in FIG. 2, may be added. For example, the electronic device 100 may include elements of one or more sensors, a sensor module (e.g., a gesture sensor, a gyro sensor, or the like), a power supply unit, or the like.

The display 210 may include, for example, a liquid crystal display (LCD), a light-emitting diode (LED) display, an organic LED (OLED) display, a microelectromechanical systems (MEMS) display, or an electronic paper display. The display 210 may include a touch screen and may receive, for example, a touch, gesture, proximity, or hovering input using an electronic pen or a part of a user's body.

According to an embodiment, the display 210 may include a touch sensor, a pressure sensor and/or a fingerprint sensor. For example, if the touch sensor is included, the display 210 may be referred to as "touchscreen display".

According to an embodiment, the display 210 may receive an image driving signal from the DDI. The display 210 may display various user interfaces and various pieces of content, based on the image driving signal. For example, the display 210 may display a user interface on at least a part of an edge region of the display 210 and may display content in one region of the display 210.

The processor 220 may, for example, control a plurality of hardware or software elements connected to the processor 220 and may perform various data processing and arithmetic operations, by running an operating system (OS) or an application program.

According to an embodiment, the processor 220 may control the display 210 to display messages, which are generated from various applications installed in the electronic device 100, on the display 210. In addition, the processor 220 may control the display 210 to display content, which corresponds to a signal received from the outside through the communication circuit 230, on the display 210 in the form of a message.

The processor 220 may display the user interface based on an event occurring inside the electronic device 100 or a signal generated from the outside. According to an embodiment, the processor 220 may change the form of displaying the user interface based on the type of an application generating the signal or the event, or the content included in the signal or the event.

The communication circuit 230 may include, for example, a cellular module, a wireless fidelity (Wi-Fi) module, a Bluetooth (BT) module, a radio frequency (RF) module, or the like. The communication circuit 230 may form a network together with another electronic device under the control of the processor 220.

According to an embodiment, the communication circuit 230 may receive a signal from an external electronic device under the control of the processor 220. In addition, the communication circuit 230 may transmit information on the state changes of applications installed in the electronic device 100 to the external electronic device.

According to various embodiments, the memory 240 may store instructions or data associated with operations of elements included in the electronic device 100. For example, the memory 240 may store instructions that, when executed, cause the processor 220 to perform various operations disclosed in the present disclosure.

Figure 3A:
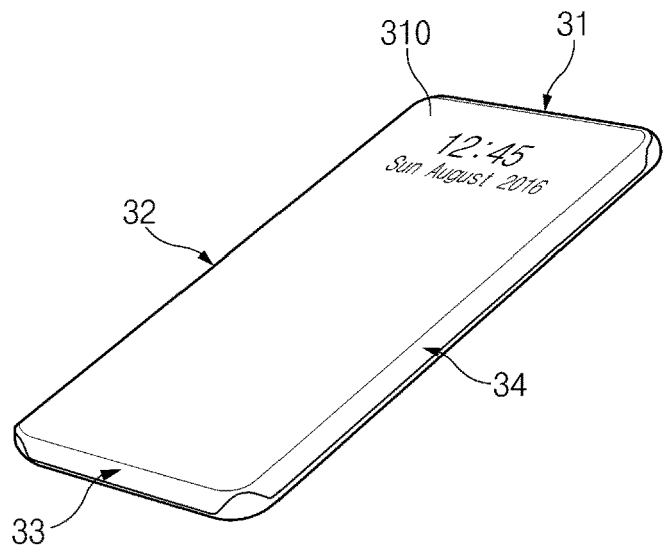
FIGS. 3A, 3B, and 3C illustrate display structures provided in various forms and installed in the electronic device, according to an embodiment of the present disclosure.
Figure 3B:
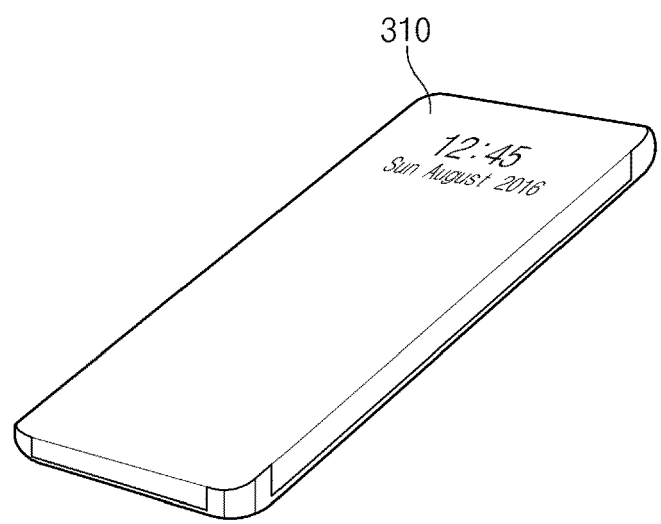
Figure 3C:
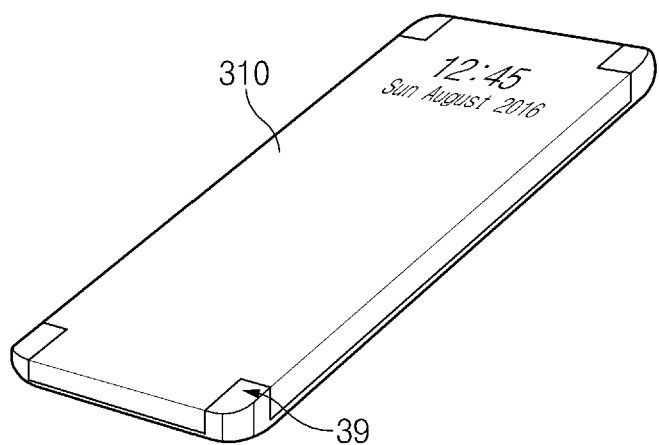

FIGS. 3A to 3C illustrate display structures provided in various forms and installed in the electronic device, according to an embodiment of the present disclosure.

According to an embodiment, a display may have various forms. For example, a flat-panel display may be included in the form of a flat surface on one surface of the electronic device 100. In the case of the flat-panel display, as described with reference to FIGS. 1A to 1C, the electronic device 100 may display a user interface on an edge region of the display (e.g., the display 10 of FIGS. 1A to 1C). In addition, a curved display may be disposed throughout one surface (e.g., a front surface) of the electronic device 100, a surface (e.g., a rear surface) facing a direction opposite to a direction that the one surface faces, and a side surface between the one surface (e.g., the front surface) and the surface (e.g., the rear surface). In the case of the curved display, the electronic device 100 may display a user interface (e.g., a user interface of FIGS. 1 A to 1C) on a part having a curved surface.

Referring to FIGS. 3A to 3C, the electronic device 100 may include a display which is curved in four surfaces (top, bottom, left, and right surfaces). A display 310 curved in four surfaces may include a first surface 31, a second surface 32, a third surface 33, and a fourth surface 34 corresponding to four surfaces of the electronic device 100. Accordingly, the curved display 310 may surround side surface of the electronic device together with the four surfaces of the electronic device 100.

According to an embodiment, in the case that the electronic device 100 includes the curved display 310, the electronic device 100 may display a user interface (e.g., the user interface 20 of FIGS. 1A to 1C), which is described above with reference to FIGS. 1 A to 1C, on the first surface 31, the second surface 32, the third surface 33, or the fourth surface 34 included in the curved display 310. However, the present disclosure is not limited thereto. For example, the electronic device 100 may display the user interface 20 on the second surface 32 or the fourth surface 34, or may display the user interface (e.g., the user interface 20 of FIGS. 1 A to 1C) on long and narrow flat regions of the curved display 310, which are adjacent to the first surface 31 and the third surface 33. In other words, the electronic device 100 may display the user interface (e.g., the user interface 20 of FIGS. 1 A to 1C) in various configurations.

Referring to FIG. 3A, the curved display 310 may be rounded in a region corresponding to a corner part making contact with side surfaces of the electronic device 100. The electronic device 100 including the curved display 310 illustrated in FIG. 3A may employ corner parts of the electronic device 100 as display regions.

Referring to FIG. 3B, the curved display 310 may be in the form of a four-surface cross display. According to an embodiment, the curved display 310 may not include corner parts making contact with side surfaces of the curved display 310.

Referring to FIG. 3C, the curved display 310 may be in the form of a four-sided cross display. In this case, the curved display 310 may be formed such that surfaces of the curved display 310, which correspond to the corner making contact with the side surfaces of the electronic device 100, are linked to each other while forming an angle of about 90°. In this case, a point 39, at which the surfaces of the curved display 310 meet together, may include a structure capable of protecting the curved display 310 from external impact.

FIGS. 4A to 4D illustrate various situations that the user interface is displayed in the electronic device, according to an embodiment of the present disclosure.

Figure 4A:
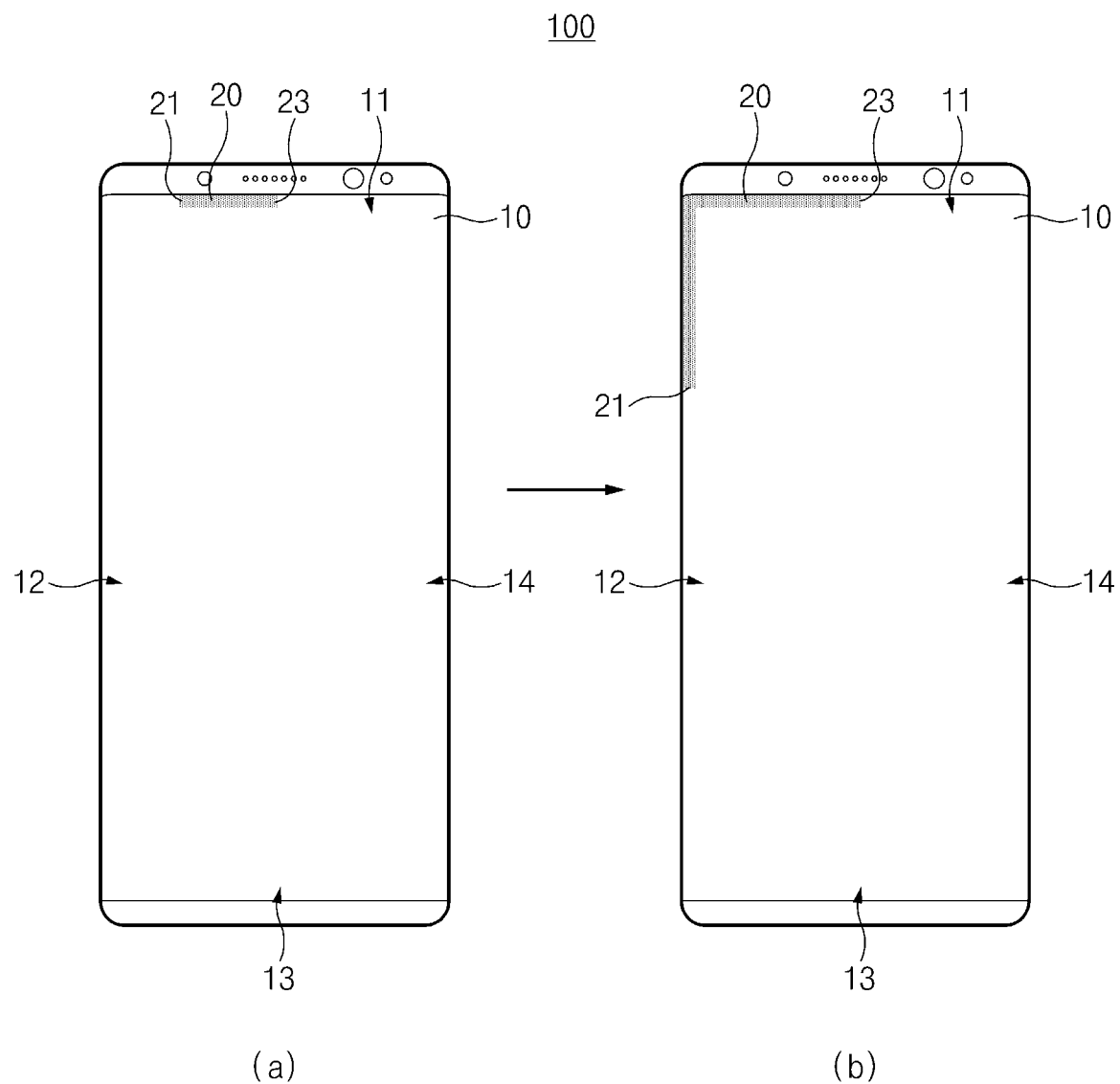
FIGS. 4A, 4B, 4C, and 4D illustrate various situations that the user interface is displayed in the electronic device, according to an embodiment of the present disclosure.

Referring to object (a) of FIG. 4A, the electronic device 100 may display the user interface 20 on the first edge region 11 of the display 10. The edge region may be one part of the display 10 adjacent to the housing of the electronic device 100, as described with reference to FIGS. 1 A to 1C. Accordingly, in the case that the display 10 has a curved surface, the edge region may be a part having a curved surface.

The displaying of the user interface 20 may be started from the central part of the first edge region 11 or a specific point of the first edge region 11. The user interface 20 may include the starting point 21 and the ending point 23.

Referring to object (b) of FIG. 4A, the electronic device 100 may display the user interface 20 on the first edge region 11 and the second edge region 12 of the display 10. When comparing with A of FIG. 4A, the user interface 20 is extended in a lengthwise direction to be displayed on the first edge region 11 and the second edge region 12. Accordingly, the size of the user interface 20 may be more increased in the lengthwise direction as compared with the case that the user interface 20 is first displayed on the first edge region 11. In this case, the electronic device 100 may provide, for a user, an effect such as that of extending the user interface 20 from the first edge region 11 of the electronic device 100 to the second edge region 12 of the electronic device 100.

According to another embodiment, the electronic device 100 may display the user interface 20 on the second edge region 12 after displaying the user interface 20 on the first edge region 11. In this case, the electronic device 100 may provide, for a user, an animation effect such as that of the user interface 20 moving from the first edge region 11 of the electronic device 100 to the second edge region 12 of the electronic device 100.

The effect that the user interface 20 is extended or move may be implemented in various manners. For example, the electronic device 100 may express an effect such as that of the user interface 20 moving by adjusting brightness, color, or an on/off state at a specific point of the display 10 using the DDI. According to another embodiment, the electronic device 100 may express an effect such as that of the user interface 20 moving by continuously displaying images of the user interface 20 having positions changed to be displayed on the display 10.

As described above, when displaying the user interface 20, the electronic device 100 may more enhance an effect such as that of the user interface 20 moving or extended by adding a gradation effect to the ending point 23 of the user interface 20 or by changing the color of the user interface 20 in a hue, brightness, or saturation.

In addition, the electronic device 100 may variously set a rate of displaying the user interface 20 on the second edge region 12 after displaying the user interface 20 on the first edge region 11. For example, the electronic device 100 may display the user interface 20 on the first edge region 11 and the second edge region 12 as illustrated in B of FIG. 4A after one sec. from the displaying of the user interface 20 on the first edge region 11 as illustrated in A of FIG. 4A.

The time interval between the changing of the user interface 20 and the displaying of the user interface 20 may be varied depending on user settings, the type of a signal received from an external device by the electronic device 100 or the type of an event occurring inside the electronic device 100.

According to another embodiment, the electronic device 100 may display the user interface 20 on the fourth edge region 14 after preset time from the displaying of the user interface 20 on the first edge region 11. In this case, the electronic device 100 may provide an effect such as that of the user interface 20 moving from the first edge region 11 of the electronic device 100 to the fourth edge region 14 of the electronic device 100.

According to another embodiment, the electronic device 100 may display the user interface 20 on the third edge region 13 and the fourth edge region 14 after displaying the user interface 20 on the third edge region 13. In this case, the electronic device 100 may provide, for a user, the same animation effect as that of extending the user interface 20 from the third edge region 13 to the fourth edge region 14 of the electronic device 100.

According to another embodiment, the electronic device 100 may simultaneously or sequentially display a plurality of user interfaces on a plurality of regions. For example, the electronic device 100 may display the first user interface on the first edge region 11 and may display the second user interface on the third edge region 13. In addition, after preset time elapses, the electronic device 100 may display the first user interface on the first edge region 11 and the second edge region 12 and may display the second user interface on the third edge region 13 and the fourth edge region 14.

In this case, the electronic device 100 may provide, for a user, effects such as that of extending the first user interface from the first edge region 11 of the electronic device 100 to the second edge region 12 of the electronic device 100, and of extending the second user interface from the third edge region 13 of the electronic device 100 to the fourth edge region 14 of the electronic device 100.

Figure 4B:
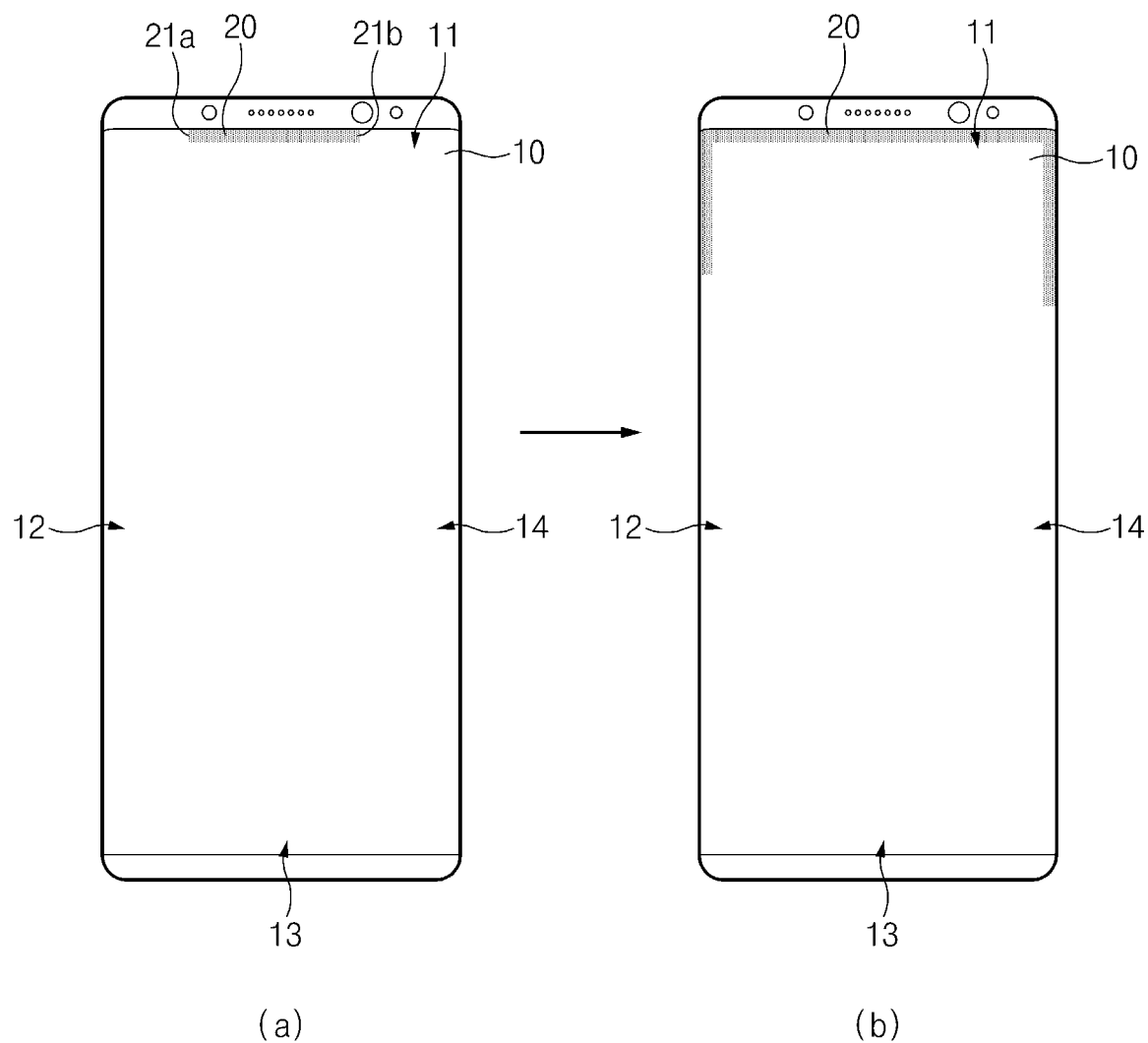

Referring to object (a) of FIG. 4B, according to an embodiment, the user interface 20 may include a plurality of starting points 21a and 21b. In other words, the user interface 20 may proceed in a plurality of directions.

Referring to object (b) of FIG. 4B, the electronic device 100 may display the user interface 20 on the first edge region 11, the second edge region 12, and the fourth edge region 14 of the display 10. When comparing with (A) of FIG. 4B, the user interface 20 is extended in both lengthwise directions to be displayed on the first edge region 11, the second edge region 12, and the fourth edge region 14. Accordingly, the size of the user interface 20 may be more increased in the lengthwise directions as compared with the case that the user interface 20 is first displayed on the first edge region 11. In this case, the electronic device 100 may provide, for a user, an effect such as that of extending the user interface 20 from the first edge region 11 of the electronic device 100 to the second edge region 12 and the fourth edge region 14 of the electronic device 100.

According to another embodiment, the electronic device 100 may display the user interface 20 on the third edge region 13, the second edge region 12 and the fourth edge region 14 after displaying the third edge region 13. In this case, the electronic device 100 may provide, for a user, an effect such as that of extending the user interface 20 from the third edge region 13 of the electronic device 100 to the second edge region 12 and the fourth edge region 14 of the electronic device 100.

Figure 4C:
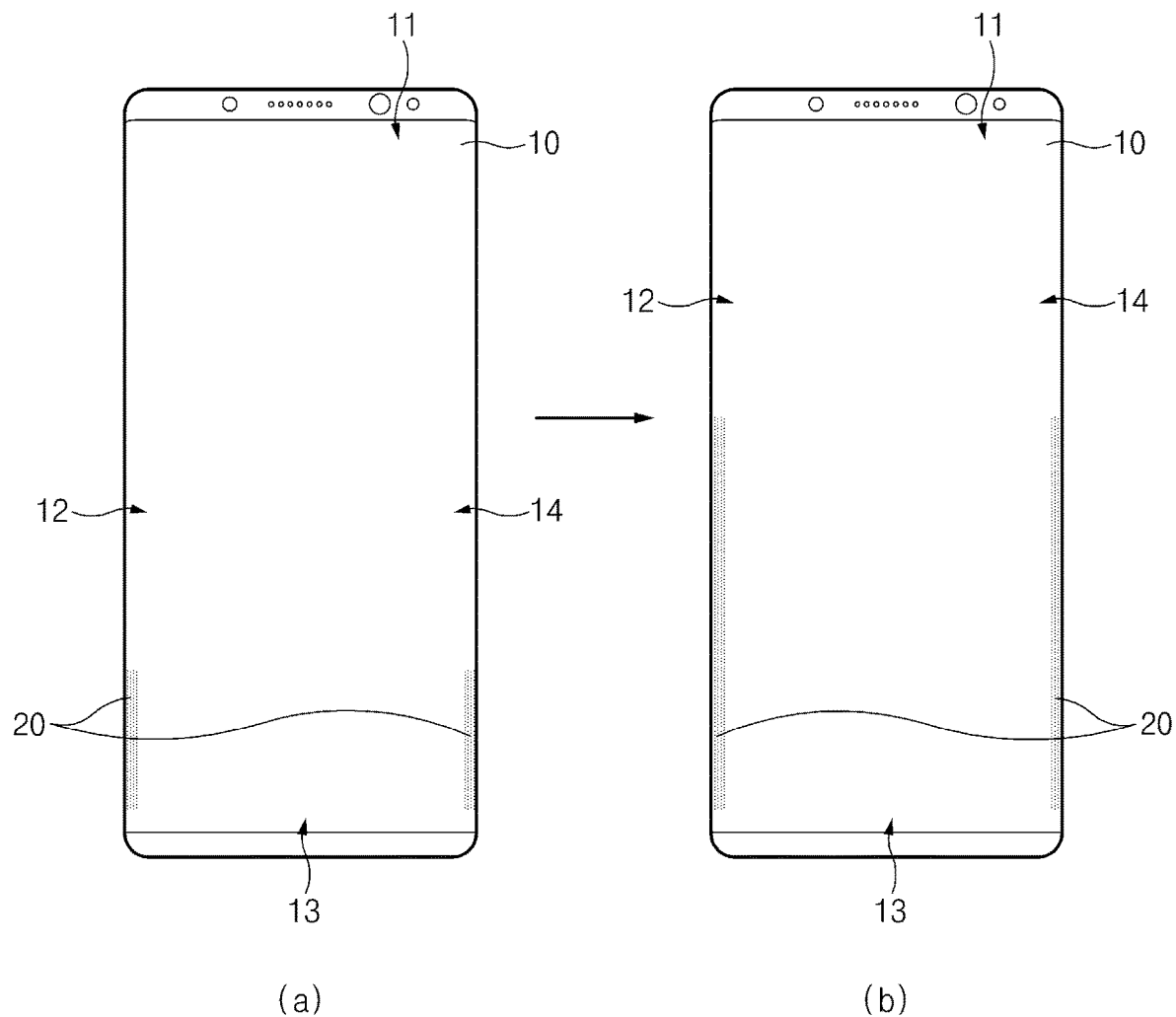

Referring to object (a) of FIG. 4C, the electronic device 100 may display the user interface 20 on the second edge region 12 and the fourth edge region 14 of the display 10. The displaying of the user interface 20 may be started from lower ends of the second edge region 12 and the fourth edge region 14.

Referring to object (b) of FIG. 4C, the electronic device 100 may display the user interface 20 on the second edge region 12 and the fourth edge region 14 of the display 10. When comparing with A of FIG. 4C, the user interface 20 may be displayed on the second edge region 12 and the fourth edge region 14 while being extended in the lengthwise direction. Accordingly, the size of the user interface 20 may be more increased in the lengthwise direction as compared with the case that the user interface 20 is first displayed. In this case, the electronic device 100 may provide, for the user, an effect such as that of extending the user interface 20 from the lower ends of the second edge region 12 and the fourth edge region 14 of the electronic device 100 to upper ends of the second edge region 12 and the fourth edge region 14 of the electronic device 100.

According to another embodiment, the user interface 20 may be displayed while moving up and then down along the second edge region 12 and the fourth edge regions 14 of the electronic device 100.

According to another embodiment, the user interface 20 may be displayed from the upper ends of the second edge region 12 and the fourth edge region 14 toward the lower ends of the second edge region 12 and the fourth edge region 14 while the length of the user interface 20 is increased.

Figure 4D:
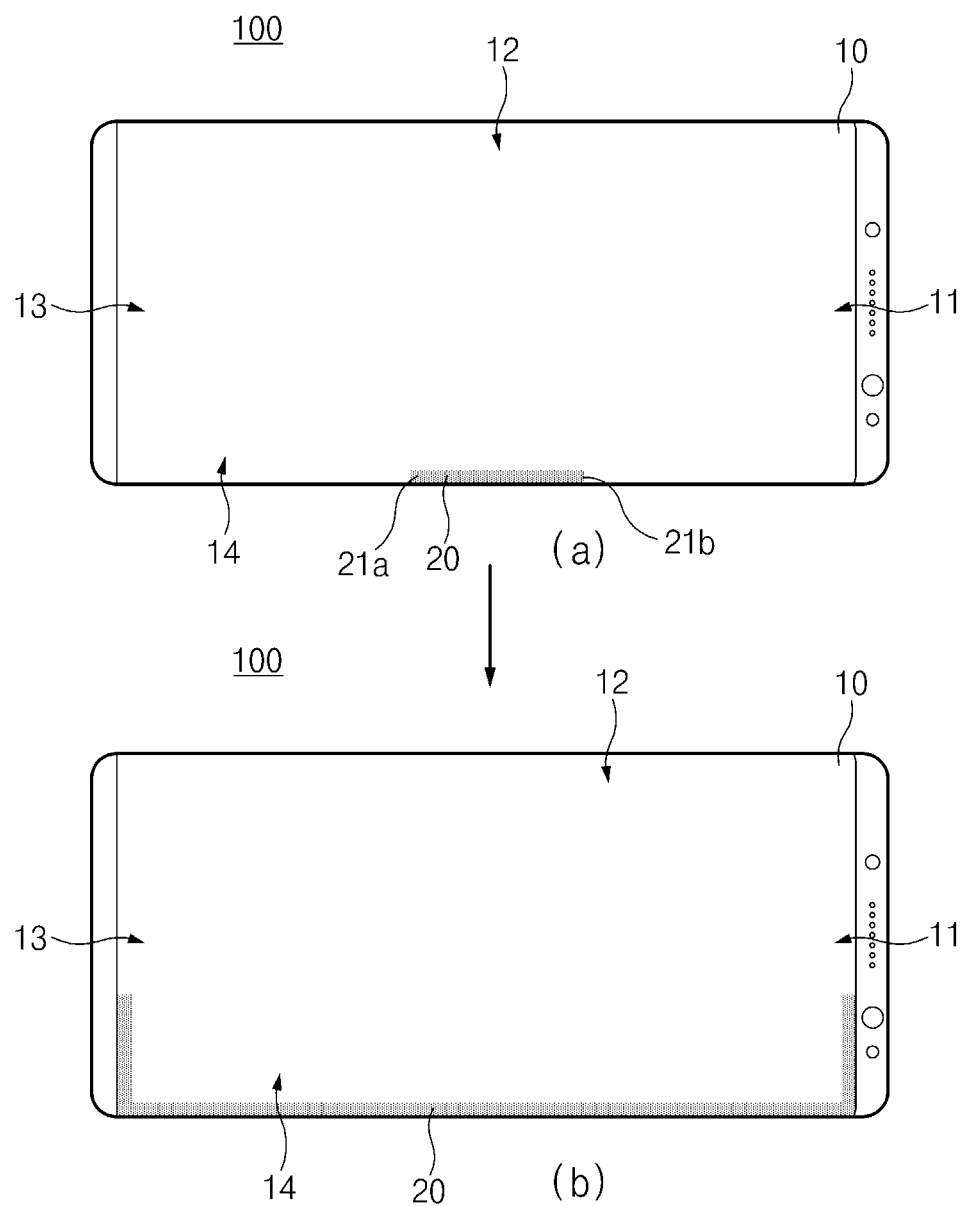

Referring to object (a) of FIG. 4D, the electronic device 100 may be in a widthwise view state. The widthwise view state may be referred to as "landscape mode" and a lengthwise view state may be referred to as "portrait mode".

According to another embodiment, the electronic device 100 may detect whether the electronic device 100 is in the landscape mode or the portrait mode by using a sensor, such as a gyro sensor, an acceleration sensor, or the like, which is included in the electronic device 100 and related to a posture of the electronic device 100. The electronic device 100 may adjust a position for starting the user interface 20 based on the state of the electronic device 100. For example, if the electronic device 100 detects that the electronic device 100 is in the landscape mode, the electronic device 100 may change the user interface 20 which starts to be displayed from a lower end of the display 10 in the portrait mode such that the user interface 20 starts to be displayed from the lower end of the display 10 in the landscape mode.

In detail, the electronic device 100, which recognizes that the electronic device 100 is in the landscape mode by using the sensor related to the posture, may display the user interface 20 on the fourth edge region 14 of the display 10. The displaying of the user interface 20 may be started from the central part of the fourth edge region 14. According to an embodiment, the user interface 20 may include a plurality of starting points 21*a* and 21*b*. In other words, the user interface 20 may proceed in a plurality of directions.

Referring to object (b) of FIG. 4D, the electronic device 100 may display the user interface 20 on the fourth edge region 14, the first edge region 11, and the third edge region 13 of the display 10. When comparing with (A) of FIG. 4D, the user interface 20 is extended in a plurality of lengthwise directions to be displayed on the first edge region 11, the third edge region 13, and the fourth edge region 14. Accordingly, the size of the user interface 20 may be more increased in the lengthwise direction as compared with the case that the user interface 20 is first displayed on the fourth edge region 14. In this case, the electronic device 100 may provide, for a user, an effect such as that of extending the user interface 20 from the fourth edge region 14 of the display 10 to the first edge region 11 and the third edge region 13 of the display 10.

According to another embodiment, the electronic device 100 may display the user interface 20 on the first edge region 11, the second edge region 12, and the third edge region 13, after displaying the user interface 20 on the second edge region 12. In this case, the electronic device 100 may provide, for a user, an effect such as that of extending the user interface 20 from the second edge region 12 of the electronic device 100 to the third edge region 13 and the first edge region 11 of the electronic device 100.

Figure 4E:
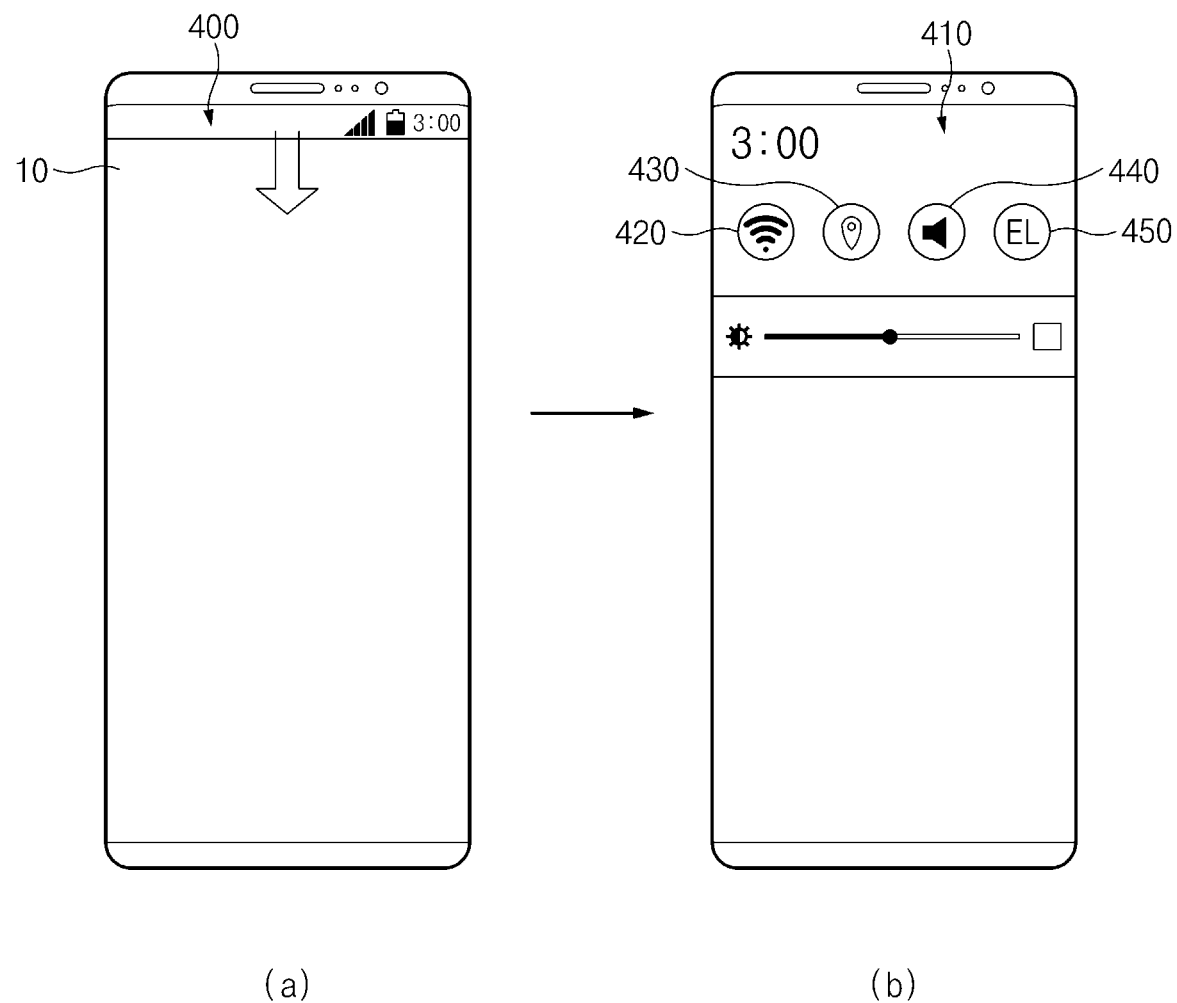
FIGS. 4E and 4F illustrate detailed settings of a user interface function and a function activation manner in the electronic device, according to an embodiment of the present disclosure.
Figure 4F:
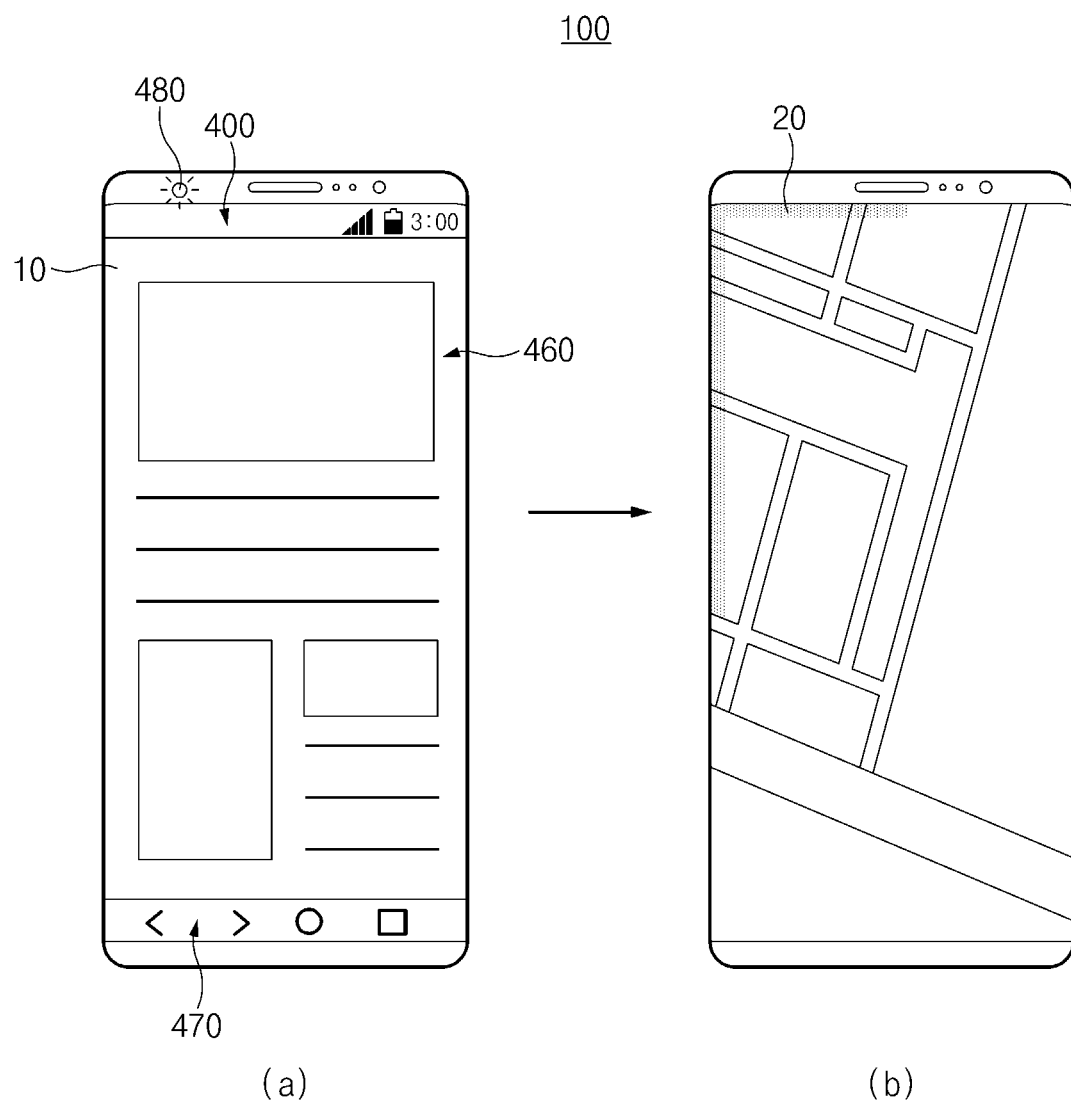

FIGS. 4E and 4F illustrate detailed settings of a user interface function and a function activation manner in the electronic device, according to an embodiment of the present disclosure.

Referring to object (a) of FIG. 4E, the electronic device 100 may display a notification bar 400 on an upper end of the display 10. The notification bar 400 may display, for example, current time, communication signal strength, a notification mode state, or the like.

Referring to object (b) of FIG. 4E, the electronic device 100 may display a notification window 410 formed by extending the notification bar 400 based on a user input of dragging the notification bar 400 toward the lower end of the display 10.

The electronic device 100 may display, on the notification window 410, a Wi-Fi activation icon 420, a global positioning system (GPS) activation icon 430, a notification mode switching icon 440, or a user interface activation icon 450. However, the present disclosure is not limited thereto, but the notification window 410 may display icons for activating or deactivating various functions of the electronic device 100.

According to an embodiment, the electronic device 100 may activate or deactivate a function of the user interface (e.g., the user interface 20 of FIGS. 1A to 1C), which has been described with reference to FIGS. 1 A to 1C, based on a user input of touching the user interface activation icon 450.

According to another embodiment, the electronic device 100 may adjust the detailed settings for the function of the user interface (e.g., the user interface 20 of FIGS. 1A to 1C) described above, based on the user input of touching the user interface activation icon 450 for time longer than preset time. For example, the electronic device 100 may display, on the display 10, a setting window for selecting an application to which the user interface is applicable. In addition, the electronic device 100 may display, on the display 10, a setting window for setting the color, the starting position, the display duration, or the like of the user interface.

Referring to object (a) of FIG. 4F, the electronic device 100 may display a web browser 460 on the display 10. The electronic device 100 may display the notification bar 400 on the upper end of the display 10 and may display a soft button 470 on a lower end of the display 10. The soft button 470 may include, for example, an application display icon, which has been used recently, a home screen display icon, or the like.

According to an embodiment, the electronic device 100 may display notification by using a lighting emitting diode (LED) 480 without displaying the user interface (e.g., the user interface 20 of FIGS. 1 A to 1C) on the edge region of the display 10 in the state that the notification bar 400 or the soft button 470 is displayed. However, the present disclosure is not limited thereto. For example, a user may make settings to always create a user interface.

Referring to object (b) of FIG. 4F, the electronic device 100 may display an image or a moving picture on the display 10. According to an embodiment, in the case that the electronic device 100 displays the image or the moving picture on the display 10, the electronic device 100 may display the image or the moving picture on the full region of the display 10. In other words, in the case that the electronic device 100 displays the image or the moving picture, the electronic device 100 may display neither the notification bar 400 nor the soft button 470, which is described with reference to (A) of FIG. 4F, to enhance the involvement of the user with the image or the moving picture.

According to an embodiment, in the case that the electronic device 100 displays a specific application or reproduces content using the full region of the display 10 without displaying the notification bar 400 or the soft button 470, the user interface 20 may be automatically activated. In other words, if the electronic device 100 operates in a full screen mode, the user interface 20 may be automatically activated.

According to another embodiment, the electronic device 100 may change the activation state of the user interface 20 depending on the type of the application. For example, in the case that an application, which is currently executed, is preset to always activate the user interface 20, the electronic device 100 may display the user interface 20. In addition, in the case that the application, which is currently executed, is preset to always deactivate the user interface 20, the electronic device 100 may display notification through an additional manner (e.g., light emitting of an LED, vibration, sound, or the like).

Figure 5A:
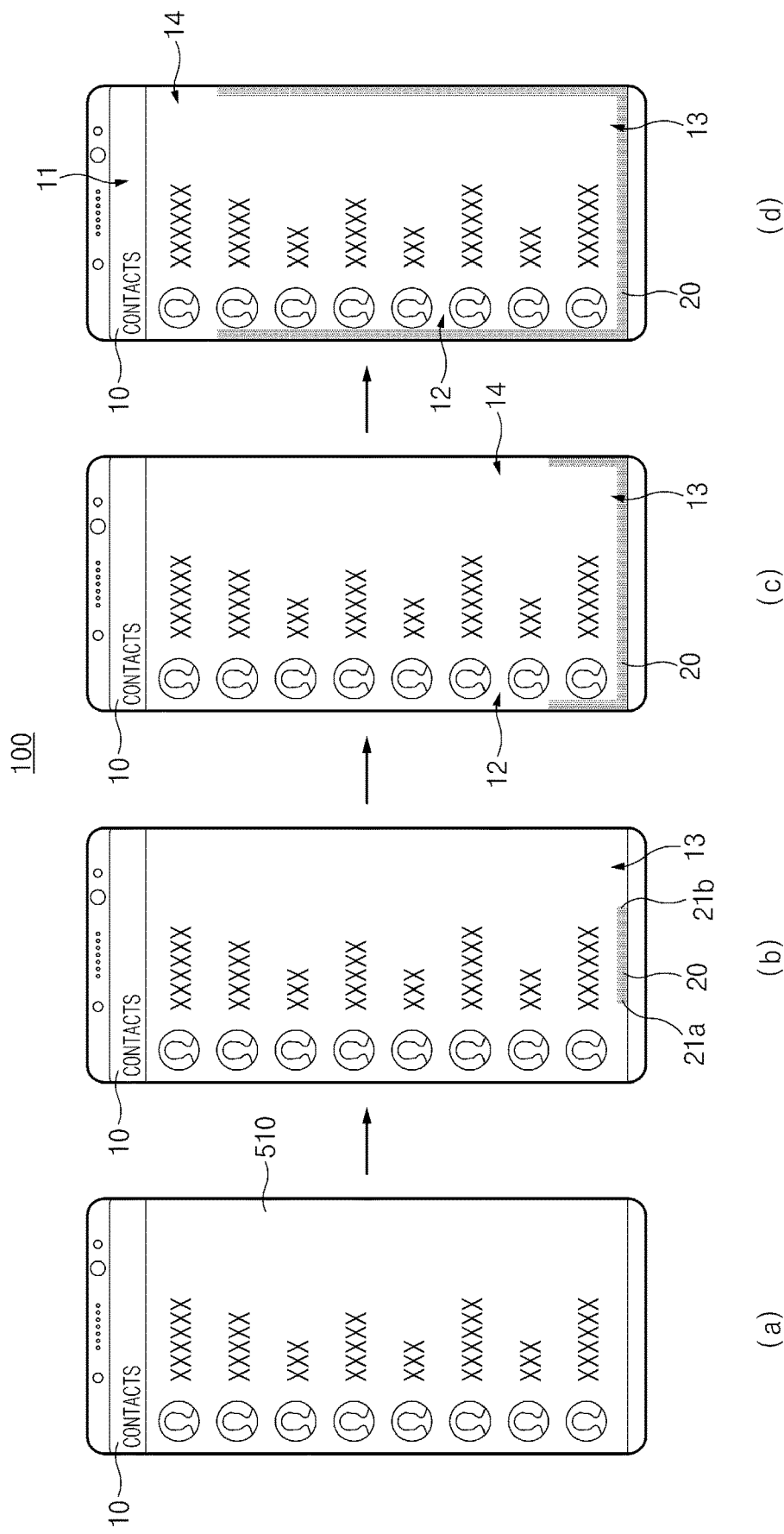
FIGS. 5A and 5B illustrate situations that the electronic device displays a user interface or content, according to an embodiment of the present disclosure.
Figure 5B:
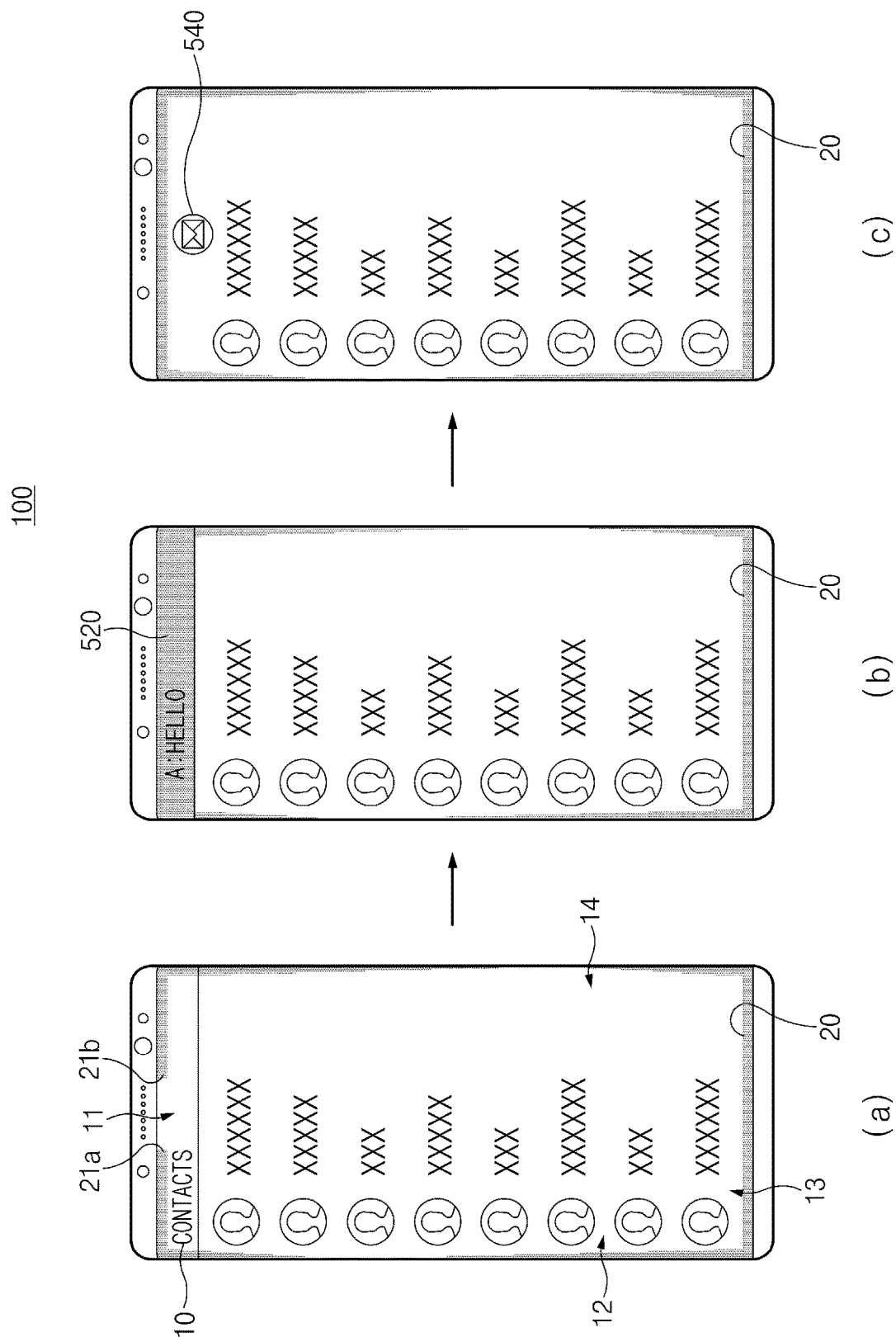

FIGS. 5A and 5B illustrate situations that the electronic device displays a user interface or content, according to an embodiment of the present disclosure.

Referring to object (a) of FIG. 5A, the electronic device 100 may display a contact application 510 on the display 10.

Referring to object (b) of FIG. 5A, the electronic device 100 may receive a signal from an external device and may display the user interface 20 corresponding to the signal. The electronic device 100 may display the user interface 20 on the central part of the third edge region 13 of the display 10. However, the position at which the user interface 20 is first displayed is not limited thereto. The user interface 20 may include a plurality of starting points 21a and 21b.

Referring to object (c) of FIG. 5A, the electronic device 100 may display the user interface 20 on the third edge region 13, the second edge region 12, and the fourth edge region 14 of the display 10. In other words, the user interface 20 may be extended from the third edge region 13 to the second edge region 12 and the fourth edge region 14.

Referring to object (d) of FIG. 5A, the electronic device 100 may display the user interface 20 on the third edge region 13, the second edge region 12, and the fourth edge region 14 of the display 10. As time elapses, the user interface 20 may more be extended toward the first edge region 11 from the second edge region 12 and the fourth edge region 14.

Referring to object (a) of FIG. 5B, the electronic device 100 may display the user interface 20 on the first edge region 11, the second edge region 12, the third edge region 13, and the fourth edge region 14 of the display 10. As time elapses, the user interface 20 may be more extended from the second edge region 12 and the fourth edge region 14 of the display 10 to the first edge region 11 of the display 10.

The electronic device 100 may differently display a part of the user interface 20. For example, the electronic device 100 may differently adjust the widths of parts of the user interface 20, which are to be displayed on the second edge region 12 and the fourth edge region 14. Accordingly, the electronic device 100 may more emphasize the effect that the user interface 20 is extended from the second edge region 12 and the fourth edge region 14 to the first edge region 11.

Referring to object (b) of the FIG. 5B, if the starting points 21a and 21b of the user interface 20 meet together in the first edge region 11, the electronic device 100 may display message content 520 (or a part of the message content 520), which is included in the received signal, adjacent to the first edge region 11. However, the present disclosure is not limited thereto. The electronic device 100 may display the received message content 520 on another region, such as the central part of the display 10.

In this case, in the case that a user touches or touches and drags the message content 520 displayed on the display 10, the electronic device 100 may execute a message application and may display the message content.

According to an embodiment, the electronic device 100 may express the background of the received message content 520 and the user interface 20 in the same color. However, the present disclosure is not limited thereto. In other words, the electronic device 100 may express the background of the part of the received message content 520 and the user interface 20 in mutually different colors. In addition, the electronic device 100 may apply an image effect only to one of the background of the part of the received message content 520 and the user interface 20.

Referring to object (c) of FIG. 5B, the electronic device 100 may display an execution object 540 representing a message application. For example, the electronic device 100 may display the execution object 540 representing the message application after terminating the displaying of the message content 520.

According to an embodiment, the execution object 540 representing the message application is displayed while moving up and down, or left and right, thereby notifying a message receiving state to a user. The electronic device 100 may execute the message application based on a user input of selecting the execution object 540 representing the message application.

According to another embodiment, the electronic device 100 may display the message content 520 as illustrated in B of FIG. 5B, after displaying the execution object 540 representing the message application. Alternatively, the electronic device 100 may simultaneously display the execution object 540 representing the message application and the message content 520.

According to another embodiment, the user interface 20 may be continuously displayed while the electronic device 100 is displaying the execution object 540 representing the message application or the message content 520. In the case, the electronic device 100 may change the color of the user interface 20 or may change a hue, brightness, saturation, or the like belonging to the color of the user interface 20. In addition, the electronic device 100 may apply various effects, such as the displaying of the user interface 20 while blinking the user interface 20, to the user interface 20. However, the present disclosure is not limited thereto. The electronic device 100 may terminate the displaying of the user interface 20 if the execution object 540 representing the message application or the message content 520 is displayed.

According to various embodiments, in the case that the electronic device 100 receives an incoming call, the electronic device 100 may display the user interface 20 and an execution object (not illustrated) representing the incoming call until a user answers the incoming call. In this case, the electronic device 100 may change the position, the color of the execution object, and an image effect applied to the user interface 20 by reflecting the elapse of time until the user answers the incoming call and may change the image effect for the user interface 20.

According to another embodiment, the electronic device 100 may sequentially terminate the displaying of the user interface 20 after terminating the displaying of the execution object 540 representing the message application or the message content 520.

As described above, the electronic device 100 may display, on the display 10, the user interface 20, which is displayed in relation to a message generated inside the electronic device 100 or a message generated from an external device, the message content 520, or the execution object 540 representing the message application, which has generated the message, and may terminate the displaying of the user interface 20, the message content 520, or the execution object 540, in various sequences and manners.

Figure 6A:
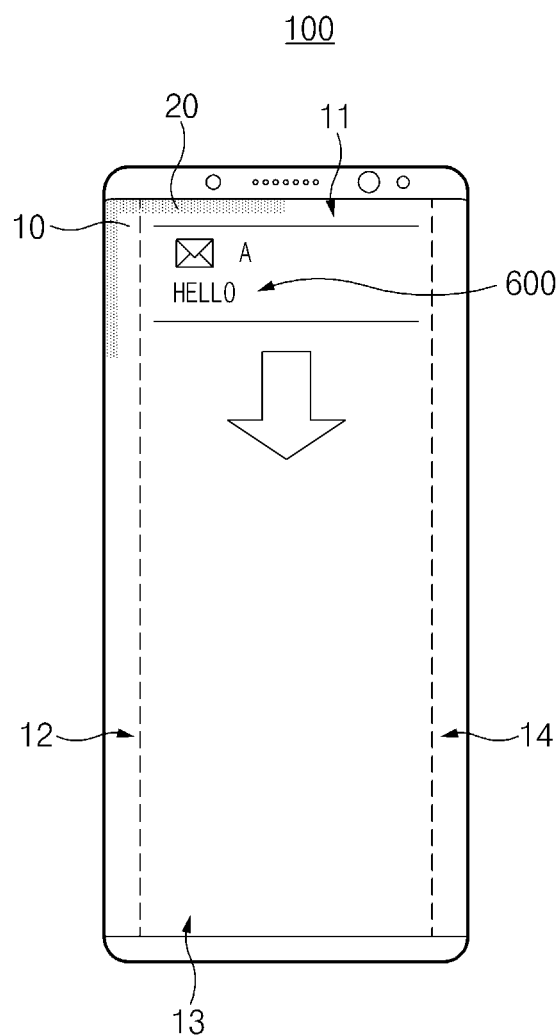
FIGS. 6A, 6B, and 6C illustrate the situation that the electronic device adjusts the starting position of the user interface depending on the type of the signal according to an embodiment of the present disclosure.
Figure 6B:
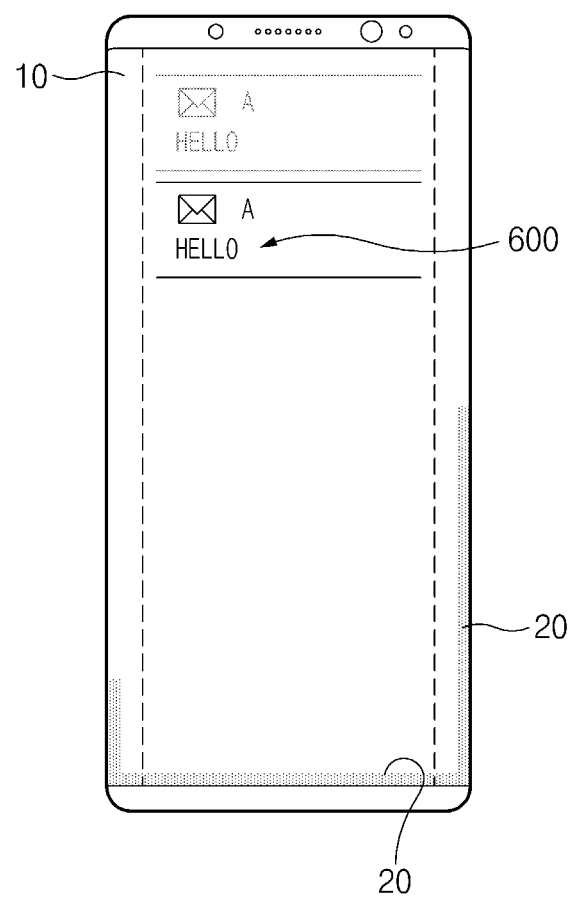
Figure 6C:
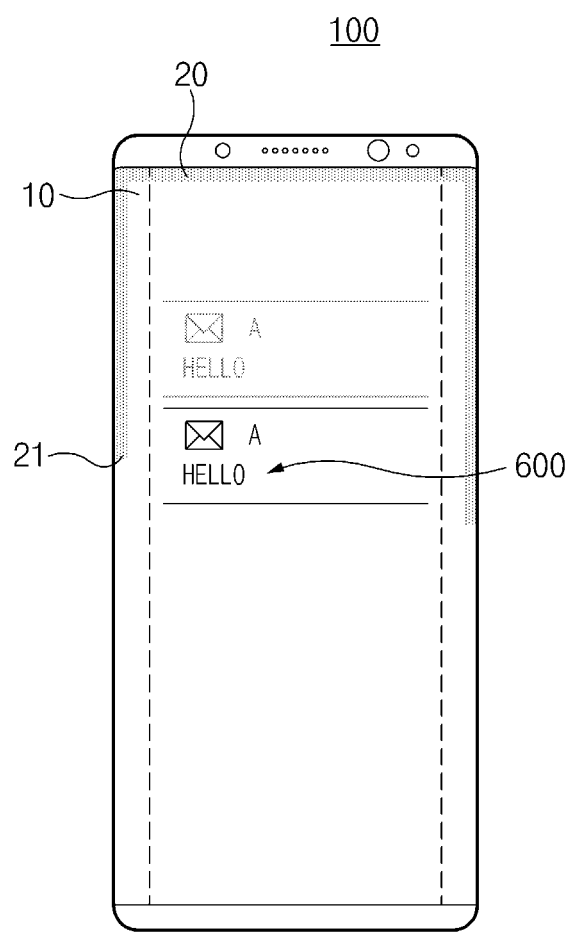

FIGS. 6A to 6C illustrate the situation that the electronic device adjusts the starting position of the user interface depending on the type of the signal according to an embodiment of the present disclosure.

Referring to FIGS. 6A to 6C, the electronic device 100 may display, on the upper end of the display 10, a message, which is created corresponding to a signal received from an external device, for example, a text message, a received call, a received social networking service (SNS), or a message created by a wearable electronic device having established the communication relation with the electronic device 100. In addition, corresponding to the displaying of the above message, the electronic device 100 may display the user interface 20 from the edge region adjacent to the upper end of the display 10.

In addition, the electronic device 100 may display, on the lower end of the display 10, a message, which is related to an internal system state change of the electronic device 100, a preset alarm, or health information (e.g., the number of steps, a moving distance, or the like) measured by the electronic device 100, generated inside the electronic device 100. In addition, corresponding to the displaying of the above message, the electronic device 100 may display the user interface 20 from the edge region adjacent to the lower end of the display 10.

Referring to FIG. 6A, the electronic device 100 may display a message 600 received from an external device on the upper end of the display 10. Dotted lines, which are displayed at both sides of the display 10, represent that a curved display is formed in the relevant region. The dotted lines in the following drawings represent the same meaning. The electronic device 100 may display the user interface 20 on the first edge region 11 of the display 10. The electronic device 100 may display the message 600 after displaying the user interface 20. Alternatively, the electronic device 100 may display the user interface 20 after displaying the message 600. In addition, the electronic device 100 simultaneously displays the user interface 20 and the message 600.

Referring to FIG. 6B, the electronic device 100 may move the message 600 displayed on the upper end of the display 10 and display the message 600. The message 600 may be moved by a preset distance toward the lower end of the display 10 and displayed. In this case, the electronic device 100 may provide an effect such as that of moving the message 600 by displaying the message 600 in a blurred manner at a message position of FIG. 6A.

According to an embodiment, the electronic device 100 may simultaneously or sequentially change the display position of the user interface 20 and the display position of the message 600. For example, the electronic device 100 may extend the user interface 20, which is displayed on the first edge region 11 and the second edge region 12, in the lengthwise direction while displaying the user interface 20 on the second edge region 12, the third edge region 13, and the fourth edge region 14. Accordingly, the electronic device 100 may provide an effect such as that of extending or moving the user interface 20 from the first edge region 11 to the fourth edge region 14.

Referring to FIG. 6C, the electronic device 100 may more move the message 600 toward the lower end of the display 10 and display the message 600. Simultaneously or sequentially, the electronic device 100 may extend the user interface 20 to display the user interface 20 on the fourth edge region 14, the first edge region 11, and the second edge region 12 of the display 10.

According to an embodiment, the electronic device 100 may display the message 600 at a preset position and not move the message 600 any more for displaying the message 600. In this case, the electronic device 100 may display the user interface 20 such that the starting point 21 of the user interface 20 is positioned adjacent to the position at which the message 600 is displayed.

In other words, the electronic device 100 may start the displaying of the message 600 received from the outside from the upper end of the display 10 and may display the message 600 while gradually moving to a preset position toward the lower end of the display 10. In addition, simultaneously or sequentially, the electronic device 100 may start the displaying of the user interface 20 from the edge region adjacent to the upper end of the display 10, may move the user interface 20 along the edge region clockwise or counterclockwise, and then may display the starting point 21 of the user interface 20 adjacent to the position at which the message 600 is displayed, thereby informing the reception of notification to a user.

According to another embodiment, the electronic device 100 may start the displaying of a message, which is generated corresponding to an event occurring inside the electronic device 100, from the lower end of the display 10. Similarly, the electronic device 100 may start the displaying of the user interface 20 from the edge region adjacent to the lower end of the display 10, may move the user interface 20 along the edge region clockwise or counterclockwise, and then may display the starting point 21 of the user interface 20 adjacent to the position at which the message is displayed, thereby informing the message generation to the user.

According to an embodiment, the electronic device 100 may repeat the above operation until a signal representing that a user selects the message is input.

Figure 7A:
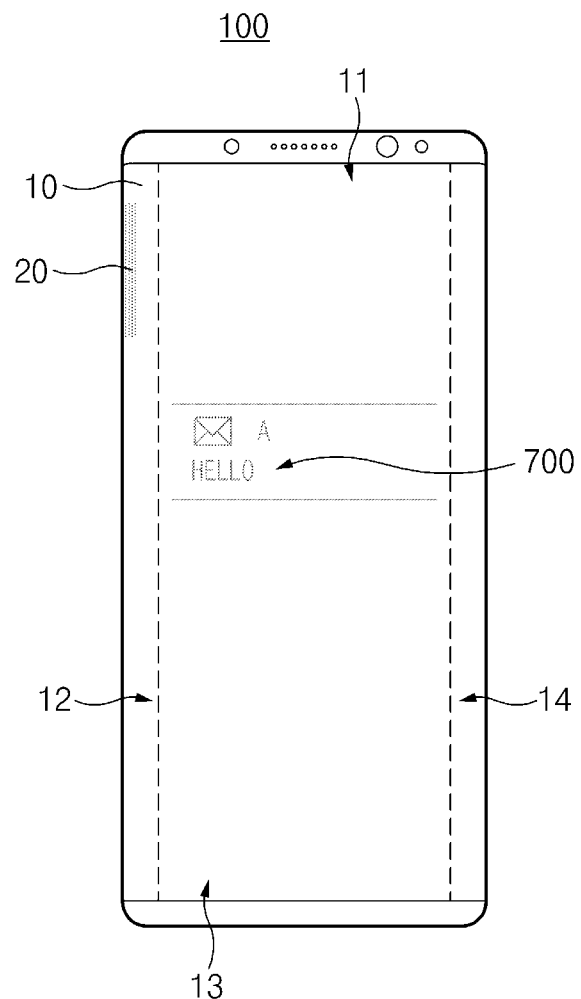
FIGS. 7A, 7B, and 7C illustrate the situation that the electronic device displays a message using a part of the edge region of the display, according to an embodiment of the present disclosure.
Figure 7B:
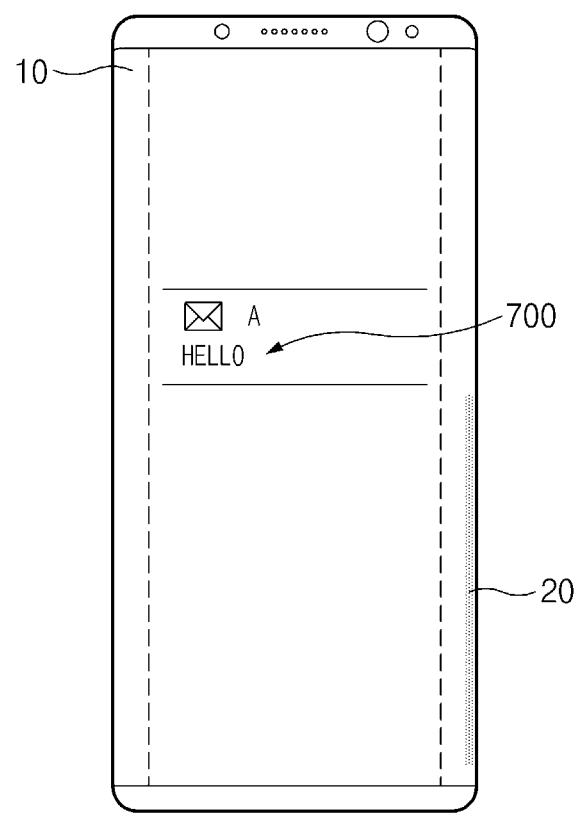
Figure 7C:
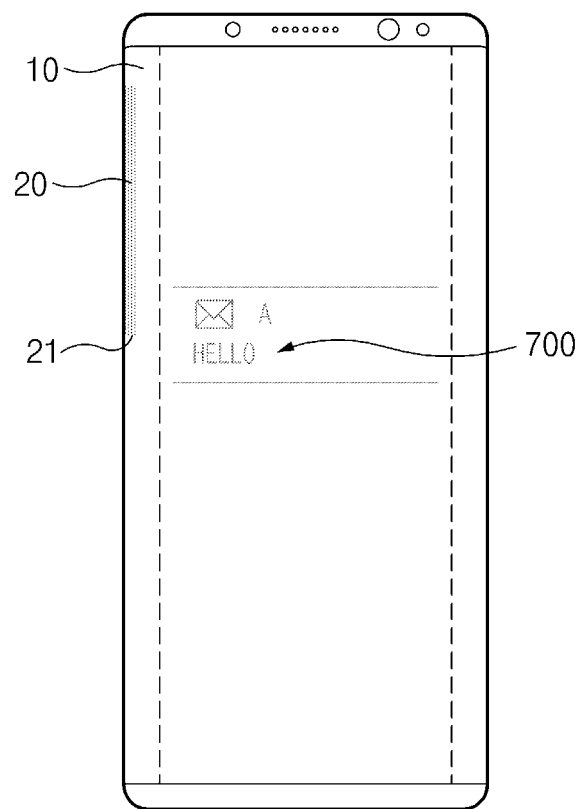

FIGS. 7A to 7C illustrate the situation that the electronic device displays a message using a part of the edge region of the display, according to an embodiment of the present disclosure.

Referring to FIG. 7A, if the electronic device 100 receives a signal from an external device, the electronic device 100 may display a message 700 and the user interface 20, which correspond to the received signal, on the display 10. For example, the electronic device 100 may start the displaying the message 700 from a preset position of the display 10 in a blurring manner. Simultaneously or sequentially, the electronic device 100 may display the user interface 20 on the upper end of the second edge region 12 of the display 10. The user interface 20 may be displayed as if the displaying of the user interface 20 is started from the upper end of the second edge region 12 and the user interface 20 moves while the length of the user interface 20 is extended toward the lower end of the second edge region 12.

Referring to FIG. 7B, the electronic device 100 may clearly display the message 700 at a preset position of the display 10. Simultaneously or sequentially, the electronic device 100 may terminate the displaying of the user interface 20 on the second edge region 12 of the display 10 and display the user interface 20 on the lower end of the fourth edge region 14. The user interface 20 may be displayed as if the displaying of the user interface 20 is started from the lower end of the fourth edge region 14 and the user interface 20 moves while the length of the user interface 20 is extended toward the upper end of the fourth edge region 14.

Referring to FIG. 7C, the electronic device 100 may display the message 700 again in the blurring manner. Simultaneously or sequentially, the electronic device 100 may terminate the displaying of the user interface 20 on the fourth edge region 14 of the display 10 and display the user interface 20 on the second edge region 12. In this case, the electronic device 100 may display the starting point 21 of the user interface 20 adjacent to the position at which the message 700 is displayed.

According to an embodiment, the electronic device 100 may repeat the above operation until a signal representing that a user selects the message is input.

Figure 8A:
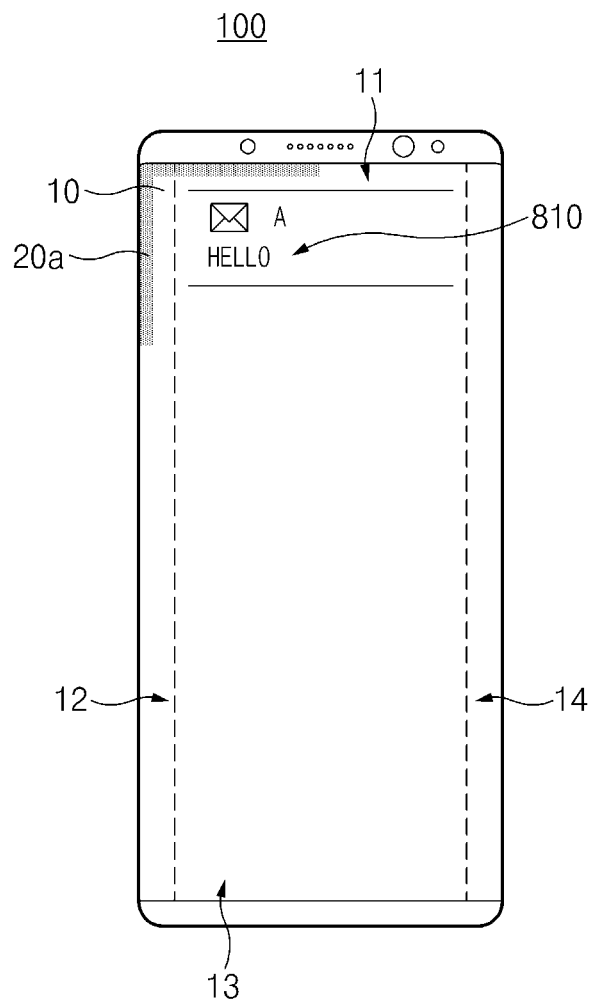
FIGS. 8A, 8B, and 8C illustrate the situation that the electronic device receives a plurality of signals to display a user interface, according to an embodiment of the present disclosure.
Figure 8B:
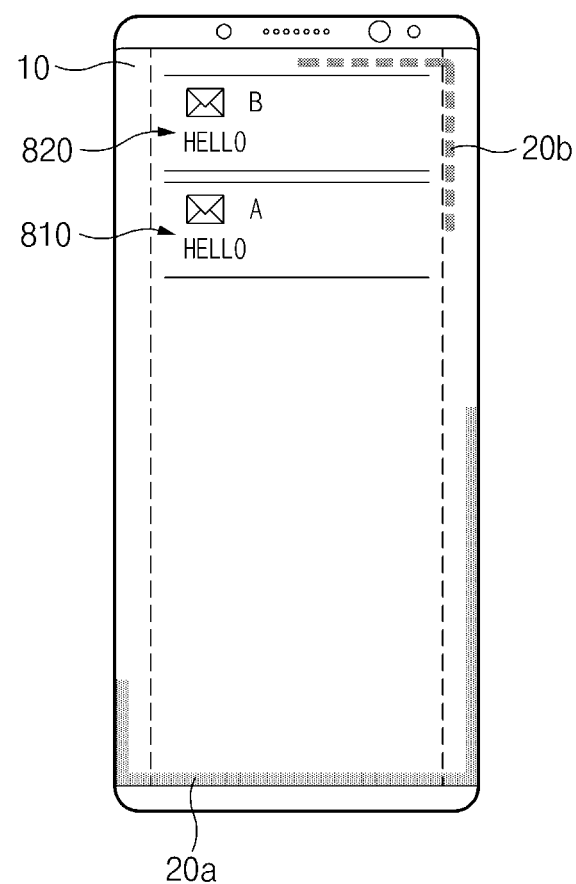
Figure 8C:
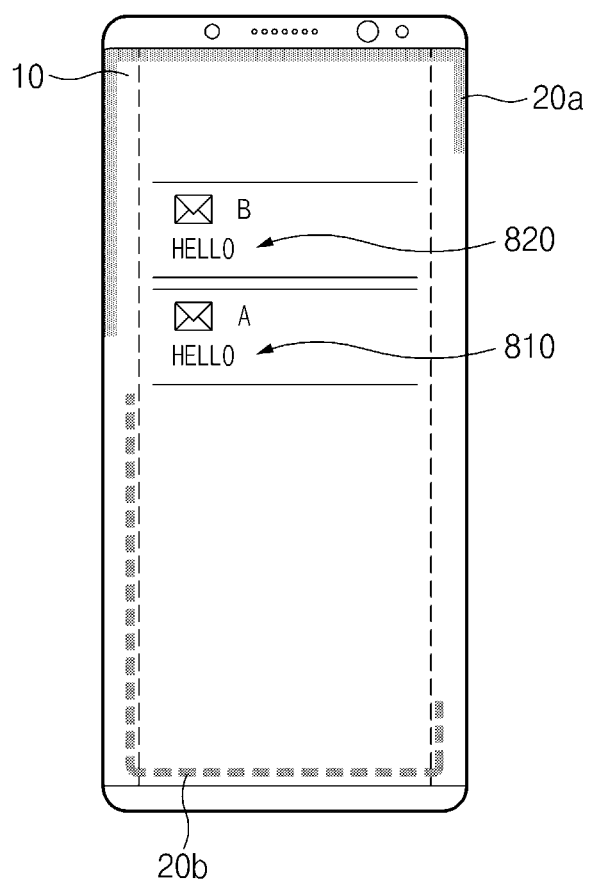

FIGS. 8A to 8C illustrate the situation that the electronic device receives a plurality of signals and displays user interfaces, according to an embodiment of the present disclosure.

According to an embodiment, when the electronic device 100 receives a plurality of signals and displays user interfaces, the electronic device 100 may display the user interfaces while distinguishing the user interfaces from each other. For example, the electronic device 100 may display the user interfaces in mutually different colors or may display the user interfaces different in a hue, saturation, or brightness even if the user interfaces are expressed in the same color. In addition, the electronic device 100 may display the user interfaces in mutually different proceeding directions. However, the present disclosure is not limited thereto. In other words, the electronic device 100 may distinguish the user interfaces from each other in various manners.

Referring to FIG. 8A, the electronic device 100 may display a first message 810, which corresponds to a first signal received from an external device, on the upper end of the display 10. The first message 810 may be received from, for example, an electronic device of 'A'. Simultaneously or sequentially, the electronic device 100 may display a first user interface 20a, which notifies the reception of the first message 810 to a user, on the first edge region 11 and the second edge region 12 adjacent to the upper end of the display 10.

Referring to FIG. 8B, the electronic device 100 may display a second message 820, which corresponds to a second signal received from an external device, on the upper end of the display 10. The second message 820 may be received from, for example, an electronic device of 'B'. Simultaneously or sequentially, the electronic device 100 may display a second user interface 20b, which notifies the reception of the second message 820 to the user, on the first edge region 11 and the fourth edge region 14 adjacent to the upper end of the display 10.

In this case, the electronic device 100 may display the first user interface 20a, which has been displayed on the first edge region 11 and the second edge region 12, on the second edge region 12 and sequentially display the first user interface 20a on the second edge region 12, the third edge region 13, and the lower end of the fourth edge region 14. In other words, the first user interface 20a may be displayed while moving counterclockwise from the first edge region 11 to the fourth edge region 14.

Referring to FIG. 8C, the electronic device 100 may move the first message 810 and the second message 820 toward the lower end of the display 10 and display the first message 810 and the second message 820. Simultaneously or sequentially, the electronic device 100 may display the first user interface 20a while moving the first user interface 20a counterclockwise along the edge region of the display 10, and may display the second user interface 20b while moving the second user interface 20b clockwise along the edge region of the display 10. In this case, the electronic device 100 may move and display the first user interface 20a and the second user interface 20b without overlapping with each other.

According to another embodiment, the electronic device 100 may display the first user interface 20a and the second user interface 20b such that the first user interface 20a and the second user interface 20b overlap with each other in a part of the display 10. The electronic device 100 may display the overlap part between the first user interface 20a and the second user interface 20b in color obtained by mixing the color of the first user interface 20a with the color of the second user interface 20b. If the overlap between the first user interface 20a and the second user interface 20b is released, the first user interface 20a and the second user interface 20b may be displayed in relevant color again.

According to various embodiments, the first message 810 and the second message 820 may be received from the electronic device of "A". Even in this case, the electronic device 100 may display the first user interface 20a and the second user interface 20b as described above.

However, the present disclosure is not limited thereto. For example, in the case that a plurality of messages is received from the electronic device of "A", all of the first user interface 20a and the second user interface 20b may be displayed while moving counterclockwise from the first edge region 11 to the fourth edge region 14. In addition, the electronic device 100 may display the first user interface 20a and the second user interface 20b in the same shape but in mutually different colors.

According to various embodiments, in the case of incoming messages from mutually different electronic devices and the case of the incoming messages from the same electronic device, the electronic device 100 may employ the above-described manners of displaying the user interface 20 by variously changing the manners or without changing the manner.

FIGS. 9A to 9D illustrate the situation that the electronic device displays the user interface based on the content of a signal or the content of an event, according to an embodiment of the present disclosure.

Referring to FIGS. 9A to 9D, the electronic device 100 may display the display interface differently based on the content of a signal received from the outside of the electronic device 100 or the content of a message generated inside the electronic device 100.

Figure 9A:
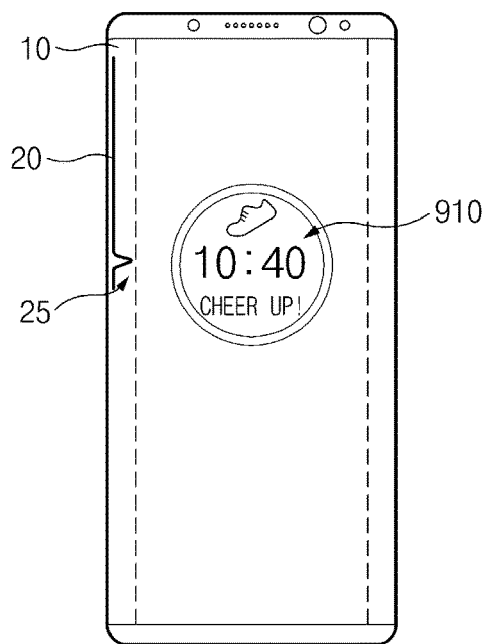
FIGS. 9A, 9B, 9C, and 9D illustrate the situation that the electronic device displays the user interface based on the content of a signal or the content of an event, according to an embodiment of the present disclosure.

Referring to FIG. 9A, the electronic device 100 may display a message related to health information on the display 10. For example, the electronic device 100 may recognize the walking of a user and may display a message 910 of requesting the user to keep on working out.

According to an embodiment, the electronic device 100 may display the user interface 20 in various colors depending on measured workout intensities of the user when displaying the message 910 related to the health information. The workout intensities may be determined based on, for example, the heart rate measured by the electronic device 100. For example, if the electronic device 100 recognizes lower workout strength, the electronic device 100 may display the user interface 20 in blue color. If the electronic device 100 recognizes higher workout strength, the electronic device 100 may display the user interface 20 in red color.

In addition, the electronic device 100 may adjust a height 25 of a line of the user interface 20 based on the measured heart rate.

Figure 9B:
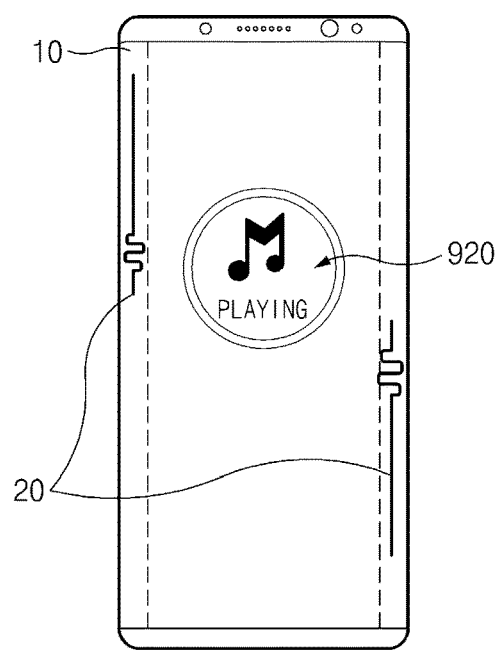

Referring to FIG. 9B, the electronic device 100 may display a message 920 related to music reproduction on the display 10. In this case, the electronic device 100 may change the color of the user interface 20 or adjust the height (amplitude), based on a beat, a frequency, or an output intensity of the music which is being reproduced.

Figure 9C:
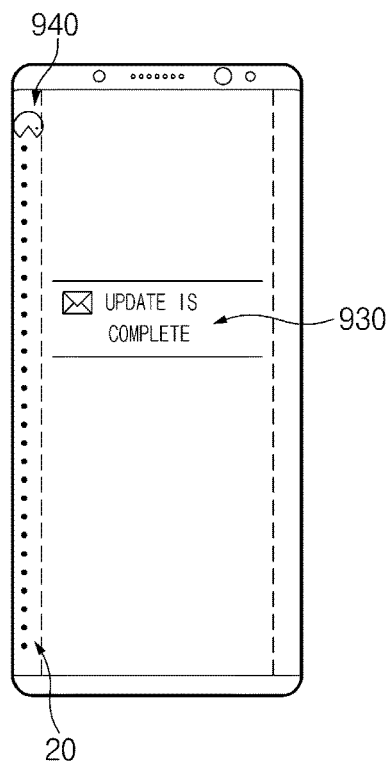

Referring to FIG. 9C, the electronic device 100 may display a message 930 related to a game on the display 10. For example, the electronic device 100 may display the message 930 that firmware for software of running the game is updated.

According to an embodiment, in the case that the electronic device 100 displays the message 930 related to the game, the electronic device 100 may display an execution object 940 related to the game on the user interface 20.

Figure 9D:
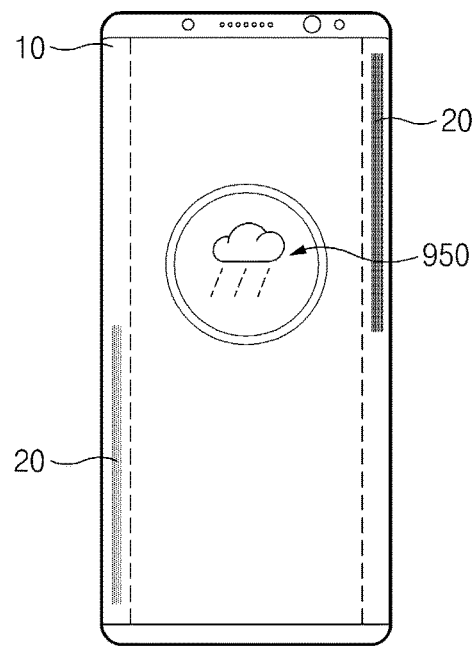

Referring to FIG. 9D, the electronic device 100 may display a message 950 related to weather on the display 10. For example, the electronic device 100 may display the message 950 related to current weather.

For example, in the case that the electronic device 100 displays the message 950 that it is raining, the electronic device 100 may express rain by adjusting a display position and a display rate of the user interface 20. For example, the electronic device 100 may display rain by alternately displaying the user interface 20 on the second edge region 12 and the fourth edge region 14.

In addition, in the case that the electronic device 100 displays a message (not illustrated) of expressing sunny weather, the electronic device 100 may display the user interface 20 in red color.

As described above, the electronic device 100 may display the user interface 20 based on the content of the message while changing attributes included in the user interface 20.

Figure 10A:
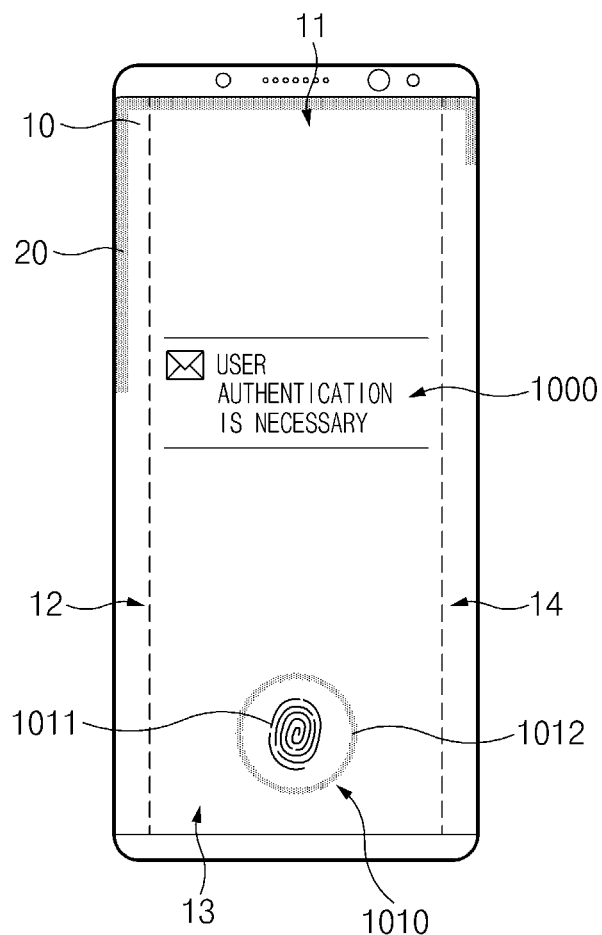
FIGS. 10A and 10B illustrate the situation that the electronic device displays the user interface and an image object while requesting bio-information of a user, according to an embodiment of the present disclosure.
Figure 10B:
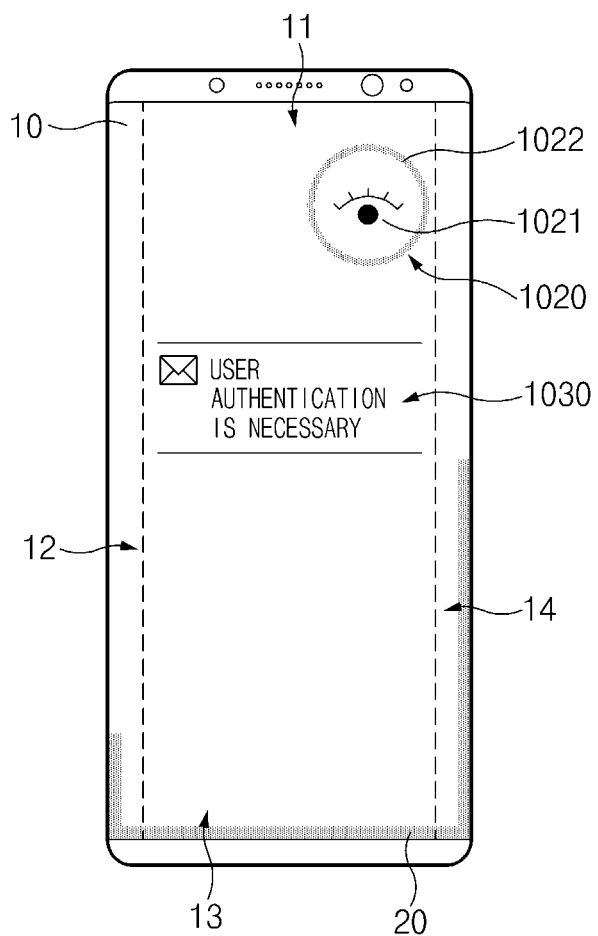

FIGS. 10A and 10B illustrate situations that the electronic device displays the user interface and an image object while requesting bio-information of a user, according to an embodiment of the present disclosure.

Referring to FIGS. 10A and 10B, the electronic device 100 may include a sensor module which is able to receive bio-information. For example, the electronic device 100 may include a module (capacitive/optical fingerprint sensor, or the like) for fingerprint recognition or a module (iris camera, or the like) for pupil recognition.

In the case that the fingerprint recognition module includes an optical sensor, the electronic device 100 may dispose the fingerprint recognition module under the display 10. In the case that the fingerprint recognition module includes the capacitive fingerprint sensor, the electronic device 100 may form the capacitive fingerprint sensor in one layer included in the display 10. In addition, the electronic device 100 may substitute the capacitive fingerprint sensor for some of pixels included in the display 10 for the use of the pixels.

According to an embodiment, the electronic device 100 may receive a message requiring biometrics from the outside of the electronic device 100 or may generate the message requiring biometrics inside the electronic device 100. The message requiring the biometrics may be, for example, a message generated from a security application. In addition, the electronic device 100 may identify the message requiring biometrics by analyzing information contained in the generated message. For example, in the case that the words of "user authentication" or "user verification" are contained in the content of the message, the electronic device 100 may determine the message as the message requiring biometrics.

The electronic device 100 may need bio-information to enter the wake-up mode from the sleep mode. In this case, the electronic device 100 may display, on the display 10, a user interface of requesting the bio-information and an object of informing a bio-information input position.

Referring to FIG. 10A, the electronic device 100 may receive a message 1000 requiring fingerprint authentication and may display the message 1000 on the display 10. The electronic device 100 may display the user interface 20, which is used to notify the reception of the message 1000, on the first edge region 11, the second edge region 12, and the fourth edge region 14. However, the position at which the user interface 20 is displayed is not limited thereto. In this case, the electronic device 100 may display a position, which allows fingerprint authentication, in the form of an image object 1010 on the display 10. The image object 1010 may be displayed to include a shape 1011 similar to that of a fingerprint displayed at the position allowing the fingerprint authentication and to allow a line 1012, which has the same color and thickness as those of the user interface 20, to surround the shape 1011 similar to that of the fingerprint.

Referring to FIG. 10B, the electronic device 100 may receive a message 1030 requiring pupil/iris authentication and may display the message 1030 on the display 10. The electronic device 100 may display the user interface 20, which is used to notify the reception of the message 1030, on the second edge region 12, the third edge region 13, and the fourth edge region 14. However, the position, at which the user interface 20 is displayed, is not limited thereto. In this case, the electronic device 100 may display a position, which allows pupil authentication, in the form of an image object 1020 on the display 10. The image object 1020 may be displayed to include a shape 1021 similar to that of a pupil displayed at the position allowing the pupil authentication and to allow a line 1022, which has the same color and thickness as those of the user interface 20 to surround the shape 1021 similar to that of the pupil.

According to various embodiments, the electronic device 100 may configure the user interface 20 to move along the first to fourth edge regions 11, 12, 13, and 14 of the electronic device 100, to create lines 1012 and 1022 at parts adjacent to image objects 1010 or 1020, to display the lines 1012 and 1022, and then to be displayed on the first to fourth edge regions 11, 12, 13, and 14.

Figure 11A:
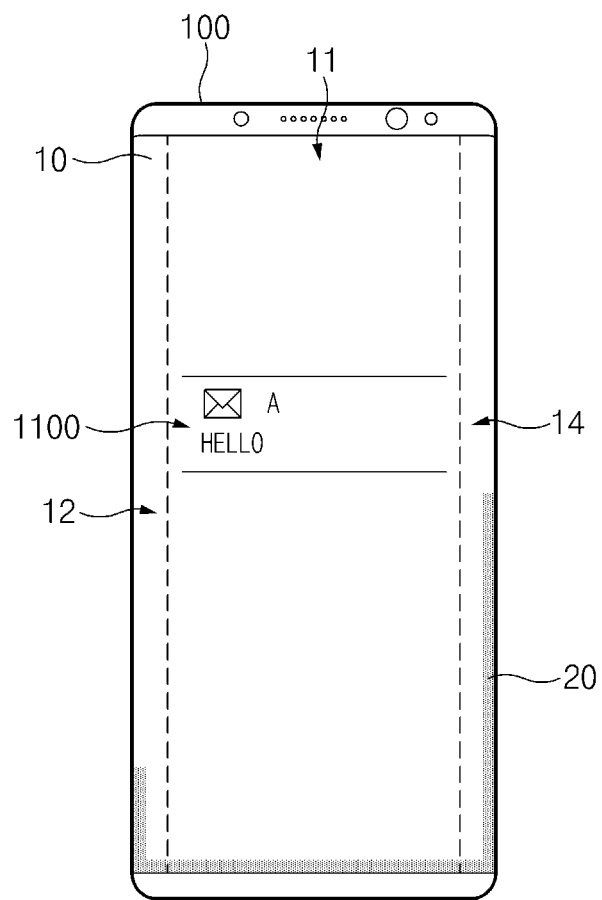
FIGS. 11A, and 11B illustrate the situation that the electronic device recognizes a gripped region by a user and displays the user interface, according to an embodiment of the present disclosure.
Figure 11B:
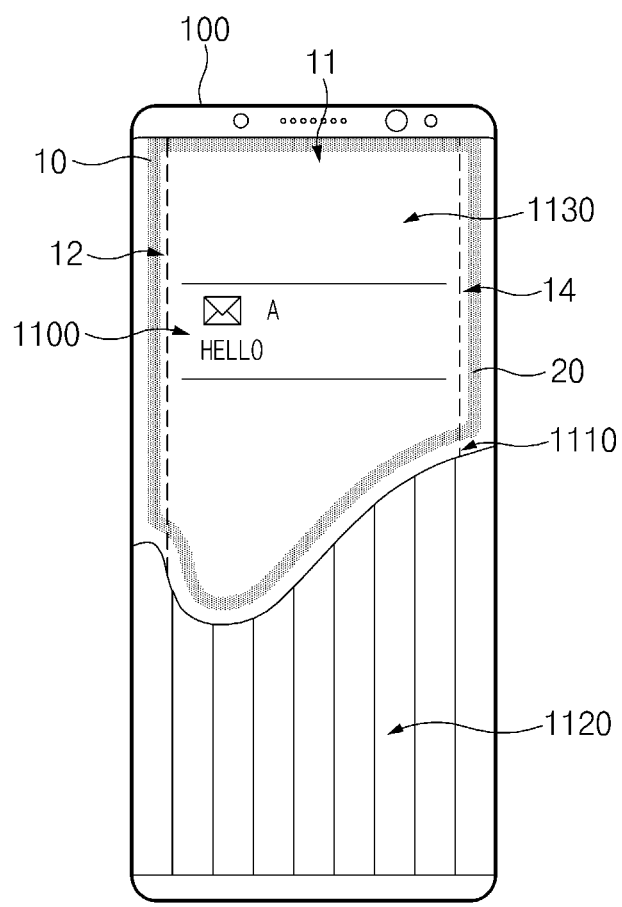

FIGS. 11A and 11B illustrate the situation that the electronic device recognizes a gripped region by a user and displays the user interface, according to an embodiment of the present disclosure.

Referring to FIGS. 11A and 11B, the electronic device 100 may identify a region of the display 10 gripped by the user. For example, the electronic device 100 may identify the gripped region through a touch screen included in the display 10. In this case, the electronic device 100 may display the user interface 20 based on a gripped region 1120 by the user.

Referring to FIG. 11A, the electronic device 100 may display a message 1100, which corresponds to a first signal received from an external device, on the display 10. The electronic device 100 may display the user interface 20, which is used to notify the reception of the message 1100, on the second edge region 12, the third edge region 13, and the fourth edge region 14.

Referring to FIG. 11B, the electronic device 100 may sense that the user grips the display 10. The electronic device 100 may distinguish between the gripped region 1120, in which a meaningful change is made in the capacitance through the touch screen, and a non-gripped region 1130, in which the change in the capacitance is not made or is meaningless, and may recognize a boundary 1110 between the gripped region 1120 and the non-gripped region 1130. The electronic device 100 may display the user interface 20 along the boundary 1110 created due to the grip by the user.

For example, the electronic device 100 may display the user interface 20 on the first edge region 11, a part of the second edge region 12, the boundary 1110 created due to the grip by the user, and a part of the fourth edge region 14 of the display 10.

In addition, the electronic device 100 may move a position of the message 1100 to display the message 1100 such that the message 1100 is not hidden by the gripped region 1120.

According to an embodiment, the electronic device 100 may display the user interface 20, for example, while moving the user interface 20 along at least a part of the first to fourth edge regions 11, 12, 13, and 14 and the boundary 1110 created due to the grip by the user. The electronic device 100 may employ the effect of adjusting a hue, brightness, or saturation of the user interface 20. However, the present disclosure is not limited thereto, but the electronic device 100 may simultaneously perform two operations described above.

Figure 12A:
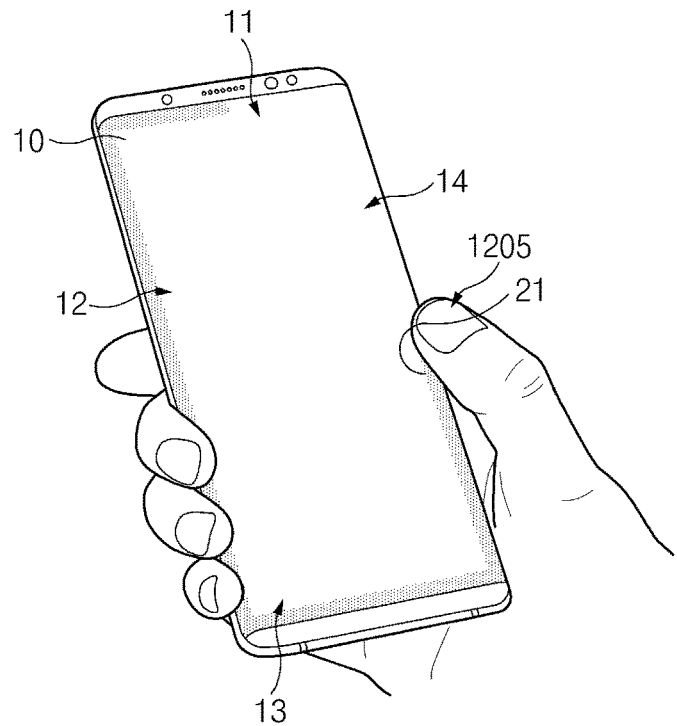
FIGS. 12A, 12B, and 12C illustrate the situation that the electronic device receives information on the movement of a user from a wearable device outside the electronic device and displays the user interface, according to an embodiment of the present disclosure.
Figure 12B:
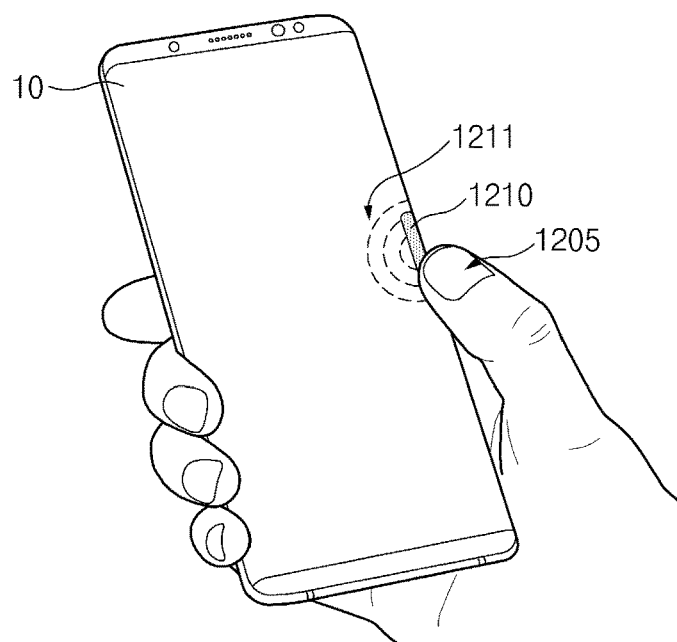
Figure 12C:
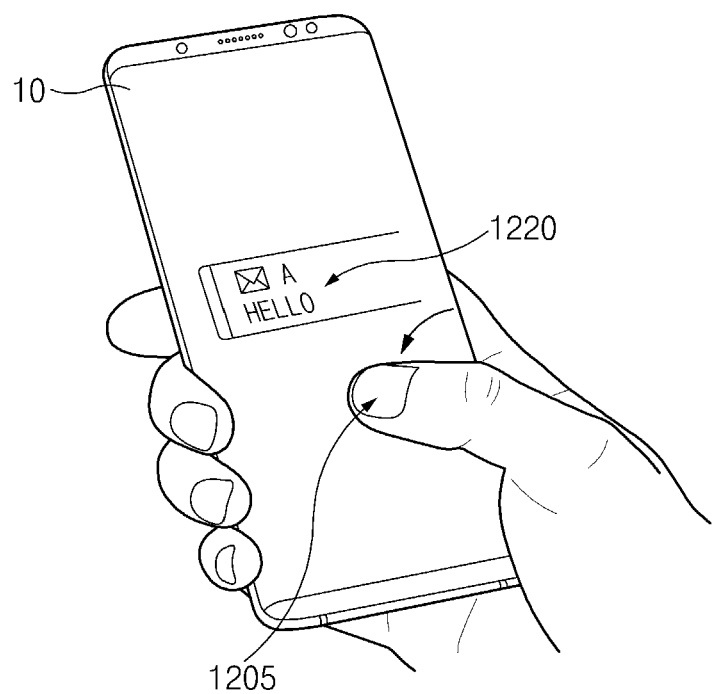

FIGS. 12A to 12C illustrates the situation that the electronic device receives information on the movement of a user from a wearable device outside the electronic device 100 and displays the user interface, according to an embodiment of the present disclosure.

Referring to FIGS. 12A to 12C, the electronic device 100 may establish the communication relationship with the wearable device (not illustrated) and may exchange information collected by sensors included in the electronic device for information collected by sensors included in the wearable device. According to an embodiment, the wearable device may include, for example, a bracelet, a watch, a ring, clothes, or a patch which is attachable to a human body, folded or unfolded. The wearable device may sense the movement of a finger, an arm, or the like of a user and may store information on the movement. The wearable device may memorize the repeated operations as one pattern. The electronic device 100 may sense and predict the grip state of the electronic device 100, or the position of the finger, based on the movement data stored by the electronic device 100 and movement data received from the wearable device.

Referring to FIG. 12A, the electronic device 100 may sense the grip by the user. For example, the electronic device 100 may sense a gripped region by the user based on the change in capacitance caused by a palm covering a touch panel formed integrally with the display. If a message is received, the electronic device 100 may display the user interface 20 to notify the reception of the message, by taking into consideration a gripped position by the user. The electronic device 100 may display the user interface 20 on the first edge region 11 of the display 10. Subsequently, the electronic device 100 may display the user interface 20 along the second edge region 12, the third edge region 13, and the fourth edge region 14 and may display the starting point 21 of the user interface 20 adjacent to a point in which a thumb 1205 of a user is positioned.

According to another embodiment, the electronic device 100 may adjust a point, in which the starting point 21 of the user interface 20 is positioned, based on the gripped position by the user and the information on the movement of the finger received from the wearable device. In addition, the position of the starting point 21 of the user interface 20 may be preset or may be changed by the user.

Referring to FIG. 12B, the electronic device 100 may display an execution icon 1210 representing a message by changing the form of the user interface 20 or may display, around the execution icon 1210, a dynamic effect 1211 such as the change in the color of the execution icon 1210 or the change in the brightness of the execution icon 1210.

Referring to FIG. 12C, the electronic device 100 may display message information 1220 on the display 10 as the user drags the execution icon 1210.

As described above, the electronic device 100 may display the user interface 20 based on the information, which is acquired by the sensors included in the electronic device 100, and information, which is acquired by sensors included in the external wearable device which has established the communication relation with the electronic device 100.

Figure 13:
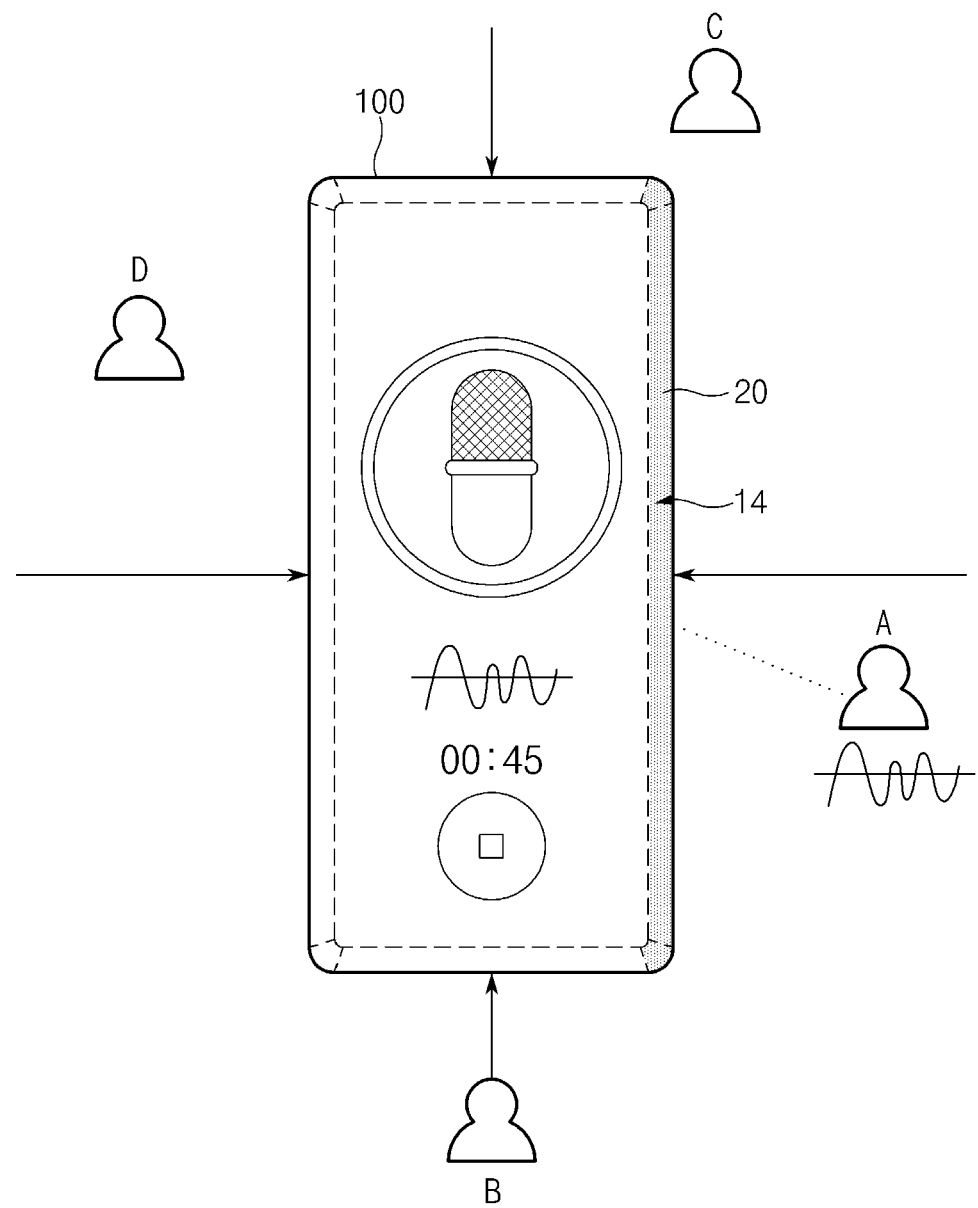
FIG. 13 is a view illustrating the situation that the electronic device displays the user interface based on received voice information, according to an embodiment of the present disclosure.

FIG. 13 is a view illustrating the situation that the electronic device displays the user interface based on received voice information, according to an embodiment of the present disclosure.

Referring to FIG. 13, the electronic device 100 may detect various pieces of voice information by analyzing a voice received through a plurality of microphones embedded in the electronic device 100. For example, in the case that the electronic device 100 receives the voice through the microphones (not illustrated), the electronic device 100 may detect a direction that the voice is received. The electronic device 100 may detect the meaning by analyzing the received voice, may transform the voice into a text, and may display the transformed result on the display 10. The electronic device 100 may detect the mood, the gender, the speaking tone, the speaking way, the speaking habit of an utterer who produces a voice.

Referring to FIG. 13, the electronic device 100 may receive voices produced from four utterers A, B, C, and D placed in four directions (see arrow marks). For example, in the case that the electronic device 100 receives a voice produced from the utterer A, the electronic device 100 may display the user interface 20 on the fourth edge region 14 positioned in the direction that the utterer A is placed.

According to an embodiment, if the utterer A is determined to be a woman, the electronic device 100 may display the user interface 20 in red color. If the utterer A is determined as a man, the electronic device 100 may display the user interface 20 in blue color.

According to another embodiment, if the utterer A is determined to be in tranquil, the electronic device 100 may express the saturation belonging to the color of the user interface 20 as a lower. If the utterer A is determined to be in excited, the electronic device 100 may express the saturation of the color of the user interface 20 as a higher value. However, the present disclosure is not limited thereto. The electronic device 100 may express the characteristics of a voice by changing attributes of the user interface 20. For example, in the case that the electronic device 100 analyzes and executes a command from a speaker by utilizing data which is previously stored, the electronic device 100 may variously set attributes of the user interface 20 (may variously implement color, a type, or a starting position of the user interface 20) even with respect to the identifying of the utterer, whether the analyzed command is successfully executed, and the procedure of executing the command.

Figure 14A:
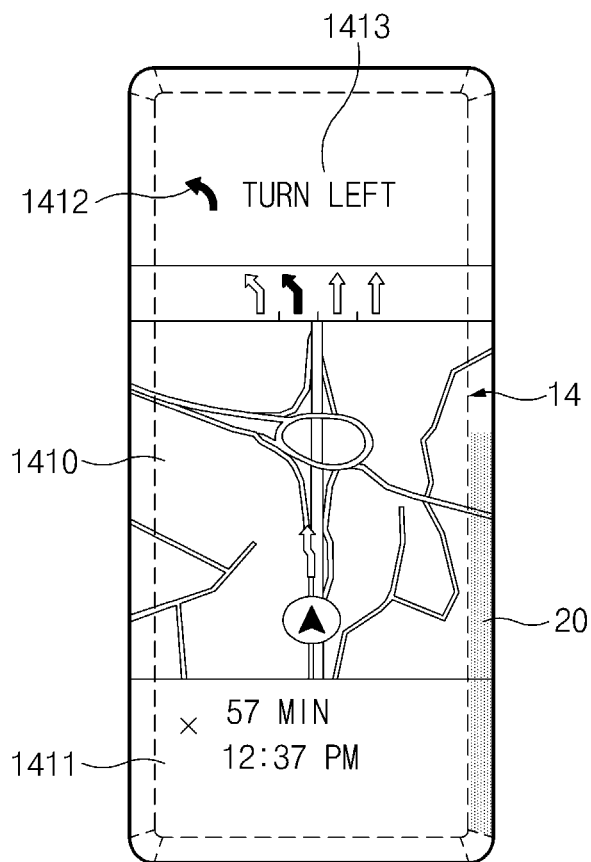
FIGS. 14A and 14B illustrate the situation that the electronic device displays the user interface in the case of executing a movement guidance function, according to an embodiment of the present disclosure.
Figure 14B:
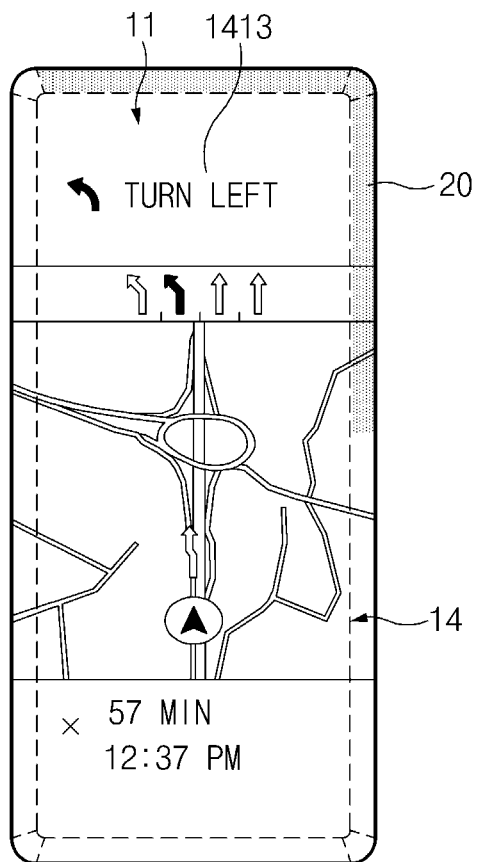

FIGS. 14A and 14B illustrate situations that the electronic device displays the user interface in the case of executing a movement guidance function, according to an embodiment of the present disclosure.

Referring to FIG. 14, the electronic device 100 may include an application of guiding the movement of a vehicle or a user. The electronic device 100 may guide the movement by using a position sensor (e.g., a GPS sensor) embedded in the electronic device 100.

Referring to FIG. 14A, the electronic device 100 may execute a movement guidance application and may display a map 1410, information 1411 on route guidance, and an icon 1412 on the display 10. In the case that new route guidance information is created, the electronic device 100 may display the user interface 20 based on a guidance direction.

Referring to FIGS. 14A to 14B, the electronic device 100 may display a message 1413 of informing "turn left". Simultaneously or sequentially, the electronic device 100 may start the displaying of the user interface 20 on the lower end of the fourth edge region 14 and may display the user interface 20 while moving to the first edge region 11. However, the position at which the user interface 20 is displayed is not limited thereto.

Figure 15A:
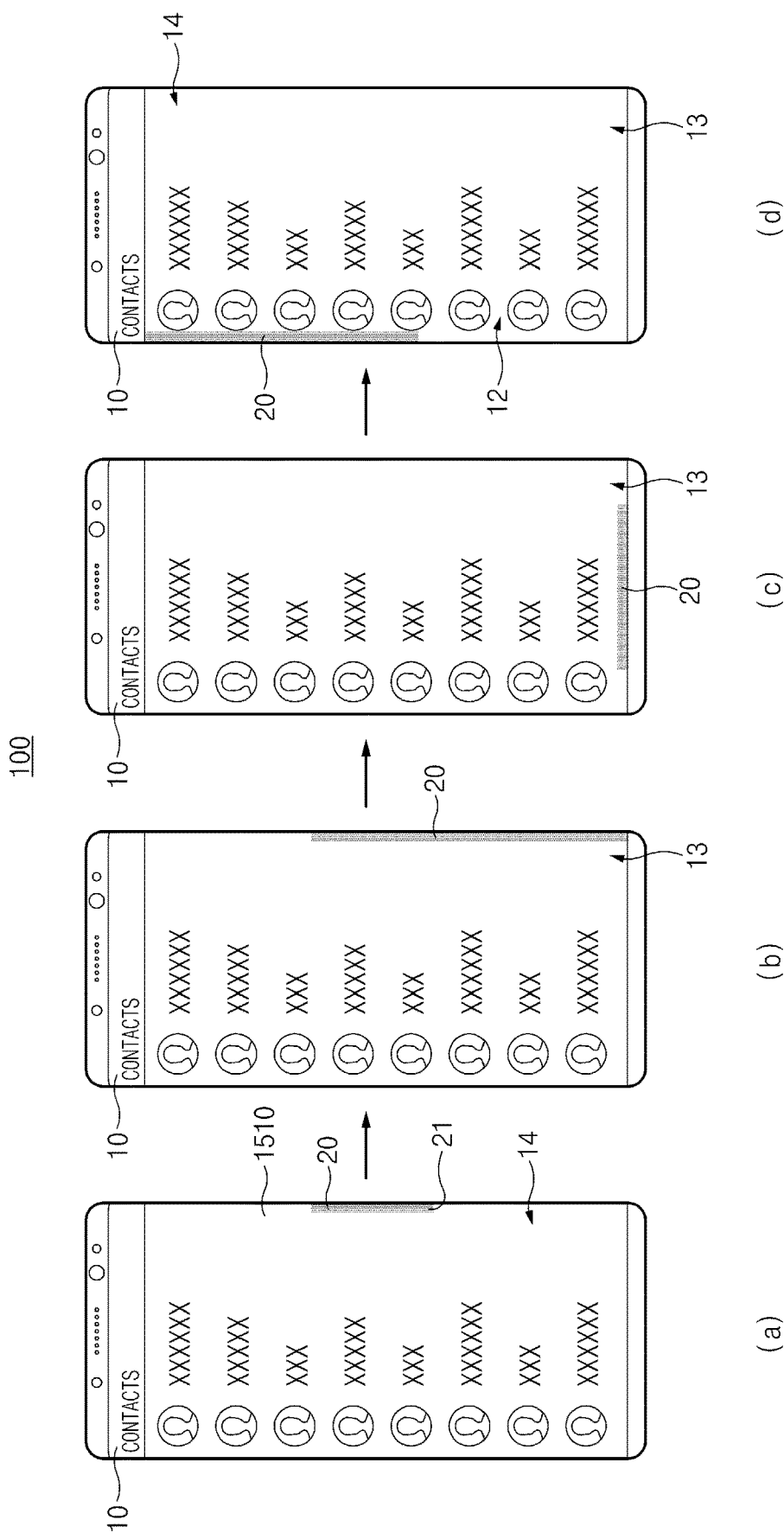
FIGS. 15A, 15B, and 15C sequentially illustrate another situation that the electronic device displays the user interface and the content, according to an embodiment of the present disclosure.
Figure 15B:
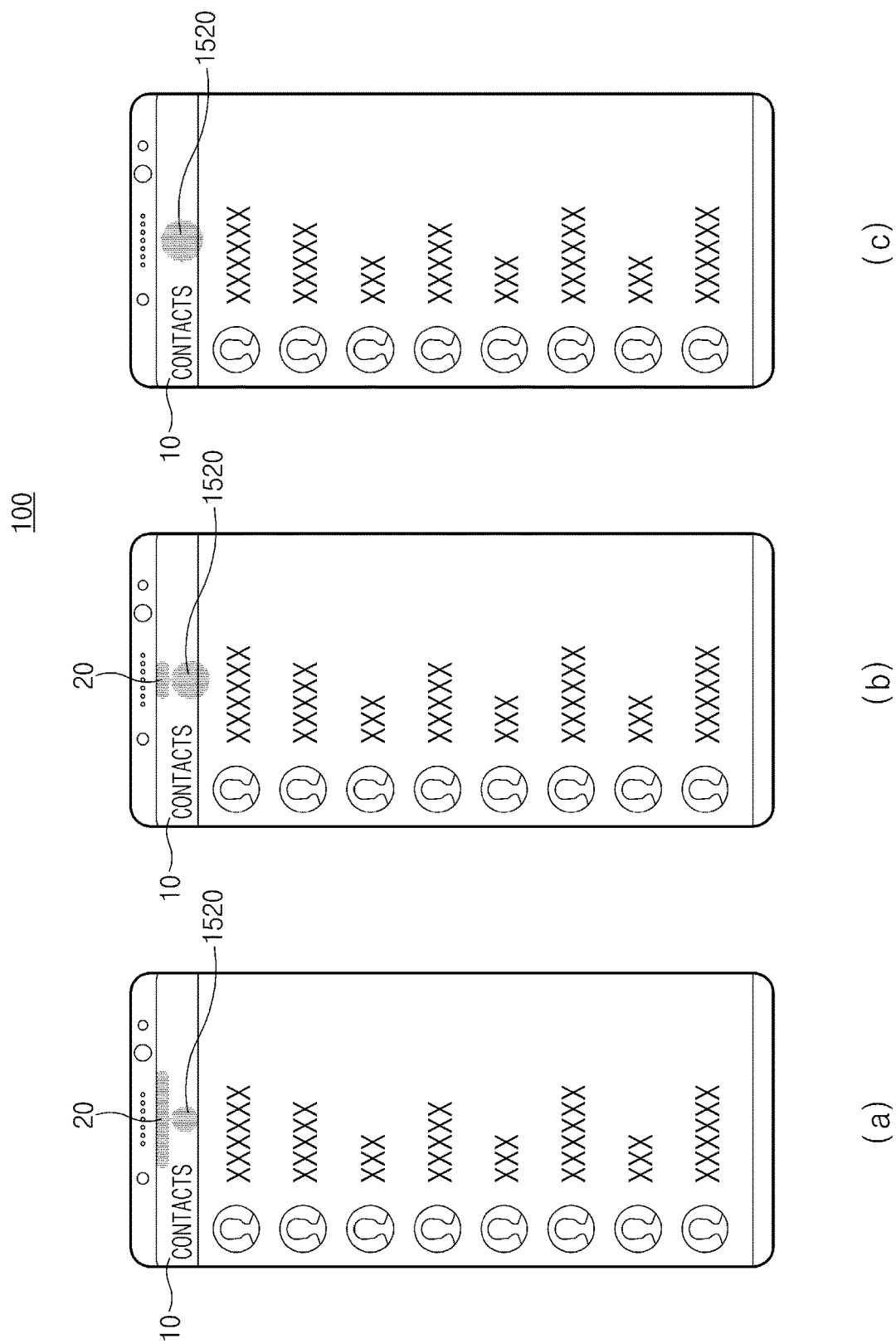
Figure 15C:
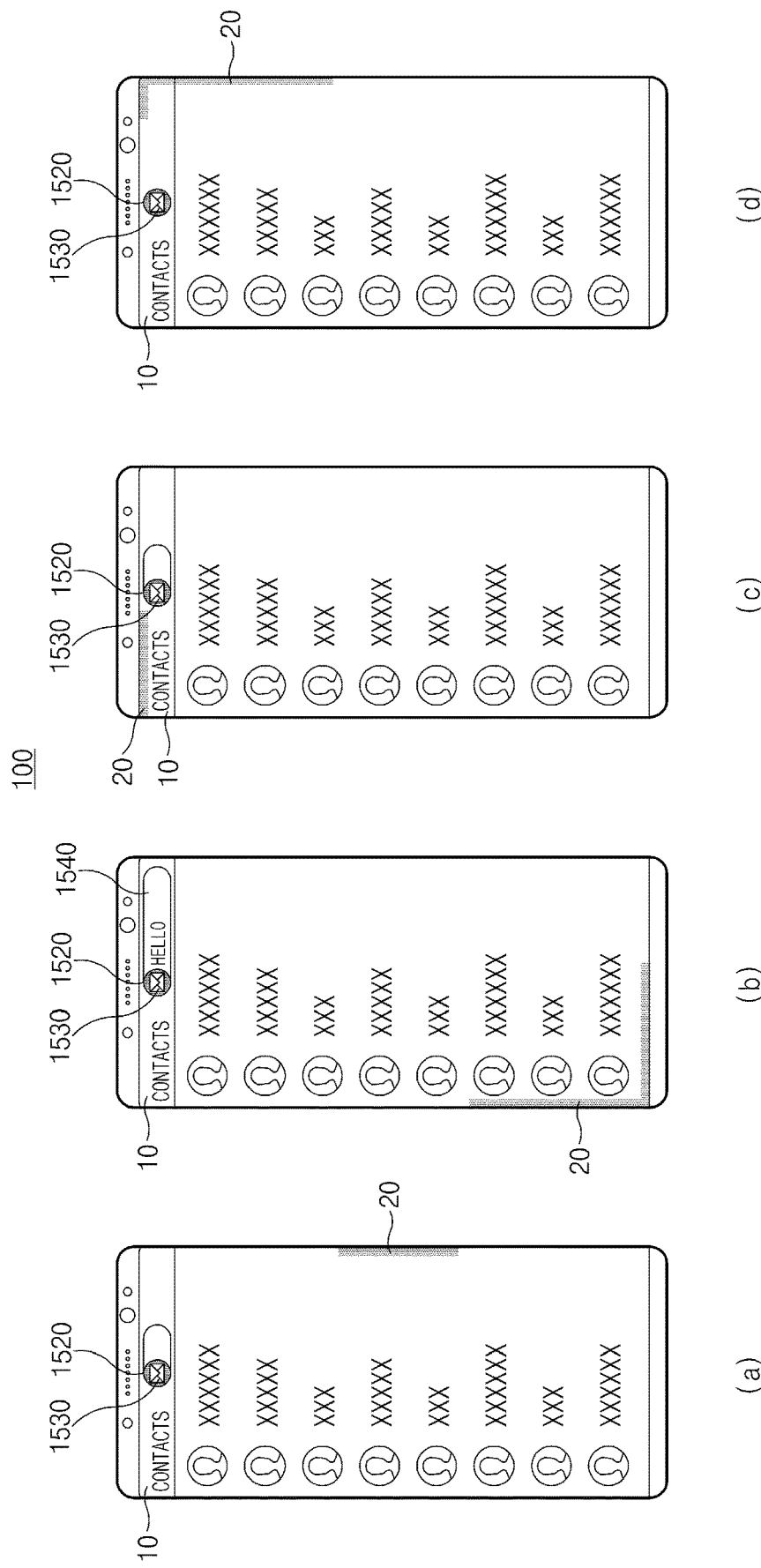

FIGS. 15A to 15C sequentially illustrate another situation that the electronic device displays the user interface and the content, according to an embodiment of the present disclosure.

Referring to object (a) of FIG. 15A, the electronic device 100 may display a contact application 1510 on the display 10. The electronic device 100 may receive a signal from an external device and may display the user interface 20 corresponding to the signal.

The electronic device 100 may display the user interface 20 on the central part of the fourth edge region 14 of the display 10. However, the position at which the user interface 20 is first displayed is not limited thereto. The user interface 20 may include the starting point 21.

Referring to object (b) of FIG. 15A, the electronic device 100 may display the user interface 20 such that the user interface 20 is extended in the lengthwise direction from the central part of the fourth edge region 14 toward the lower end (e.g., the direction of the third edge region) of the fourth edge region 14.

Referring to objects (c) and (d) of FIG. 15A, the electronic device 100 may display the user interface 20 on the second edge region 12 after displaying the user interface 20 on the third edge region 13 of the display 10. In addition, the electronic device 100 may sequentially display the user interface 20 on the fourth edge region 14, the third edge region 13, and the second edge region 12 after displaying the user interface 20 on the first edge region 11 of the display 10. In other words, the electronic device 100 may provide a dynamic effect such as that the user interface 20 rotates along the first to fourth edge regions 11, 12, 13, and 14 of the display 10.

Referring to object (a) of FIG. 15B, the electronic device 100 may display the user interface 20 on the first edge region 11 of the display 10 after repeating the operations illustrated in FIG. 15A for preset time. In addition, the electronic device 100 may display an execution object 1520 on the upper end of the display 10. The electronic device 100 may provide a dynamic effect such as that the execution object 1520 extends and comes out of the user interface 20 and is displayed in the shape of a circle. The execution object 1520 may be expressed in color the same as that of the user interface 20, but the present disclosure is not limited thereto.

Referring to object (b) of FIG. 15B, the electronic device 100 may simultaneously or sequentially decrease the length of the user interface 20 and increase the diameter of the execution object 1520 displayed in the shape of the circle. Even in this case, the electronic device 100 may maintain the dynamic effect such as that the execution object 1520 extends and comes out of the user interface 20.

Referring to object (c) of FIG. 15B, the electronic device 100 may terminate the displaying the user interface 20 and may display the execution object 1520 on the upper end of the display 10.

Referring to object (a) of FIG. 15C, the electronic device 100 may change and display the execution object 1520 displayed in object (c) of FIG. 15B. For example, the electronic device 100 may display an image 1530, which represents an application in response to receiving the signal, on the execution object 1520. Simultaneously or sequentially, the electronic device 100 may extend a widthwise length of the execution object 1520.

Referring to object (b) of FIG. 15C, the electronic device 100 may display received message content 1540 after extending the execution object 1520 in the widthwise direction.

Referring objects (c) and (d) of FIG. 15C, the electronic device 100 may simultaneously or sequentially terminate the displaying of the message content 1540 and reduce the widthwise length of the execution object 1520. For example, the electronic device 100 may display the image 1530, which represents an application in response to receiving the signal, on the execution object 1520.

In this case, the electronic device 100 may execute an application corresponding to a signal generated by touching or selecting the execution object 1520 by a user and may display the content of the application.

According to an embodiment, the electronic device 100 may continuously display the user interface 20 on the first to fourth edge regions 11, 12, 13, and 14 of the display 10 identically or similarly to the case illustrated in FIG. 15A, while performing the operations illustrated in objects (a), (b), and (c) of FIG. 15C.

According to an embodiment, the electronic device 100 may terminate the displaying of the user interface 20 after preset time elapses from the displaying of the execution object 1520.

FIGS. 16A to 16D illustrate still another situation that the electronic device displays the user interface and content, according to an embodiment of the present disclosure.

Figure 16A:
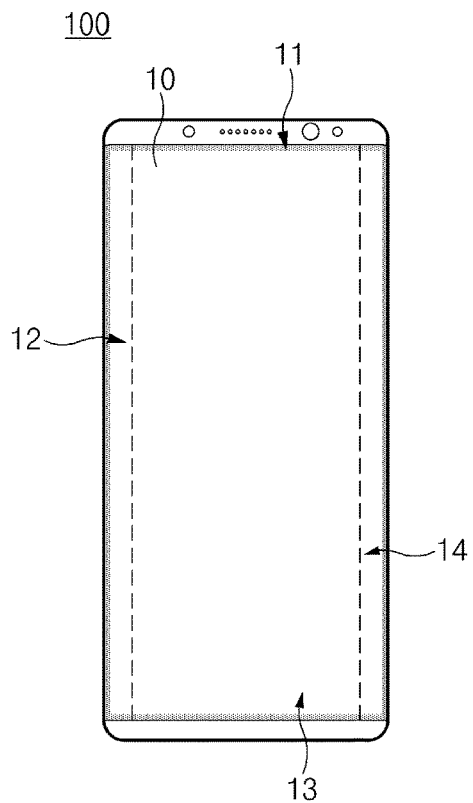
FIGS. 16A, 16B, 16C, and 16D illustrate still another situation that the electronic device displays the user interface and content, according to an embodiment of the present disclosure.

Referring to FIG. 16A, the electronic device 100 may receive a signal from an external device and may display the user interface 20 corresponding to the signal. For example, the electronic device 100 may display the user interface 20 on the first edge region 11, the second edge region 12, the third edge region 13, and the fourth edge region 14.

According to an embodiment, the electronic device 100 may display the user interface 20 in the shape of a line on a boundary of each of the first to fourth regions 11, 12, 13, and 14.

Figure 16B:
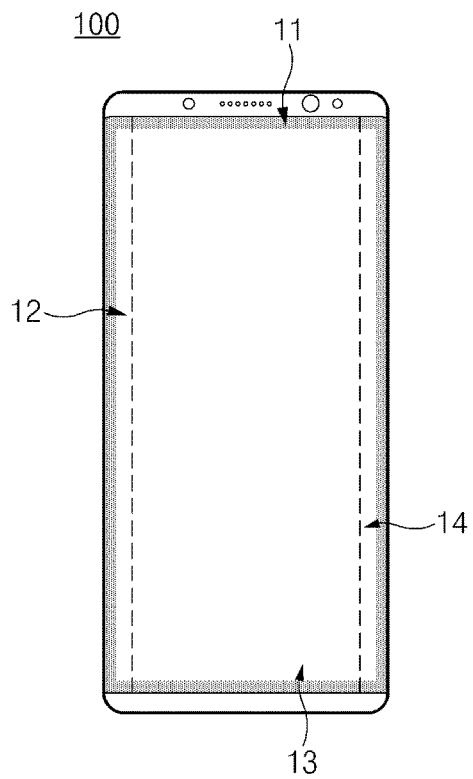

Referring FIG. 16B, the electronic device 100 may display the user interface 20 by applying a gradation effect to the user interface 20 in the shape of a line while changing shape of the user interface 20 from a line to a face. In other words, the line is changed to the face while the electronic device 100 may apply the gradation effect to the face. In this case, the electronic device 100 may maintain the color of the user interface 20. However, the present disclosure is not limited thereto, but the electronic device 100 may change the hue, the saturation, or the brightness of the color of the user interface 20.

Figure 16C:
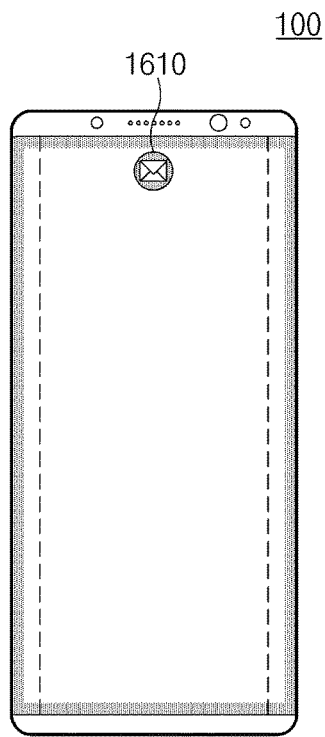

Referring to FIG. 16C, the electronic device 100 may display an execution object 1610. The electronic device 100 may display, for example, the user interface 20 in the shape of a line again. If the shape of the user interface 20 is gradually changed from a face to a line, the user interface 20 may be actually maintained at least in the shape of a line, but shown as if the user interface 20 is gradually disappeared. Simultaneously or sequentially, the electronic device 100 may provide a dynamic effect such as that the execution object 1610 extends and comes out of the user interface 20 and is displayed in the shape of a circle. If the execution object 1610 is displayed, the electronic device 100 may display the user interface 20 in the shape of a face again.

Figure 16D:
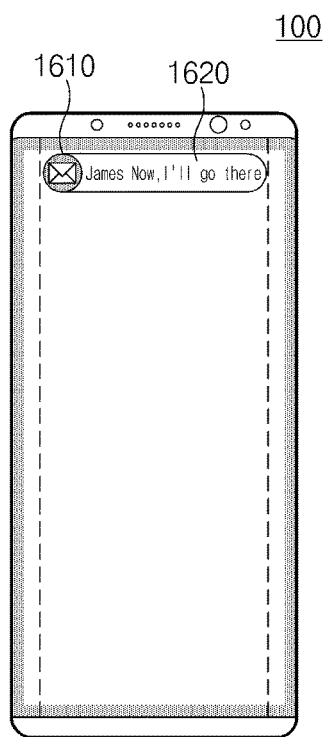

Referring to FIG. 16D, the electronic device 100 may display the content of a received message 1620 by changing the size of the execution object 1610. Even in this case, the electronic device 100 may display, for example, the user interface 20 in the shape of a line again. In this case, the user interface 20 may be shown as if the user interface 20 is disappeared. Simultaneously or sequentially, the electronic device 100 may change the size of the execution object 1610 and may display the content of the message 1620.

The electronic device 100 may change the size of the execution object 1610 after preset time elapses as illustrated in FIG. 16C and then may terminate the displaying of the execution object 1610. In this case, the electronic device 100 may be configured to terminate the displaying of the execution object 1610 having the reduced size while moving the execution object 1610 toward the user interface 20.

As described above, the electronic device 100 may perform operations of displaying and/or terminating of the displaying of the user interface 20 and the execution object 1610 while linking the operation to each other as described above. However, the present disclosure is not limited thereto. The electronic device 100 may individually control the operations of displaying and/or terminating the displaying of the user interface 20 and the execution object 1610.

Figure 17A:
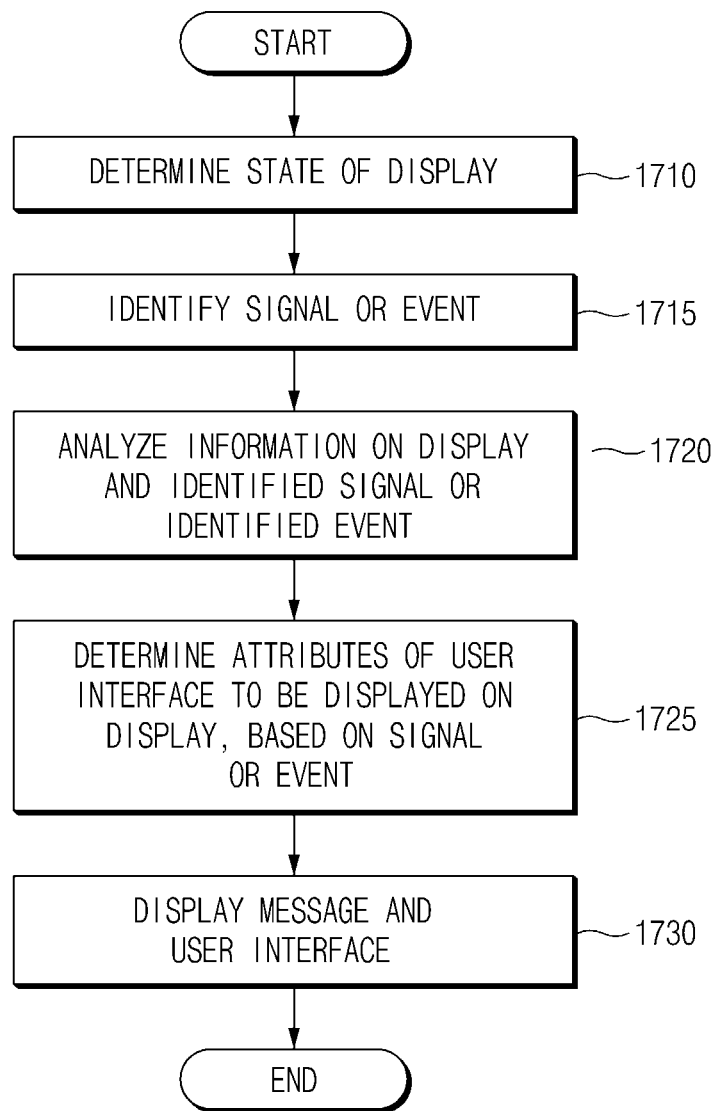
FIG. 17A is a flowchart illustrating a situation that the electronic device displays the user interface, according to an embodiment of the present disclosure.

FIG. 17A is a flowchart illustrating a situation that an electronic device displays a user interface, according to an embodiment of the present disclosure.

Referring to operation 1710, a processor (e.g., the processor 220 of FIG. 2) of the electronic device 100 may determine the state of a display. For example, the electronic device 100 may determine whether the display is in an activation state or in a deactivation state.

Referring to operation 1715, the processor (e.g., the processor 220 of FIG. 2) of the electronic device 100 may identify a signal received from an external device or an event occurring inside the electronic device 100. The signal received from the external device may include, for example, missed call notification, a text message, or an SNS message. The event occurring inside the electronic device 100 may include, for example, a system change notification, an alarm, a schedule notification, or the like.

Referring to operation 1720, the processor (e.g., the processor 220 of FIG. 2) of the electronic device 100 may analyze the information on the display and the identified signal or the identified event. The information on the display may include, for example, the shape (e.g., a flat-panel display, a curved-display, or the like) of the display, the resolution of the display, an edge region of the display, the activation state/the deactivation state of the display, or the like. In addition, the electronic device 100 may identify the content or the type of the signal or the event by analyzing the signal or the event.

Referring to operation 1725, the processor (e.g., the processor 220 of FIG. 2) of the electronic device 100 may determine the attributes of the user interface to be displayed on the display, based on the content and the type of the signal or the event. For example, the electronic device 100 may determine the user interface to be displayed in the form of one of a face or a line. In addition, the electronic device 100 may determine the color, the moving speed, the starting point, the ending point, or the like of the user interface.

Referring to operation 1730, the processor (e.g., the processor 220 of FIG. 2) of the electronic device 100 may display a message and a user interface corresponding to the signal or the event.

Figure 17B:
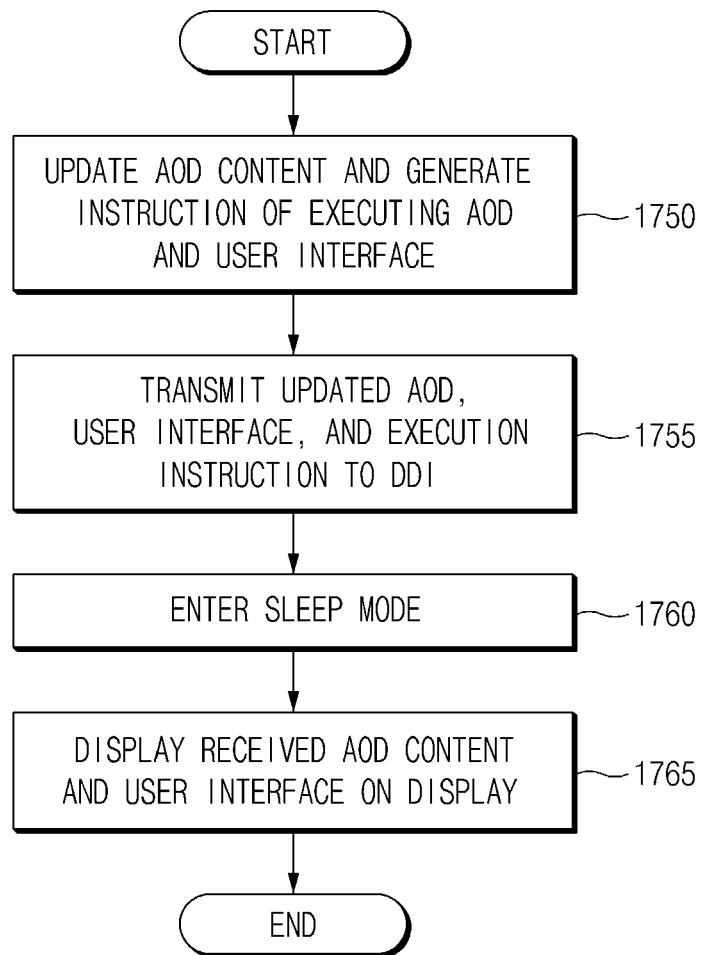
FIG. 17B is a flowchart illustrating the situation that the electronic device displays the user interface when a signal is received or an event occurs in a sleep mode, according to an embodiment of the present disclosure.

FIG. 17B is a flowchart illustrating the situation that the electronic device displays the user interface when a signal is received or an event occurs in a sleep mode, according to an embodiment.

Referring to operation 1750, the processor (e.g., the processor 220 of FIG. 2) may update AOD content based on the received signal and the occurring event and may generate a command for executing an AOD and the user interface. For example, the processor (e.g., the processor 220 of FIG. 2) may transform the content included in the signal or the event into a message and may include the transformed result in the AOD content.

Referring to operation 1755, the processor (e.g., the processor 220 of FIG. 2) may transmit the updated AOD, the user interface, and the command to a DDI.

Referring to operation 1760, the processor (e.g., the processor 220 of FIG. 2) may enter the sleep mode.

Referring to operation 1765, the DDI may display the received AOD content and the user interface on the display.

Figure 18A:
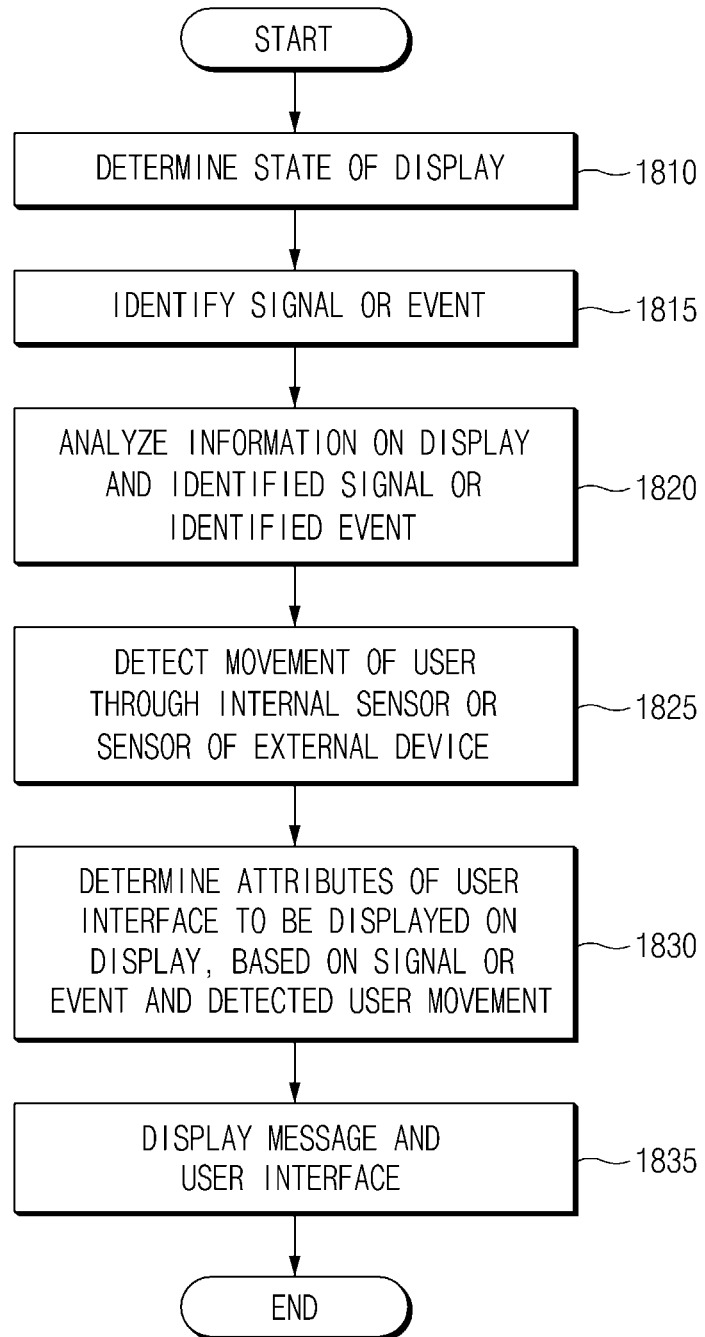
FIG. 18A is a flowchart illustrating the situation that the electronic device displays the user interface based on sensor data related to the movement of the user, according to an embodiment of the present disclosure.

FIG. 18A is a flowchart illustrating the situation that the electronic device displays the user interface based on sensor data related to the movement of the user, according to an embodiment of the present disclosure.

Since operation 1810 to operation 1820 are the same as operations 1710, 1715, and 1720 of FIG. 17A, the details of operations 1810, 1815, and 1820 will be omitted in the following description.

Referring to operation 1825, the processor (e.g., the processor 220 of FIG. 2) of the electronic device 100 may detect the movement of the user through a sensor included inside the processor. In addition, an external device, which has established a communication relation with the electronic device 100, may detect the movement of the user through a sensor included inside the external device. The external device may transmit detected movement data to the electronic device 100.

Referring to operation 1830, the processor (e.g., the processor 220 of FIG. 2) of the electronic device 100 may determine the attributes of a user interface to be displayed on the display, based on the content and the type of the signal or the event and the detected movement data by the sensor.

Referring to operation 1835, the processor (e.g., the processor 220 of FIG. 2) of the electronic device 100 may display a message and the user interface corresponding to the signal or the event.

Figure 18B:
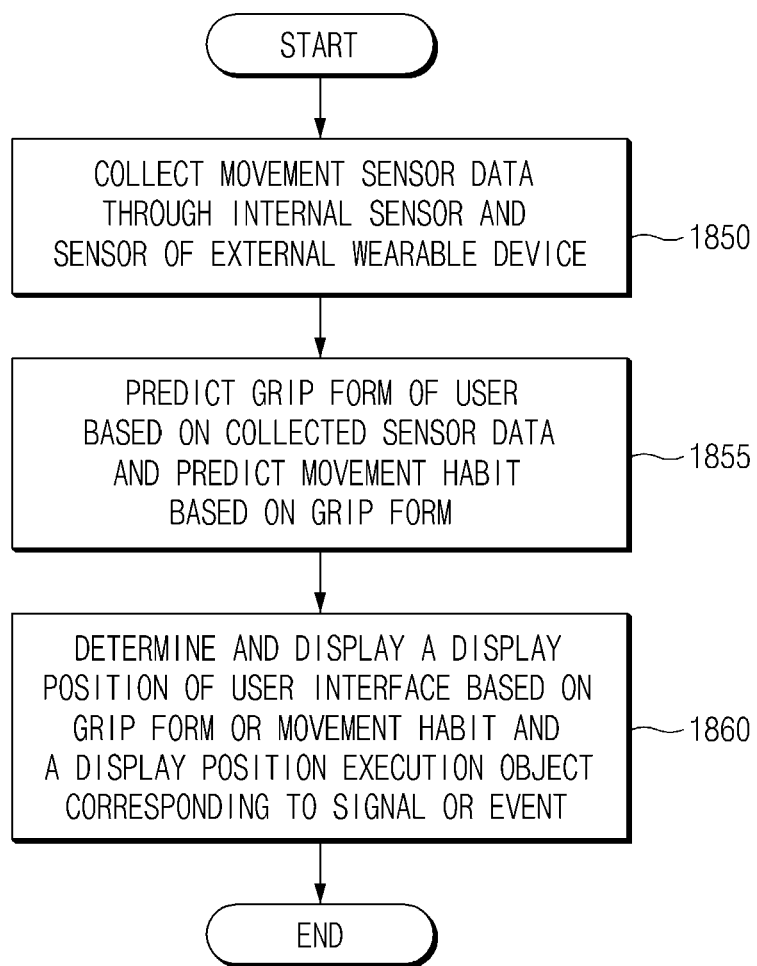
FIG. 18B is a flowchart illustrating the situation that the electronic device or the external device detects the movement of the user and predicts the movement habit based on collected movement data, thereby display the user interface according to an embodiment of the present disclosure.

FIG. 18B is a flowchart illustrating the situation that the electronic device or the external device detects the movement of the user and predicts the movement habit based on collected movement data, thereby display the user interface.

Referring to operation 1850, the processor (e.g., the processor 220 of FIG. 2) of the electronic device 100 may collect movement data of a user through a sensor related to a movement, which is included inside the electronic device 100. A wearable device, which has established the communication relation with the electronic device 100, may collect the movement data of the user by using a sensor related to the movement and may transmit the collected movement data to the electronic device 100.

Referring to operation 1855, the processor (e.g., the processor 220 of FIG. 2) of the electronic device 100 may predict the form that the user grips the electronic device 100 based on the collected movement data, and predict the movement habit of the user based on the grip form of the user.

According to an embodiment, the wearable divide may include, for example, a bracelet, a watch, a ring, clothes, or a patch which is attachable to a human body, folded or unfolded. The wearable device may sense the movement of a finger, an arm, or the like of the user and may store information on the movement. The wearable device may memorize the repeated operations in one pattern. The electronic device 100 may sense and predict the grip state of the electronic device 100, or the position of the finger, based on the movement data stored by the electronic device 100 and movement data received from the wearable device.

Referring to operation 1860, the processor (e.g., the processor 220 of FIG. 2) of the electronic device 100 may display the user interface and the execution object on the display by determining the display position of the user interface based on the sensed grip form and the predicted movement habit, and by determining the display position of the execution object corresponding to the signal or the event.

Figure 19:
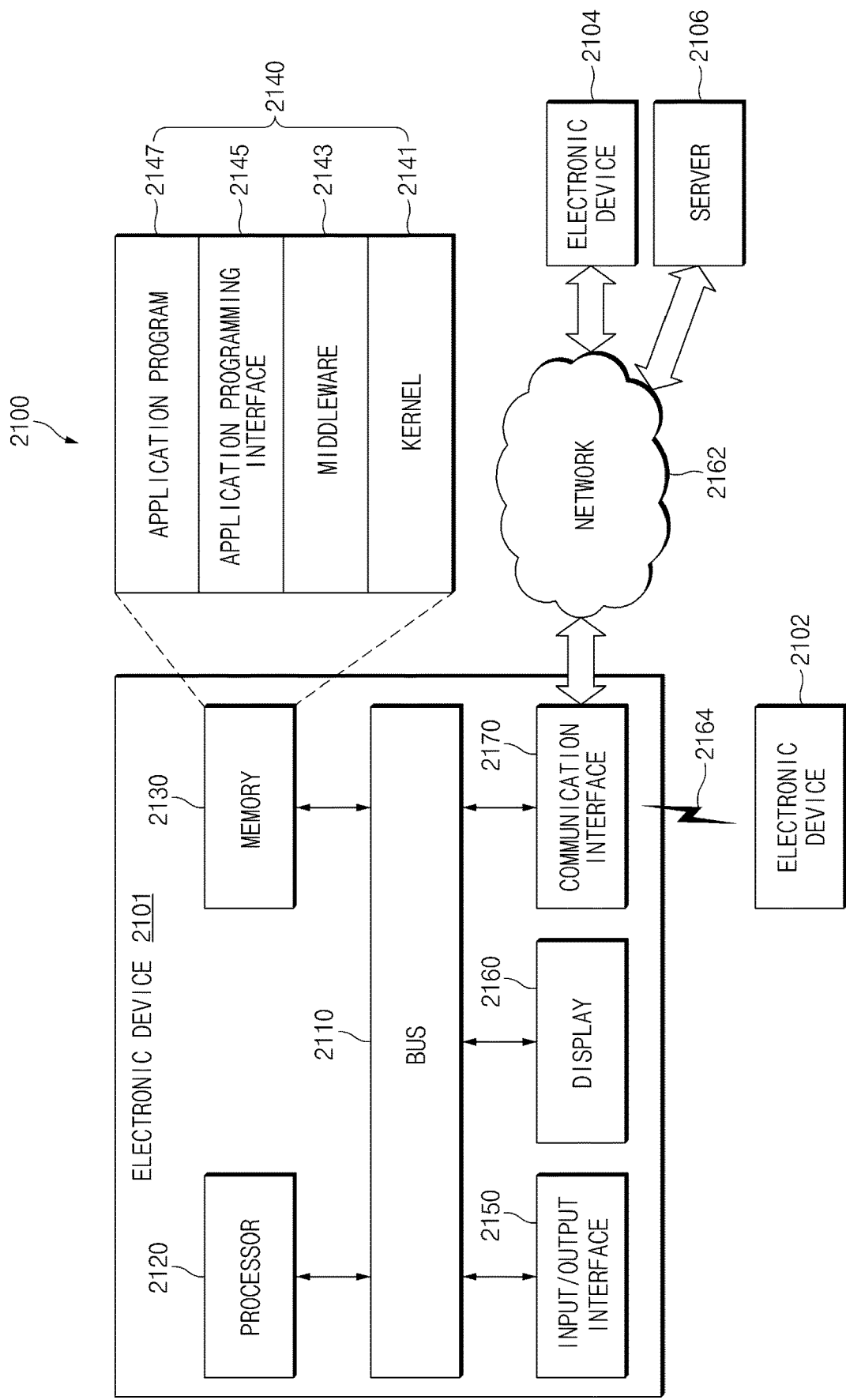
FIG. 19 illustrates an electronic device in a network environment, according to various embodiments of the present disclosure.

FIG. 19 illustrates an electronic device in a network environment, according to various embodiments of the present disclosure.

Referring to FIG. 19, according to various embodiments, an electronic device 2101 in a network environment 2100 is described. The electronic device 2101 may include a bus 2110, a processor 2120 (e.g., at least one processor), a memory 2130, an input/output interface 2150, a display 2160, and a communication interface 2170. The electronic device 2101 may include the electronic device 100 of FIGS. 1A to 1C. According to an embodiment, the electronic device 2101 may not include at least one of the above-described elements or may further include other element(s). The bus 2110 may interconnect the above-described elements 2110 to 2170 and may include a circuit for conveying communications (e.g., a control message and/or data) among the above-described elements. The processor 2120 may include one or more of a central processing unit (CPU), an application processor (AP), or a communication processor (CP). For example, the processor 2120 may perform an arithmetic operation or data processing associated with control and/or communication of at least other elements of the electronic device 2101.

The memory 2130 may include a volatile and/or nonvolatile memory. For example, the memory 2130 may store instructions or data associated with at least one other element(s) of the electronic device 2101. According to an embodiment, the memory 2130 may store software and/or a program 2140. The program 2140 may include, for example, a kernel 2141, a middleware 2143, an application programming interface (API) 2145, and/or an application program (or "an application") 2147. At least a part of the kernel 2141, the middleware 2143, or the API 2145 may be referred to as an operating system (OS). For example, the kernel 2141 may control or manage system resources (e.g., the bus 2110, the processor 2120, the memory 2130, and the like) that are used to execute operations or functions of other programs (e.g., the middleware 2143, the API 2145, and the application program 2147). Furthermore, the kernel 2141 may provide an interface that allows the middleware 2143, the API 2145, or the application program 2147 to access discrete elements of the electronic device 2101 so as to control or manage system resources.

The middleware 2143 may perform, for example, a mediation role such that the API 2145 or the application program 2147 communicates with the kernel 2141 to exchange data. Furthermore, the middleware 2143 may process one or more task requests received from the application program 2147 according to a priority. For example, the middleware 2143 may assign the priority, which makes it possible to use a system resource (e.g., the bus 2110, the processor 2120, the memory 2130, or the like) of the electronic device 2101, to at least one of the application program 2147 and may process the one or more task requests. The API 2145 may be an interface through which the application program 2147 controls a function provided by the kernel 2141 or the middleware 2143, and may include, for example, at least one interface or function (e.g., an instruction) for a file control, a window control, image processing, a character control, or the like. The input/output interface 2150 may transmit a command or data input from a user or another external device, to other element(s) of the electronic device 2101 or may output a command or data, received from other element(s) of the electronic device 2101, to a user or another external device.

The display 2160 may include, for example, a liquid crystal display (LCD), a light-emitting diode (LED) display, an organic LED (OLED) display, a microelectromechanical systems (MEMS) display, or an electronic paper display. The display 2160 may display, for example, various contents (e.g., a text, an image, a video, an icon, a symbol, and the like) to a user. The display 2160 may include a touch screen and may receive, for example, a touch, gesture, proximity, or hovering input using an electronic pen or a part of a user's body. For example, the communication interface 2170 may establish communication between the electronic device 2101 and an external device (e.g., the first electronic device 2102, the second electronic device 2104, or the server 2106). For example, the communication interface 2170 may be connected to the network 2162 over wireless communication or wired communication to communicate with the external device (e.g., the second electronic device 2104 or the server 2106).

For example, the wireless communication may include cellular communication using at least one of long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like. The wireless communication may include at least one of Wi-Fi, Bluetooth (BT), BT low energy (BLE), Zigbee, near field communication (NFC), magnetic stripe transmission (MST), radio frequency (RF), a body area network, or the like. According to an embodiment, the wireless communication may include GNSS. The GNSS may be one of, for example, a global positioning system (GPS), a global navigation satellite system (Glonass), a Beidou navigation satellite system (hereinafter referred to as "Beidou"), or a European global satellite-based navigation system (hereinafter referred to as "Galileo"). Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), powerline communication, a plain old telephone service (POTS), or the like. The network 2162 may include at least one of telecommunications networks, for example, a computer network (e.g., LAN or WAN), an Internet, or a telephone network.

Each of the first and second external electronic devices 2102 and 2104 may be a device of which the type is different from or the same as that of the electronic device 2101.

According to various embodiments, all or a portion of operations that the electronic device 2101 will perform may be executed by another or plural electronic devices (e.g., the first electronic device 2102, the second electronic device 2104 or the server 2106). According to an embodiment, in the case where the electronic device 2101 executes any function or service automatically or in response to a request, the electronic device 2101 may not perform the function or the service internally, but, alternatively additionally, it may request at least a portion of a function associated with the electronic device 2101 at other electronic device (e.g., the electronic device 2102 or 2104 or the server 2106). The other electronic device (e.g., the electronic device 2102 or 2104 or the server 2106) may execute the requested function or additional function and may transmit the execution result to the electronic device 2101. The electronic device 2101 may provide the requested function or service using the received result or may additionally process the received result to provide the requested function or service. To this end, for example, cloud computing, distributed computing, or client-server computing may be used.

Figure 20:
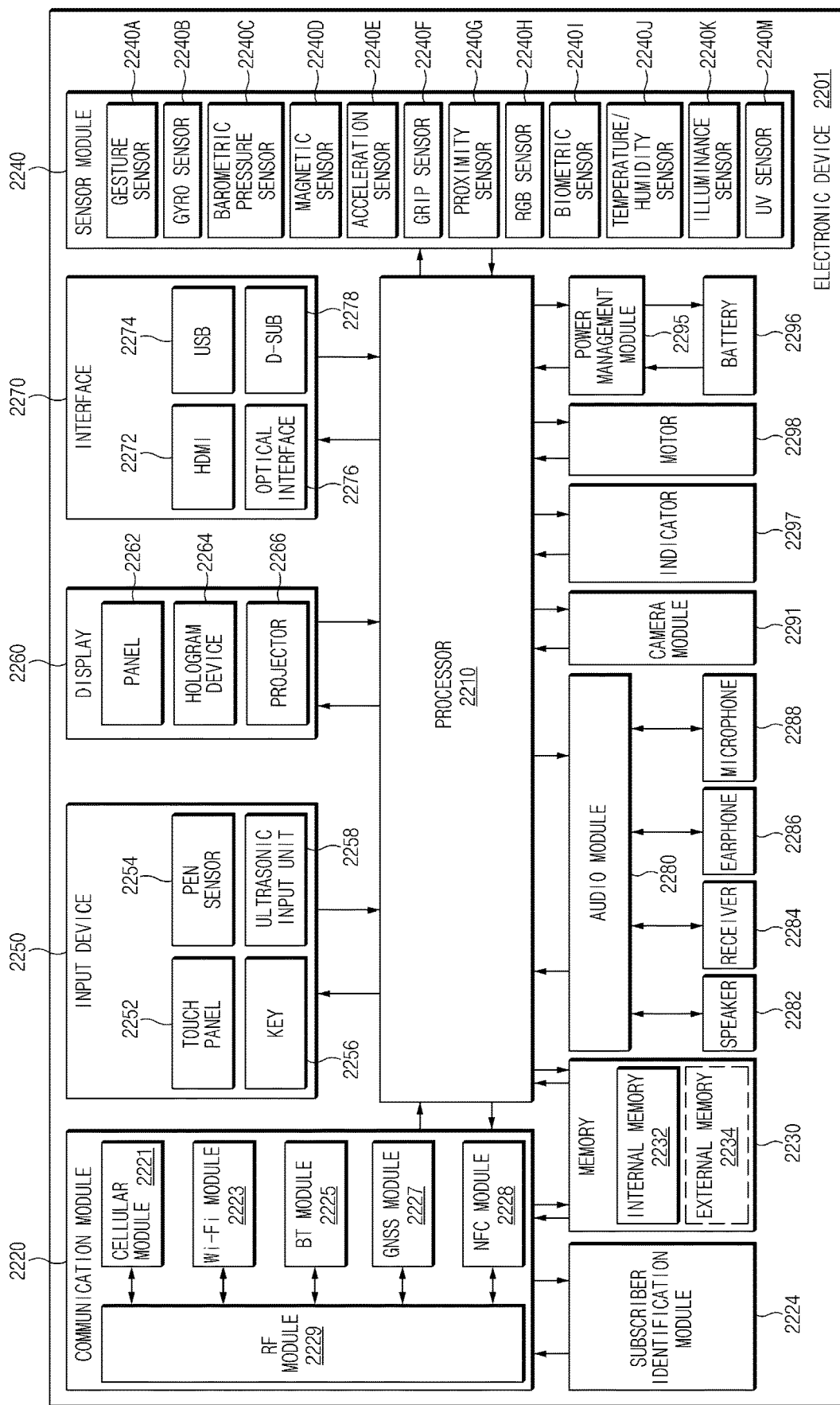
FIG. 20 is a block diagram of an electronic device, according to various embodiments of the present disclosure.

FIG. 20 illustrates a block diagram of an electronic device, according to various embodiments. An electronic device 2201 may include, for example, all or a part of the electronic device 2101 illustrated in FIG. 19. The electronic device 2201 may include one or more processors (e.g., an application processor (AP)) 2210, a communication module 2220, a subscriber identification module 2224, a memory 2230, a sensor module 2240, an input device 2250, a display 2260, an interface 2270, an audio module 2280, a camera module 2291, a power management module 2295, a battery 2296, an indicator 2297, and a motor 2298. For example, the processor 2210 may be implemented with a system on chip (SoC). According to an embodiment, the processor 2210 may further include a graphic processing unit (GPU) and/or an image signal processor (ISP). The processor 2210 may include at least a part (e.g., a cellular module 2221) of elements illustrated in FIG. 20. The processor 2210 may load a command or data, which is received from at least one of other elements (e.g., a nonvolatile memory), into a volatile memory and process the loaded command or data. The processor 2210 may store result data in the nonvolatile memory.

The communication module 2220 may be configured the same as or similar to the communication interface 2170 of FIG. 19. The communication module 2220 may include the cellular module 2221, a Wi-Fi module 2223, a Bluetooth (BT) module 2225, a GNSS module 2227, a near field communication (NFC) module 2228, and a radio frequency (RF) module 2229. The cellular module 2221 may provide, for example, voice communication, video communication, a character service, an Internet service, or the like over a communication network. According to an embodiment, the cellular module 2221 may perform discrimination and authentication of the electronic device 2201 within a communication network by using the subscriber identification module (e.g., a subscriber identification module (SIM) card) 2224. According to an embodiment, the cellular module 2221 may perform at least a portion of functions that the processor 2210 provides. According to an embodiment, the cellular module 2221 may include a communication processor (CP). According to an embodiment, at least a part (e.g., two or more) of the cellular module 2221, the Wi-Fi module 2223, the BT module 2225, the GNSS module 2227, or the NFC module 2228 may be included within one integrated circuit (IC) or an IC package. For example, the RF module 2229 may transmit and receive a communication signal (e.g., an RF signal). For example, the RF module 2229 may include a transceiver, a power amplifier module (PAM), a frequency filter, a low noise amplifier (LNA), an antenna, or the like. According to another embodiment, at least one of the cellular module 2221, the Wi-Fi module 2223, the BT module 2225, the GNSS module 2227, or the NFC module 2228 may transmit and receive an RF signal through a separate RF module. The subscriber identification module 2224 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 2230 (e.g., the memory 2130) may include an internal memory 2232 or an external memory 2234. For example, the internal memory 2232 may include at least one of a volatile memory (e.g., a dynamic random-access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid-state drive (SSD). The external memory 2234 may include a flash drive such as compact flash (CF), secure digital (SD), micro secure digital (Micro-SD), mini secure digital (Mini-SD), extreme digital (xD), a multimedia card (MMC), a memory stick, or the like. The external memory 2234 may be operatively and/or physically connected to the electronic device 2201 through various interfaces.

The sensor module 2240 may measure, for example, a physical quantity or may detect an operation state of the electronic device 2201. The sensor module 2240 may convert the measured or detected information to an electric signal. For example, the sensor module 2240 may include at least one of a gesture sensor 2240A, a gyro sensor 2240B, a barometric pressure sensor 2240C, a magnetic sensor 2240D, an acceleration sensor 2240E, a grip sensor 2240F, the proximity sensor 2240G, a color sensor 2240H (e.g., red, green, blue (RGB) sensor), a biometric sensor 2240I, a temperature/humidity sensor 2240J, an illuminance sensor 2240K, or an UV sensor 2240M. Although not illustrated, additionally or generally, the sensor module 2240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 2240 may further include a control circuit for controlling at least one or more sensors included therein. According to an embodiment, the electronic device 2201 may further include a processor that is a part of the processor 2210 or independent of the processor 2210 and is configured to control the sensor module 2240. The processor may control the sensor module 2240 while the processor 2210 remains at a sleep state.

The input device 2250 may include, for example, a touch panel 2252, a (digital) pen sensor 2254, a key 2256, or an ultrasonic input unit 2258. For example, the touch panel 2252 may use at least one of capacitive, resistive, infrared and ultrasonic detecting methods. Also, the touch panel 2252 may further include a control circuit. The touch panel 2252 may further include a tactile layer to provide a tactile reaction to a user. The (digital) pen sensor 2254 may be, for example, a part of a touch panel or may include an additional sheet for recognition. The key 2256 may include, for example, a physical button, an optical key, or a keypad. The ultrasonic input device 2258 may detect (or sense) an ultrasonic signal, which is generated from an input device, through a microphone (e.g., a microphone 2288) and may check data corresponding to the detected ultrasonic signal.

The display 2260 (e.g., the display 2160) may include a panel 2262, a hologram device 2264, a projector 2266, and/or a control circuit for controlling the panel 2262, the hologram device 2264, or the projector 2266. The panel 2262 may be implemented, for example, to be flexible, transparent or wearable. The panel 2262 and the touch panel 2252 may be integrated into a single module. According to an embodiment, the panel 2262 may include a pressure sensor (or force sensor) that measures the intensity of touch pressure by a user. The pressure sensor may be implemented integrally with the touch panel 2252, or may be implemented as at least one sensor separately from the touch panel 2252. The hologram device 2264 may display a stereoscopic image in a space using a light interference phenomenon. The projector 2266 may project light onto a screen so as to display an image. For example, the screen may be arranged in the inside or the outside of the electronic device 2201. The interface 2270 may include, for example, a high-definition multimedia interface (HDMI) 2272, a universal serial bus (USB) 2274, an optical interface 2276, or a D-subminiature (D-sub) 2278. The interface 2270 may be included, for example, in the communication interface 2170 illustrated in FIG. 19. Additionally or generally, the interface 2270 may include, for example, a mobile high definition link (MHL) interface, a SD card/multi-media card (MMC) interface, or an infrared data association (IrDA) standard interface.

The audio module 2280 may convert a sound and an electric signal in dual directions. At least a part of the audio module 2280 may be included, for example, in the input/output interface 2150 illustrated in FIG. 19. The audio module 2280 may process, for example, sound information that is input or output through a speaker 2282, a receiver 2284, an earphone 2286, or the microphone 2288. For example, the camera module 2291 may shoot a still image or a video. According to an embodiment, the camera module 2291 may include at least one or more image sensors (e.g., a front sensor or a rear sensor), a lens, an image signal processor (ISP), or a flash (e.g., an LED or a xenon lamp). The power management module 2295 may manage, for example, power of the electronic device 2201. According to an embodiment, a power management integrated circuit (PMIC), a charger IC, or a battery or fuel gauge may be included in the power management module 2295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 2296 and a voltage, current or temperature thereof while the battery is charged. The battery 2296 may include, for example, a rechargeable battery and/or a solar battery.

The indicator 2297 may display a specific state of the electronic device 2201 or a part thereof (e.g., the processor 2210), such as a booting state, a message state, a charging state, and the like. The motor 2298 may convert an electrical signal into a mechanical vibration and may generate the following effects: vibration, haptic, and the like. The electronic device 2201 may include a processing device (e.g., a GPU) for supporting a mobile TV. The processing device for supporting the mobile TV may process media data according to the standards of digital multimedia broadcasting (DMB), digital video broadcasting (DVB), MediaFLO™, or the like. Each of the above-mentioned elements of the electronic device according to various embodiments of the present disclosure may be configured with one or more components, and the names of the elements may be changed according to the type of the electronic device. In various embodiments, some elements of the electronic device (e.g., the electronic device 2201) may be omitted or other additional elements may be added. Furthermore, some of the elements of the electronic device may be combined with each other so as to form one entity, so that the functions of the elements may be performed in the same manner as before the combination.

Figure 21:
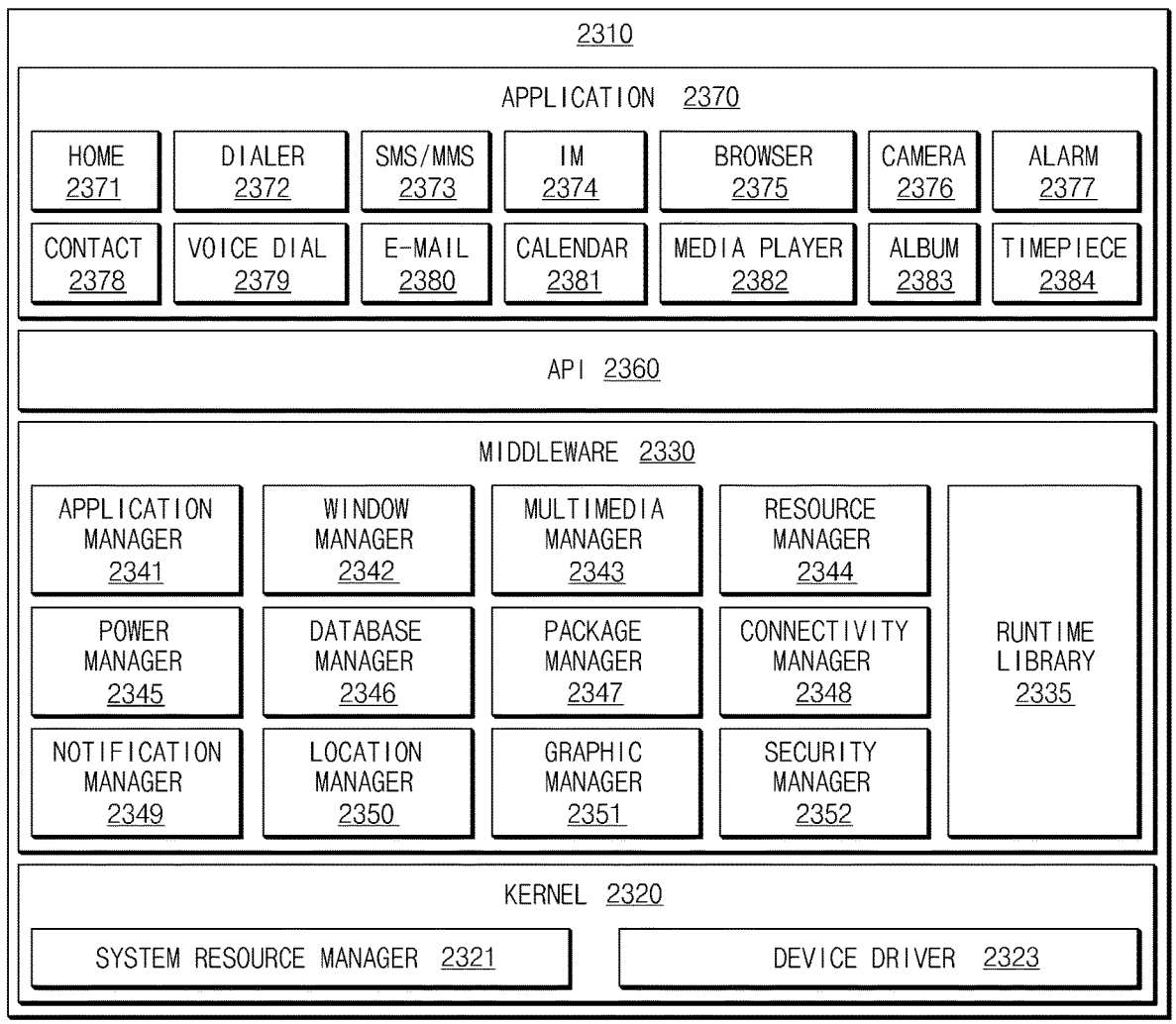
FIG. 21 is a block diagram of a program module, according to various embodiments of the present disclosure.

FIG. 21 illustrates a block diagram of a program module, according to various embodiments of the present disclosure. According to an embodiment, a program module 2310 (e.g., the program 2140) may include an operating system (OS) to control resources associated with an electronic device (e.g., the electronic device 2101, the electronic device 100), and/or diverse applications (e.g., the application program 2147) driven on the OS. The OS may be, for example, Android™, iOS™, Windows™ Symbian™, Tizen™, or Bada™. The program module 2310 may include a kernel 2320 (e.g., the kernel 2141), a middleware 2330 (e.g., the middleware 2143), an application programming interface (API) 2360 (e.g., the API 2145), and/or an application 2370 (e.g., the application program 2147). At least a portion of the program module 2310 may be preloaded on an electronic device or may be downloadable from an external electronic device (e.g., the first electronic device 2102, the second electronic device 2104, the server 2106, or the like).

The kernel 2320 (e.g., the kernel 2141) may include, for example, a system resource manager 2321 or a device driver 2323. The system resource manager 2321 may control, allocate, or retrieve system resources. According to an embodiment, the system resource manager 2321 may include a process managing unit, a memory managing unit, a file system managing unit, or the like. The device driver 2323 may include, for example, a display driver, a camera driver, a Bluetooth driver, a shared memory driver, a USB driver, a keypad driver, a Wi-Fi driver, an audio driver, or an inter-process communication (IPC) driver. The middleware 2330 may provide, for example, a function that the application 2370 needs in common, or may provide diverse functions to the application 2370 through the API 2360 to allow the application 2370 to efficiently use limited system resources of the electronic device. According to an embodiment, the middleware 2330 may include at least one of a runtime library 2335, an application manager 2341, a window manager 2342, a multimedia manager 2343, a resource manager 2344, a power manager 2345, a database manager 2346, a package manager 2347, a connectivity manager 2348, a notification manager 2349, a location manager 2350, a graphic manager 2351, or a security manager 2352.

The runtime library 2335 may include, for example, a library module that is used by a compiler to add a new function through a programming language while the application 2370 is being executed. The runtime library 2335 may perform input/output management, memory management, or capacities about arithmetic functions. The application manager 2341 may manage, for example, a life cycle of at least one application of the application 2370. The window manager 2342 may manage a graphic user interface (GUI) resource that is used in a screen. The multimedia manager 2343 may identify a format necessary for playing diverse media files, and may perform encoding or decoding of media files by using a codec suitable for the format. The resource manager 2344 may manage resources such as a memory space or source code of the application 2370. The power manager 2345 may manage a battery or power, and may provide power information for an operation of an electronic device. According to an embodiment, the power manager 2345 may operate with a basic input/output system (BIOS). The database manager 2346 may generate, search for, or modify database that is to be used in the application 2370. The package manager 2347 may install or update an application that is distributed in the form of package file.

The connectivity manager 2348 may manage, for example, wireless connection. The notification manager 2349 may provide an event, for example, arrival message, appointment, or proximity notification to a user. For example, the location manager 2350 may manage location information about an electronic device. The graphic manager 2351 may manage a graphic effect that is provided to a user, or manage a user interface relevant thereto. The security manager 2352 may provide, for example, system security or user authentication. According to an embodiment, the middleware 2330 may include a telephony manager for managing a voice or video call function of the electronic device or a middleware module that combines diverse functions of the above-described elements. According to an embodiment, the middleware 2330 may provide a module specialized to each OS kind to provide differentiated functions. Additionally, the middleware 2330 may dynamically remove a part of the preexisting elements or may add new elements thereto. The API 2360 may be, for example, a set of programming functions and may be provided with a configuration that is variable depending on an OS. For example, in the case where an OS is the android or the iOS, it may provide one API set per platform. In the case where an OS is the Tizen™, it may provide two or more API sets per platform.

The application 2370 may include, for example, applications such as a home 2371, a dialer 2372, a short message service (SMS)/multimedia message service (MMS) 2373, an instant message (IM) 2374, a browser 2375, a camera 2376, an alarm 2377, a contact 2378, a voice dial 2379, an e-mail 2380, a calendar 2381, a media player 2382, an album 2383, a timepiece 2384, health care (e.g., measuring an exercise quantity, blood sugar, or the like) or offering of environment information (e.g., information of barometric pressure, humidity, temperature, or the like). According to an embodiment, the application 2370 may include an information exchanging application to support information exchange between an electronic device and an external electronic device. The information exchanging application may include, for example, a notification relay application for transmitting specific information to an external electronic device, or a device management application for managing the external electronic device. For example, the notification relay application may include a function of transmitting notification information, which arise from other applications, to an external electronic device or may receive, for example, notification information from an external electronic device and provide the notification information to a user. The device management application may install, delete, or update for example, a function (e.g., turn-on/turn-off of an external electronic device itself (or a part of components) or adjustment of brightness (or resolution) of a display) of the external electronic device which communicates with the electronic device, and an application running in the external electronic device. According to an embodiment, the application 2370 may include an application (e.g., a health care application of a mobile medical device) that is assigned in accordance with an attribute of an external electronic device. According to an embodiment, the application 2370 may include an application that is received from an external electronic device. At least a portion of the program module 2310 may be implemented by software, firmware, hardware (e.g., the processor 2210), or a combination (e.g., execution) of two or more thereof, and may include modules, programs, routines, sets of instructions, processes, or the like for performing one or more functions.

The term "module" used in this disclosure may include a unit composed of hardware, software and firmware and may be interchangeably used with the terms "unit", "logic", "logical block", "component" and "circuit". The "module" may be an integrated component or may be a minimum unit for performing one or more functions or a part thereof. The "module" may be implemented mechanically or electronically and may include at least one of an application-specific IC (ASIC) chip, a field-programmable gate array (FPGA), and a programmable-logic device for performing some operations, which are known or will be developed. At least a part of an apparatus (e.g., modules or functions thereof) or a method (e.g., operations) according to various embodiments may be, for example, implemented by instructions stored in computer-readable storage media (e.g., the memory 2130) in the form of a program module. The instructions, when executed by a processor (e.g., the processor 2120), may cause the processor to perform a function corresponding to the instructions. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and an internal memory. Also, program instructions may include not only a mechanical code such as things generated by a compiler but also a high-level language code executable on a computer using an interpreter. A module or a program module according to various embodiments may include at least one of the above elements, or a part of the above elements may be omitted, or other elements may be further included. Operations performed by a module, a program module, or other elements according to various embodiments may be executed sequentially, in parallel, repeatedly, or in a heuristic method or some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A portable communication device comprising:
 a housing;
 a display disposed in the housing, the display including a first edge region, a second edge region disposed in parallel with respect to the first edge region in a first direction, a third edge region, and a fourth edge region disposed in parallel with respect to the third edge region in a second direction perpendicular to the first direction, the first edge region having a first length and the third edge region having a second length longer than the first length, wherein the first edge region, the second edge region, the third edge region, and the fourth edge region are adjacent to the housing;
 a communication circuit disposed in the housing;
 a processor disposed in the housing;
 a display driver integrated (DDI) circuit; and memory electrically connected with the display, the communication circuit and the processor and storing instructions, wherein the instructions that, when executed by the processor, cause the portable communication device to:

receive, via the communication circuit, a signal from an external electronic device in a sleep mode; and in response to receiving the signal, display, on the display, a first graphic object displayed along at least part of the third edge region with an extending effect and a second graphic object displayed along at least part of the fourth edge region with an extending effect.

2. The portable communication device of claim 1, wherein the signal is associated with an application, and wherein the application includes a message application or a call application.

3. The portable communication device of claim 1, wherein a size of the first or the second graphic object increases in a lengthwise direction.

4. The portable communication device of claim 1, wherein the processor is operable in a mode selected from a plurality of modes including a sleep mode and a wake-up mode.

5. The portable communication device of claim 4, wherein the DDI circuit includes a graphic random-access memory (GRAM), wherein the instructions that, when executed by the processor, further cause the portable communication device to:

while the processor is in the wake-up mode, to display, on the display, the first or the second graphic object using an image which is stored in a memory, and while the processor is in the sleep mode, to display, on the display, the first or the second graphic object using an image which is stored in a graphic random-access memory (GRAM) included in the DDI circuit.

6. The portable communication device of claim 1, wherein the instructions that, when executed by the processor, further cause the portable communication device to;

adjust brightness, color, or an on/off state of at least part of the display.

7. The portable communication device of claim 1, wherein the instructions that, when executed by the processor, further cause the portable communication device to:

display the first or the second graphic object such that a gradation effect is applied to at least part of the first or the second graphic object.

8. The portable communication device of claim 2, wherein the instructions that, when executed by the processor, further cause the portable communication device to:

determine a color of the first or the second graphic object based at least in part on the application.

9. The portable communication device of claim 1, wherein the processor is operable in a mode selected from a plurality of modes including a sleep mode and a wake-up mode, and wherein the instructions that, when executed by the processor, further cause the portable communication device to: display the first or the second graphic object while the processor is in the sleep mode.

10. The portable communication device of claim 1, wherein the processor is operable in a mode selected from a plurality of modes including a sleep mode and a wake-up mode, and wherein the instructions that, when executed by the processor, further cause the portable communication device to: display the first or the second graphic object while the processor is in the wake-up mode.

11. An operation method of a portable communication device including a display including a first edge region, a second edge region disposed in parallel with respect to the first edge region in a first direction, a third edge region, and a fourth edge region disposed in parallel with respect to the third edge region in a second direction perpendicular to the first direction, the first edge region having a first length and the third edge region having a second length longer than the first length, the operation method comprising:

receiving a signal from an external electronic device in a sleep mode; and in response to receiving the signal, displaying, on a display, a first graphic object displayed along at least part of the third edge region with an extending effect and a second graphic object displayed along at least part of the fourth edge region with an extending effect.

12. The operation method of claim 11, wherein the signal is associated with an application, and wherein the application includes a message application or a call application.

13. The operation method of claim 11, wherein a size of the first or the second graphic object increases in a lengthwise direction.

14. The operation method of claim 11, further comprising:

adjusting brightness, color, or an on/off state of at least part of the display.

15. The operation method of claim 11, further comprising:

displaying the first or the second graphic object such that a gradation effect is applied to at least part of the first or the second graphic object.

16. The operation method of claim 12, further comprising:

determining a color of the first or the second graphic object based at least in part on the application.

17. The operation method of claim 11, wherein the portable communication device is operable in a mode selected from a plurality of modes including a sleep mode and a wake-up mode, further comprising:

displaying the first or the second graphic object while the portable communication device is in the sleep mode.

18. The operation method of claim 11, wherein the portable communication device is operable in a mode selected from a plurality of modes including a sleep mode and a wake-up mode, further comprising:

displaying the first or the second graphic object while the portable communication device is in the wake-up mode.

19. A portable communication device comprising:

a housing;

a display disposed in the housing, the display including a first edge region, a second edge region disposed in parallel with respect to the first edge region in a first direction, a third edge region, and a fourth edge region disposed in parallel with respect to the third edge region in a second direction perpendicular to the first direction, the first edge region having a first length and the third edge region having a second length longer than the first length, wherein the first edge region, the second edge region, the third edge region, and the fourth edge region are adjacent to the housing;

a communication circuit disposed in the housing;

a processor disposed in the housing;

a display driver integrated (DDI) circuit; and memory electrically connected with the display, the communication circuit and the processor, and storing instructions, wherein the instructions that, when executed by the processor, cause the portable communication device to:
while displaying information on the display through intrinsic operation of the DDI circuit without intervention of the processor, receive, via the communication circuit, a signal from an external electronic device;

identify whether the signal is associated with a text message; and in response to identifying that the signal is associated with a text message, control to display, on the display, a first graphic portion displayed along at least part of the third edge region with an extending effect and a second graphic portion displayed along at least part of the fourth edge region with an extending effect.

20. The portable communication device of claim 19, wherein the instructions that, when executed by the processor, further cause the portable communication device to control to display, on the display, at least one content corresponding to the signal while displaying the first graphic portion and the second graphic portion.

* * * * *